US011777859B2

(12) United States Patent
Ke

(10) Patent No.: US 11,777,859 B2
(45) Date of Patent: Oct. 3, 2023

(54) METHOD FOR GUARANTEEING DATA TRANSMISSION AND COMMUNICATIONS DEVICE

(71) Applicant: VIVO MOBILE COMMUNICATION CO., LTD., Chang'an Dongguan (CN)

(72) Inventor: Xiaowan Ke, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 82 days.

(21) Appl. No.: 17/344,407

(22) Filed: Jun. 10, 2021

(65) Prior Publication Data

US 2021/0306275 A1 Sep. 30, 2021

Related U.S. Application Data

(63) Continuation of application No. PCT/CN2019/123586, filed on Dec. 6, 2019.

(30) Foreign Application Priority Data

Dec. 14, 2018 (CN) .......................... 201811537222.1

(51) Int. Cl.
*H04L 12/46* (2006.01)
*H04L 12/26* (2006.01)
*H04L 12/851* (2013.01)
*H04L 47/24* (2022.01)
*H04L 43/028* (2022.01)

(52) U.S. Cl.
CPC .......... *H04L 47/24* (2013.01); *H04L 12/4633* (2013.01); *H04L 43/028* (2013.01)

(58) Field of Classification Search
None
See application file for complete search history.

(56) References Cited

U.S. PATENT DOCUMENTS

2009/0144819 A1* 6/2009 Babbar ................... H04L 47/10
726/13
2019/0021064 A1 1/2019 Ryu et al.
2019/0394711 A1* 12/2019 Kim ....................... H04W 76/25

FOREIGN PATENT DOCUMENTS

| CN | 105072010 A | 11/2015 |
|---|---|---|
| CN | 106998549 A | 8/2017 |
| CN | 111182543 A | 5/2020 |
| WO | 2015003125 A2 | 1/2015 |
| WO | 2018008944 A1 | 1/2018 |

(Continued)

OTHER PUBLICATIONS

First Japanese Office Action related to Application No. 2021-534153 dated Jul. 15, 2022.

(Continued)

*Primary Examiner* — Hong Shao
(74) *Attorney, Agent, or Firm* — von Briesen & Roper, s.c.

(57) ABSTRACT

A method for guaranteeing data transmission and a communications device are provided. The method for guaranteeing data transmission, applied to a terminal, includes: obtaining information of an IPsec tunnel, where the IPsec tunnel is used for transmitting information between the terminal and a second network; and performing a related operation for a tunnel of a first network based on the information of the IPsec tunnel.

19 Claims, 19 Drawing Sheets

(56) References Cited

FOREIGN PATENT DOCUMENTS

WO      2018155934 A1     8/2018

OTHER PUBLICATIONS

S2-1900145, Source: vivo "Discussion on the QoS issue when accessing to PLMN services via NPN and vise versa", Document for: Approval, Agenda Item: 6.15.3, Release: Vertical_LAN/Rel-16, SA WG2 Meeting #130, Jan. 21-25, 2019, Kochi, India.

S2-1812028, Source: Interdigital Inc. "Update to Solution #20 on QoS flow" Document for: Approval, Agenda Item: 6.15.3, Release: FS_Vertical_LAN/Rel-16, SA WG2 Meeting #129bis, Nov. 26-Nov. 30, 2018, West Plam Beach, USA.

3GPP TS 23.501 V15.3.0, 3rd Generation Partnership Project; Technical Specification Group Services and System Aspects; System Architecture for the 5G System; Stage 2; (Release 15) V15.3.0 (Sep. 2018).

3GPP TS 23.502 V15.3.0, 3rd Generation Partnership Project; Technical Specification Group Services and System Aspects; Procedures for the 5G System; Stage 2; (Release 15) V15.3.0 (Sep. 2018).

International Search Report & Written Opinion related to Application No. PCT/CN2019/123586; dated Jun. 24, 2021.

First Chinese Office Action for related Application No. 201811537222.1; dated Apr. 2, 2021.

Interdigital Inc., "Solution for supporting Non-standalone NPN", Oct. 15 - 19, 2018, SA WG2 Meeting #129, Dongguan, China.

SA WG2. "Reply LS on IPSec inner transport protocol for NAS over non-3GPP access", Oct. 15-19, 2018, 3GPP TSG SA WG2 (Architecture) Meeting #129, Dongguan, China.

Extended European search report related to Application No. 19895969.4 dated Jan. 10, 2022.

S3-170137, Source: Broadcom, "Analysis on the use of IPSec transport for control and user plane of non-3GPP access" Document for: Discussion and Approval, Agenda Item: 8.4.1, Release: FS_NSA/Rel-14—3GPP TSG SA WG3 (Security) Masting #86, Feb. 6-10, 2017 Sophia Antipolis (France).

S2-170081, Source: Motorola Mobility, Lenovo, Broadcom, Huawei, HiSilicon, "PDU session setup over untrusted non-3GPP access with IKEv2" Document for: Approval, Agenda Item: 6.5.10, Release: 5GS_Ph1/Rel-15—SA WG2 Meeting #118bis, Jan. 16-20, 2017, Spokane, WA, USA.

First Korean Office Action for related Application No. 10-2021-7021595; dated Dec. 16, 2022.

* cited by examiner

| IP (protocol field = ESP) of first network | Security parameter index of first IPsec tunnel | Control signaling of second network |

METHOD FOR GUARANTEEING DATA TRANSMISSION AND COMMUNICATIONS DEVICE

CROSS-REFERENCE TO RELATED APPLICATIONS

This application is a continuation application of a PCT Application No. PCT/CN2019/123586 filed on Dec. 6, 2019, which claims priority to Chinese Patent Application No. 201811537222.1, filed in China on Dec. 14, 2018, the disclosures of which are incorporated herein by reference in their entireties.

TECHNICAL FIELD

Embodiments of this disclosure relate to the field of wireless communications technologies, and in particular, to a method for guaranteeing data transmission and a communications device.

BACKGROUND

Many vertical industries, such as railway dispatching and automation control, impose communication requirements. The fifth generation (5-th Generation, 5G) communications technology is able to provide the vertical industries with a non-public network (NPN) to meet the communication requirements of the vertical industries. Non-public networks generally provide services only within one area, not full coverage.

A non-public network may be deployed in many ways, for example (1) as a standalone network; (2) as a non-standalone network, where the non-standalone network is for example (a) a part of an operator's communications network, or (b) a slice of an operator's communications network.

A terminal subscribing to a non-public network may also have subscribed to a public network (PN for short). A terminal subscribing to a public network may also have subscribed to a non-public network. A terminal can have access to public network services (for example, public land mobile network (PLMN) services) via a non-public network. A terminal can also have access to non-public network services via a public network (for example, access to a non-public network via a PLMN (access to selected non-public network services via a PLMN)).

As a non-public network is deployed without some complicated network services, under coverage of a non-public network, it is also desirable for a non-public network subscriber to have access to public network services. On the contrary, under coverage of a public network, it is desirable for a non-public network subscriber to have access to a non-public network. How to guarantee non-public network services in a public network when a terminal accesses a network service of the public network via a non-public network, or how to guarantee public network services in a non-public network when a terminal accesses a network service of the non-public network via a public network, has become a technical issue to be resolved urgently at present.

SUMMARY

Embodiments of this disclosure provide a method for guaranteeing data transmission and a communications device.

In order to resolve the foregoing technical problem, this disclosure is implemented as follows:

According to a first aspect, an embodiment of this disclosure provides a method for guaranteeing data transmission, applied to a terminal, where the method includes:

obtaining information of a first IPsec tunnel, where the first IPsec tunnel is an IPsec tunnel used for transmitting control signaling between the terminal and a second network; and performing a first related operation for a tunnel of a first network based on the information of the first IPsec tunnel.

According to a second aspect, an embodiment of this disclosure provides a method for guaranteeing data transmission, applied to a terminal, where the method includes:

obtaining information of a data IPsec tunnel and/or information of a tunnel between the terminal and a second network, where the data IPsec tunnel is an IPsec tunnel used for transmitting user plane data between the terminal and the second network, or data of the tunnel between the terminal and the second network; and performing a second related operation for a tunnel of a first network based on the information of the data IPsec tunnel and/or the information of the tunnel between the terminal and the second network.

According to a third aspect, an embodiment of this disclosure provides a method for guaranteeing data transmission, applied to a proxy network element, where the method includes:

determining whether a preset condition is met; and when it is determined that the preset condition is met, performing an operation related to a data IPsec tunnel for a tunnel of a second network;

where the proxy network element is a proxy of a first network for interacting with the second network.

According to a fourth aspect, an embodiment of this disclosure provides a method for guaranteeing data transmission, applied to a communications network element, where the method includes:

transmitting information of a tunnel between a terminal and a second network, where the information of the tunnel between the terminal and the second network includes at least one of the following: an identifier of a data IPsec tunnel associated with the tunnel between the terminal and the second network, a security parameter index of the data IPsec tunnel associated with the tunnel between the terminal and the second network, a new tunnel between the terminal and the second network, a removed tunnel between the terminal and the second network, QoS parameter information of the tunnel between the terminal and the second network, indication information of a separate bearer resource, and indication information that no separate bearer resource is needed.

According to a fifth aspect, an embodiment of this disclosure provides a method for guaranteeing data transmission, applied to a terminal, where the method includes:

obtaining information of an IPsec tunnel, where the IPsec tunnel is used for transmitting control signaling between the terminal and a second network; and performing a related operation for a tunnel of a first network based on the information of the IPsec tunnel.

According to a sixth aspect, an embodiment of this disclosure provides a terminal, including:

an obtaining module, configured to obtain information of a first IPsec tunnel, where the first IPsec tunnel is an IPsec tunnel used for transmitting control signaling between the terminal and a second network; and an executing module, configured to perform a first related operation for a tunnel of a first network based on the information of the first IPsec tunnel.

According to a seventh aspect, an embodiment of this disclosure provides a terminal, including:

an obtaining module, configured to obtain information of a data IPsec tunnel and/or information of a tunnel between the terminal and a second network, where the data IPsec tunnel is an IPsec tunnel used for transmitting user plane data between the terminal and the second network, or data of the tunnel between the terminal and the second network; and an executing module, configured to perform a second related operation for a tunnel of a first network based on the information of the data IPsec tunnel and/or the information of the tunnel between the terminal and the second network.

According to an eighth aspect, an embodiment of this disclosure provides a proxy network element, including:

a determining module, configured to determine whether a preset condition is met; and an executing module, configured to, when it is determined that the preset condition is met, perform an operation related to a data IPsec tunnel for a tunnel of a second network;

where, the proxy network element is a proxy of a first network for interacting with the second network.

According to a ninth aspect, an embodiment of this disclosure provides a communications network element, including:

a transmitting module, configured to transmit information of a tunnel between a terminal and a second network, where the information of the tunnel between the terminal and the second network includes at least one of the following: an identifier of a data IPsec tunnel associated with the tunnel between the terminal and the second network, a security parameter index of the data IPsec tunnel associated with the tunnel between the terminal and the second network, a new tunnel between the terminal and the second network, a removed tunnel between the terminal and the second network, QoS parameter information of the tunnel between the terminal and the second network, indication information of a separate bearer resource, and indication information that no separate bearer resource is needed.

According to a tenth aspect, an embodiment of this disclosure provides a terminal, including:

an obtaining module, configured to obtain information of an IPsec tunnel, where the IPsec tunnel is used for transmitting control signaling between the terminal and a second network; and an executing module, configured to perform a related operation for a tunnel of a first network based on the information of the IPsec tunnel.

According to an eleventh aspect, an embodiment of this disclosure provides a terminal, including a processor, a memory, and a program stored in the memory and capable of running on the processor. When the program is executed by the processor, the steps of the method, applied to a terminal, for guaranteeing data transmission are implemented.

According to a twelfth aspect, an embodiment of this disclosure provides a terminal, including a processor, a memory, and a program stored in the memory and capable of running on the processor. When the program is executed by the processor, the steps of the method, applied to a proxy network element, for guaranteeing data transmission are implemented.

According to a thirteenth aspect, an embodiment of this disclosure provides a communications network element, including a processor, a memory, and a program stored in the memory and capable of running on the processor. When the program is executed by the processor, the steps of the method, applied to a communications network element, for guaranteeing data transmission are implemented.

According to a fourteenth aspect, an embodiment of this disclosure provides a computer-readable storage medium, where the computer-readable storage medium stores a program, and when the program is executed by a processor, the steps of the foregoing method for guaranteeing data transmission are implemented.

BRIEF DESCRIPTION OF DRAWINGS

Other advantages and benefits will become apparent to those of ordinary skill in the art upon reading detailed description of optional embodiments below. The accompanying drawings are merely intended to illustrate the objectives of the optional embodiments and are not intended to limit this disclosure. Throughout the accompanying drawings, the same reference numerals represent the same components. In the drawings.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the connected objects. For example, A and/or B means three cases: A alone, B alone, or A and B together.

In the embodiments of this disclosure, the terms such as "an example" or "for example" are used to represent an example, an illustration, or a description. Any embodiment or design scheme described as "an example" or "for example" in the embodiments of this disclosure should not be construed as preferred or advantageous over other embodiments or design schemes. Specifically, the terms such as "an example" or "for example" are used to present related concepts in a specific manner.

The following describes embodiments of this disclosure with reference to the accompanying drawings. The method for guaranteeing data transmission and the communications device provided in the embodiments of this disclosure may be applied into a wireless communications system. The wireless communications system may be a 5G system, or an evolved long term evolution (eLTE for short) system, or a later evolved communications system.

Figure 1:
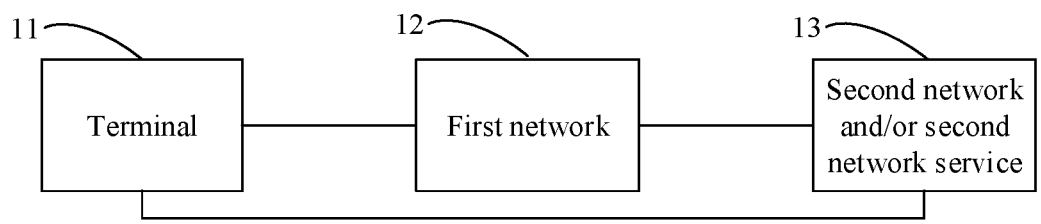
FIG. 1 is a schematic architectural diagram of a wireless communications system according to an embodiment of this disclosure.

FIG. 1 is a schematic architectural diagram of a wireless communications system according to an embodiment of this disclosure. As shown in FIG. 1, a terminal 11, a first network 12, and a second network and/or a second network service 13 are included, where the second network service may be a network service supported on a network element of the second network, or a network service accessed via the second network. The terminal 11 may access the second network service via the first network 12, or access the second network service via the second network, or access the second network service via the second network after accessing the second network via the first network.

Figure 2:
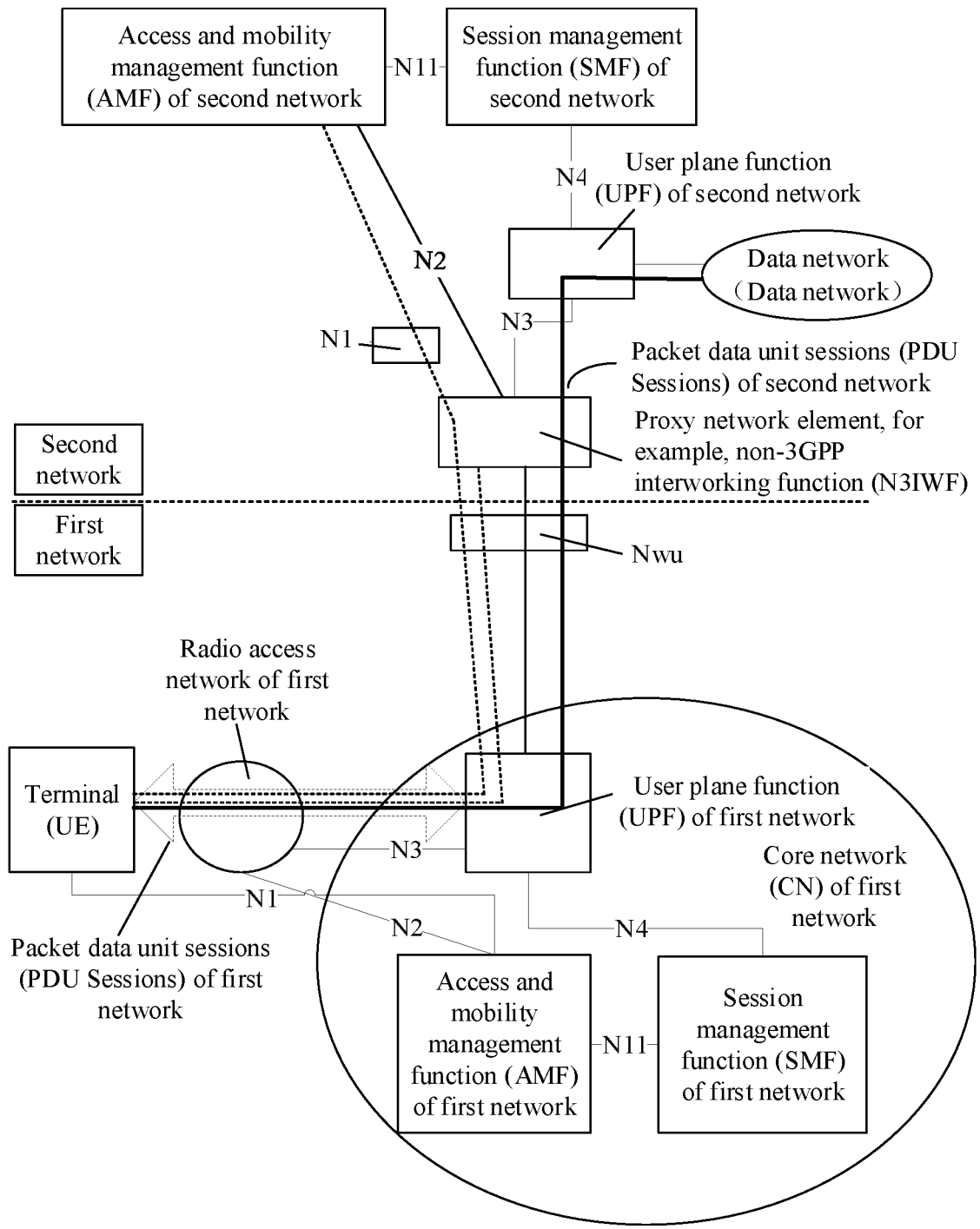
FIG. 2 is a schematic architectural diagram of the wireless communications system shown in FIG. 1 in a specific application scenario.
Figures 3, 4:
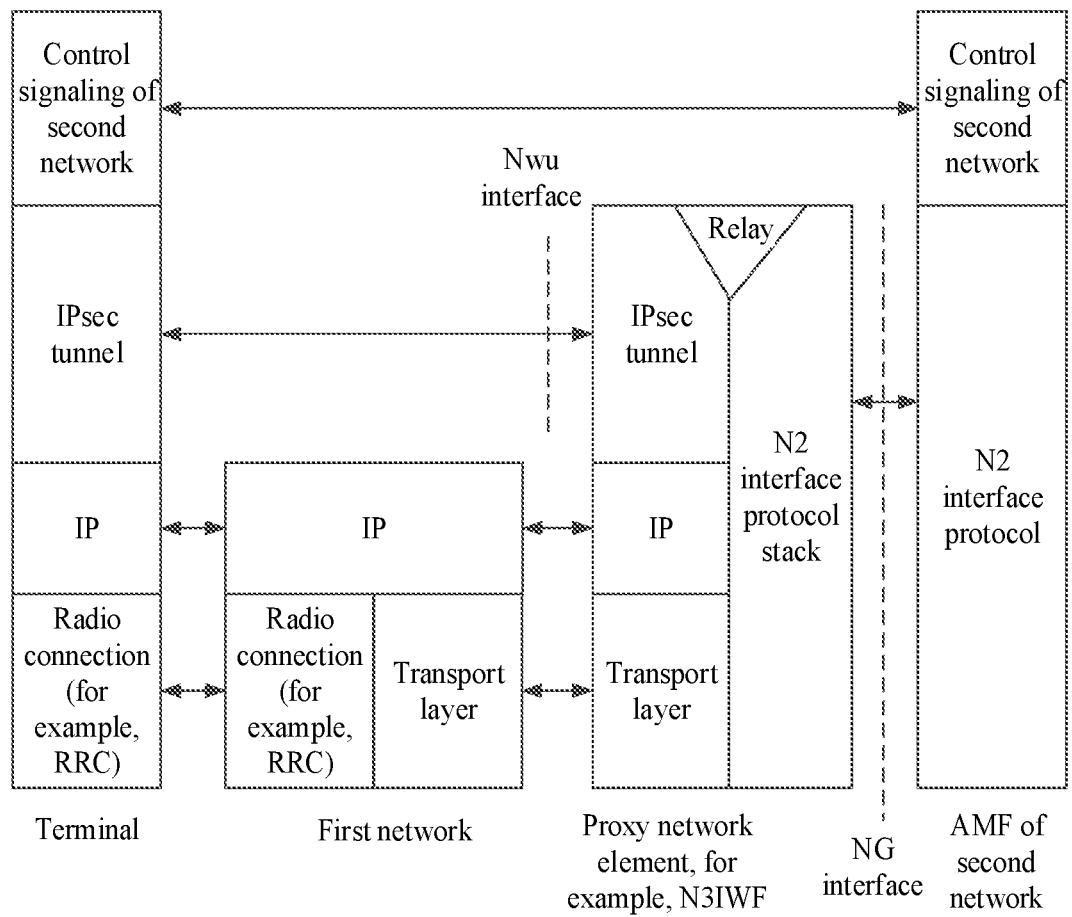
FIG. 3 is a schematic diagram of a transmission mode for transmitting control signaling between a terminal and a second network via a first network.
FIG. 4 is a schematic diagram of a transmission format for transmitting control signaling between a terminal and a second network via a first network.
Figure 5:
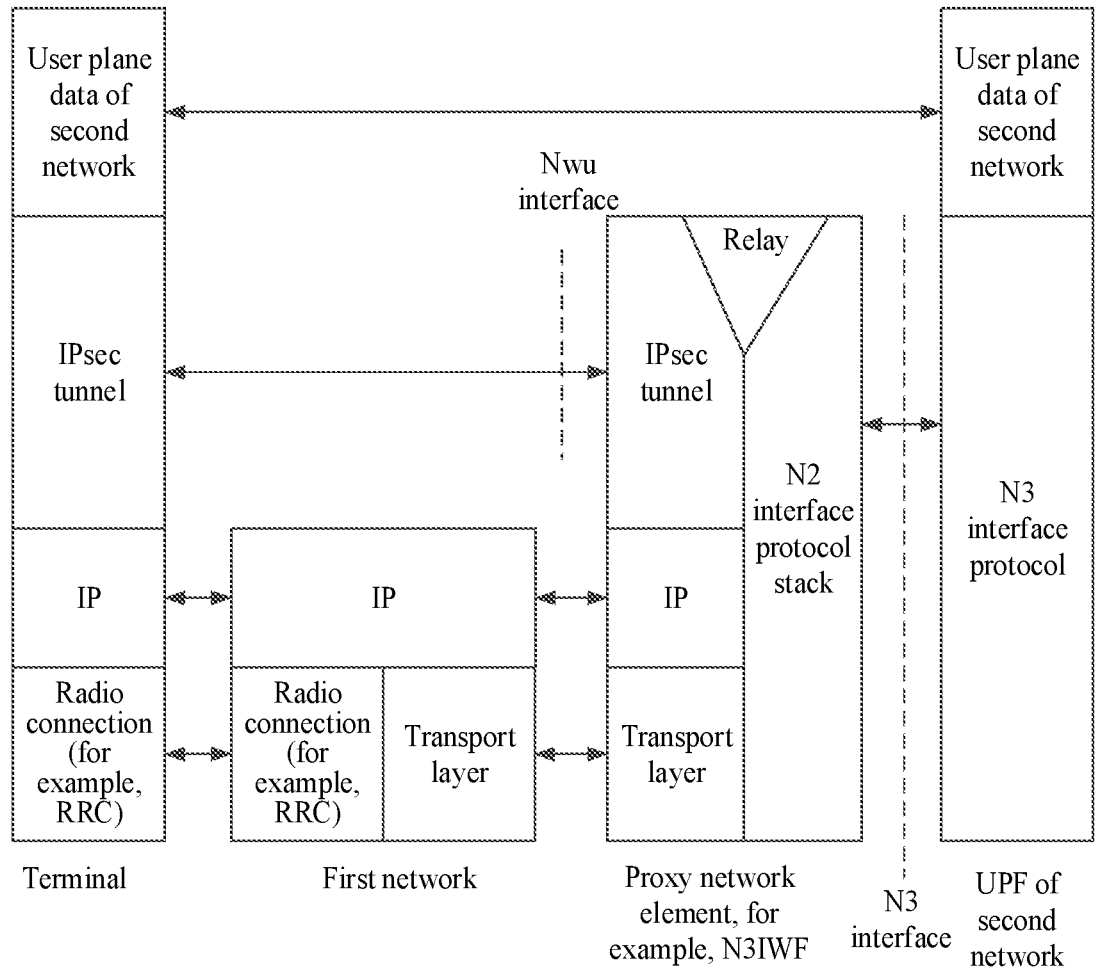
FIG. 5 is a schematic diagram of a transmission mode for transmitting user plane data of a second network via a first network.
Figure 6:
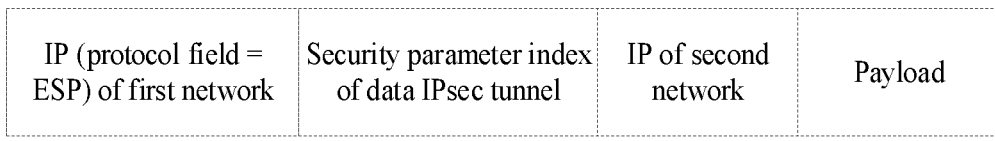
FIG. 6 is a schematic diagram of a transmission format for transmitting user plane data of a second network via a first network.

FIG. 2 is a schematic architectural diagram of a wireless communications system shown in FIG. 1 in a specific application scenario. In the application scenario, the terminal accesses a proxy network element (for example, a non-3GPP interworking function (N3IWF)) between a first network and a second network by establishing a PDU session tunnel with the first network. By establishing an IPsec tunnel with the proxy network element, the terminal connects to an access and mobility management function (AMF) and a user plane function (UPF) of the second network. FIG. 3 is a schematic diagram of a transmission mode for transmitting control signaling between a terminal and a second network via a first network. FIG. 4 is a schematic diagram of a transmission format for transmitting control signaling between a terminal and a second network via a first network. As can be seen from FIG. 3 and FIG. 4, control signaling between a terminal and a second network is transmitted via an internet protocol security tunnel (IPsec tunnel). FIG. 5 is a schematic diagram of a transmission mode for transmitting user plane data of a second network (also referred to as user plane data between a terminal and a second network) via a first network. FIG. 6 is a schematic diagram of a transmission format for transmitting user plane data of a second network via a first network. User plane data of a second network is transmitted via an IPsec tunnel.

The disadvantage of such an architecture shown in FIG. 2 is that details of information between the terminal and the second network are transparent to the first network, and quality of service (QoS) guarantee cannot be provided. In addition, there is no control plane interface between the proxy network element and the first network, and there it is unable to provide QoS information to the first network. Therefore, it is unable to guarantee performance and reliability of important traffic (such as IMS voice traffic, emergency traffic, and the like).

In order to allow a terminal to access a second network and/or a service of a second network via a first network, the following problems also need to be resolved:

Problem 1: Generally, control signaling is a basis for user plane data transmission. However, since control signaling and user plane data of the second network in the architecture of FIG. 2 are mapped to IPsec tunnel data, the first network currently cannot distinguish between the control signaling and user plane data of the second network, and cannot identify which IPsec tunnels are used for transmitting control signaling of the second network, and which IPsec tunnels are used for transmitting user plane data of the second network.

Problem 2: A method for guaranteeing QoS maps data to different QoS flows. Different QoS flows have different QoS parameter requirements. An effect of guaranteeing data in a QoS flow is achieved according to the QoS parameter requirement of the QoS flow. In the architecture of FIG. 2, user plane data of the second network may be data of a QoS flow of the second network. An IPsec tunnel may be associated with a QoS flow of the second network, that is, used for transmitting data of a QoS flow of the second network. However, the first network cannot distinguish QoS flows of the second network corresponding to IPsec tunnels, and cannot map data of an IPsec tunnel to a suitable QoS flow of the first network for guaranteeing transmission. Packet filter information contained in a QoS flow of the second network is an IP 5-tuple of the second network and other information. As shown in FIG. 6, IP information of the second network is the payload of an IPsec tunnel. In a case that a terminal uses packet filter information contained in a QoS flow of the second network to request a QoS flow of the first network for user plane data of the second network, a UPF of the first network cannot properly map a flow of the second network to a suitable QoS flow of the first network.

Problem 3: A proxy network element can map a plurality of QoS flows of the second network to one IPsec tunnel, QoS requirements of QoS flows are different, and one IPsec SA can only be mapped to one QoS flow of the first network. Therefore, it is still not clear how one QoS flow of the first network guarantees a plurality of QoS flows of the second network.

Optionally, obtaining may be understood as obtaining from a configuration, reception, reception after requesting, obtaining through self-learning, obtaining based on derivation of unreceived information, or obtaining through processing based on received information. This may be specifically determined according to actual needs, and is not limited in the embodiments of this disclosure. For example, when indication information of a given capability is not received from a device, it can be derived that the device does not support this capability.

Optionally, transmitting may include broadcasting, broadcasting in a system message, and a return in response to a request.

In an embodiment of this disclosure, a tunnel of a second network can be understood as a tunnel between a terminal and the second network. A QoS flow of a second network can be understood as a QoS flow between a terminal and the second network.

In an embodiment of this disclosure, a value of a service descriptor component type identifier corresponding to a security parameter index type may be 01100000.

In an embodiment of this disclosure, QoS information includes at least one of the following: a QoS rule, a QoS flow description, a QoS context, and QoS parameter information. The QoS parameter information is contained in the QoS flow description and the QoS context.

In an embodiment of this disclosure, the QoS parameter information may include at least one of the following: QoS class indication information, priority information, a packet delay budget, a packet error rate, a maximum data burst volume, whether it is GBR, whether a default averaging window requirement is set, a default averaging window, and GBR related QoS parameter information.

In an embodiment of this disclosure, the packet filter information may be used to map data to a tunnel of a network. Packet filter information may also be referred to as TFT, SDF, or other names. This is not specifically limited in this disclosure.

In the embodiments of this disclosure, packet filter information and packet filter can mean the same, and may be used interchangeably. QoS parameter information and QoS parameter may mean the same, and may be used interchangeably. QoS class indication information and QoS class indication may mean the same, and may be used interchangeably. QoS flow description information and QoS flow description may mean the same, and may be used interchangeably. Priority information, QoS priority information, and priority may mean the same, and may be used interchangeably.

In an embodiment of this disclosure, a tunnel between the terminal and the second network may be referred to briefly as a tunnel of the second network.

In an embodiment of this disclosure, emergency traffic may also be referred to as emergency voice traffic.

In an embodiment of this disclosure, voice traffic may include IMS voice traffic. IMS voice traffic may include at least one of the following: IMS voice traffic through 3GPP access, and IMS voice traffic through non-3GPP access.

In an embodiment of this disclosure, a GBR tunnel means that QoS information of the tunnel includes a GBR related QoS parameter.

In an embodiment of this disclosure, GBR related QoS parameter information may include at least one of the following: an uplink and/or downlink guaranteed flow bit rate GFBR, an uplink and/or downlink maximum flow bit rate MFBR, an uplink and/or downlink GBR, and an uplink and/or downlink maximum bit rate MBR.

In an embodiment of this disclosure, QoS class indication may be referred to as 5QI, QCI (QoS class identifier) or other names. This is not limited in this disclosure. A 5QI may be used as a QFI (QoS flow identifier).

In an optional embodiment of this disclosure, the tunnel may include at least one of the following: a PDU session, a quality of service (QoS) flow, an evolved packet system (EPS) bearer, a PDP context, a DRB, an SRB, and an internet protocol security (IPsec) association.

In an embodiment of this disclosure, the IPsec tunnel may be an IPsec security association SA. The first IPsec tunnel may be referred to as one of the following: signaling IPsec SA, IPsec master SA, IPsec SA for transmitting control signaling, or other names. This is not specifically limited in this disclosure. The data IPsec tunnel may be referred to as one of the following: data IPsec SA, IPsec child SA, IPsec SA for transmitting user plane data, IPsec SA for transmitting QoS flow data, or other names. This is not specifically limited in this disclosure.

In an embodiment of this disclosure, the first network may be a public network, and the second network may be a non-public network; or the first network may be a non-public network, and the second network may be a public network; or the first network may be a first non-public network, and the second network may be a second non-public network; or the first network may be a first public network, and the second network may be a second public network.

In an embodiment of this disclosure. The non-public network may be referred to as a non-public communications network. The non-public network may include at least one of the following deployments: a physical non-public network, a virtual non-public network, and a non-public network implemented on a public network. In an implementation, a non-public network is a closed access group (CAG). A CAG can include a group of terminals.

A non-public network service may also be referred to as one of the following: a network service of a non-public network, a non-public communications service, a non-public network communications service, or other names. It should be noted that a naming manner is not specifically limited in the embodiments of this disclosure. In an implementation, a non-public network is a closed access group (CAG), and in this case, a non-public network service is a network service of a closed access group.

In an embodiment of this disclosure, a non-public network may include or may be referred to as a private network. The private network may be referred to one of the following: a private communications network, a private network, a local area network (LAN), a private virtual network (PVN), an isolated communications network, a dedicated communications network, or other names. It should be noted that a naming manner is not specifically limited in the embodiments of this disclosure.

In an embodiment of this disclosure, a non-public network service may include or may be referred to as a private network service. The private network service may be referred to one of the following: a network service of a private network, a private communications network, a private network service, a local area network (LAN) service, a private virtual network (PVN) service, an isolated communications network service, a dedicated communications network service, a dedicated network service, or other names. It should be noted that a naming manner is not specifically limited in the embodiments of this disclosure.

The public network may be referred to as one of the following: a public communications network or other names. It should be noted that a naming manner is not specifically limited in the embodiments of this disclosure.

The public network service may also be referred to as one of the following: a network service of a public network, a public communications service, a public network communications service, a network service of a public network, or other names. It should be noted that a naming manner is not specifically limited in the embodiments of this disclosure.

In an embodiment of this disclosure, the tunnel may include at least one of the following: a PDU session, a quality of service (QoS) flow, an evolved packet system (EPS) bearer, a packet data protocol (PDP) context, a DRB, an SRB, and an internet protocol security (IPsec) association.

In the embodiments of this disclosure, related information between a terminal and a second network (may be referred to as related information between a terminal and a second network, information between a terminal and a second network, or data of a second network) may include at least one of the following: control signaling between the terminal and the second network (also referred to as NAS signaling), a second paging message, and user plane data between the terminal and the second network.

In an embodiment of this disclosure, an NG interface may also be referred to as an S1 interface or an N2 interface, and the naming is not limited.

In an embodiment of this disclosure, the communications network element may include at least one of the following: a core network element and a radio access network element.

In the embodiments of this disclosure, a network element of a first network (or referred to as a first network element) includes at least one of the following: a core network element of the first network and a radio access network element of the first network. A network element of a second network (or referred to as a second network element) includes at least one of the following: a core network element of the second network and a radio access network element of the second network.

In the embodiments of this disclosure, a core network element (CN network element) may include, but is not limited to, at least one of the following: a core network device, a core network node, a core network function, a core network element, a mobility management entity (MME), an access and mobility management function (AMF), a session management function (SMF), a user plane function (UPF), a serving gateway (serving GW, SGW), a PDN gateway (PDN Gate Way), a policy control function (PCF), a policy and charging rules function unit (PCRF), a GPRS service support node (Serving GPRS Support Node, SGSN), a gateway GPRS support node (GGSN) and a radio access network device.

In the embodiments of this disclosure, a RAN network element may include, but is not limited to, at least one of the following: a radio access network device, a radio access network node, a radio access network function, a radio access network unit, a 3GPP radio access network, a non-3GPP radio access network, a centralized unit (CU), a distributed unit (DU), a base station, an evolved NodeB (eNB), a 5G base station (gNB), a radio network controller (RNC), a NodeB, a non-3GPP interworking function (N3IWF), an access controller (AC) node, an access point (AP) device, or a wireless local area network (WLAN) node.

A base station may be a base transceiver station (BTS) in GSM or CDMA, or may be a NodeB in WCDMA, or may be an evolved NodeB (eNB or e-NodeB) in LTE or a 5G NodeB (gNB), which is not limited in the embodiments of this disclosure.

In the embodiments of this disclosure, a terminal may include a relay that supports a terminal function and/or a terminal that supports a relay function. A terminal may also be referred to as a terminal device or a user terminal (UE). The terminal may be a terminal-side device such as a mobile phone, a tablet computer, a laptop computer, a personal digital assistant (PDA), a mobile internet device (MID), a wearable device, or an in-vehicle device. It should be noted that the specific type of the terminal is not limited in the embodiments of this disclosure.

The following describes a method for guaranteeing data transmission in the embodiments of this disclosure.

Figure 7:
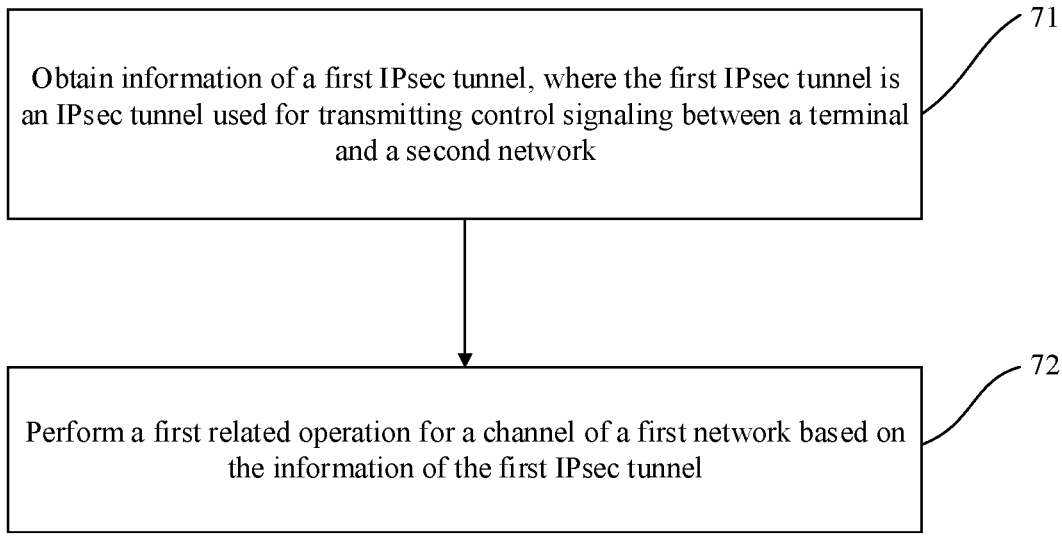
FIG. 7 is a schematic flowchart of a method for guaranteeing data transmission according to an embodiment of this disclosure.

Referring to FIG. 7, an embodiment of this disclosure provides a method for guaranteeing data transmission, applied to a terminal, where the method includes:

Step 71: Obtain information of a first IPsec tunnel, where the first IPsec tunnel is an IPsec tunnel used for transmitting control signaling between the terminal and a second network (control signaling between the terminal and the second network may be referred to as control signaling of the second network).

Step 72: Perform a first related operation for a tunnel of a first network based on the information of the first IPsec tunnel.

In this embodiment of this disclosure, a terminal may obtain information of a first IPsec tunnel used for transmitting control signaling between the terminal and a second network, and perform a related operation for a tunnel of a first network based on the information of the first IPsec tunnel, so that data of the first IPsec tunnel is properly mapped to a tunnel of the first network, and transmission of control signaling between the terminal and the second network is guaranteed in the first network.

In an implementation, when the first IPsec tunnel is established, the first related operation for a tunnel of the first network is performed based on the information of the first IPsec tunnel. In an implementation, the first IPsec tunnel is established after signaling for establishing a first IPsec tunnel is received from a proxy network element.

In an implementation, when a preset condition is met, the first related operation for a tunnel of the first network is performed based on the information of the first IPsec tunnel, where the preset condition includes: related signaling for establishing a first IPsec tunnel and information about an established first IPsec tunnel is received from a proxy network element.

In this embodiment of this disclosure, optionally, the performing a first related operation for a tunnel of a first network includes at least one of the following:

making a request to the first network for establishing a first tunnel;

making a request to the first network for modifying a third tunnel to a first tunnel;

transmitting QoS information of a first tunnel to the first network;

transmitting modified QoS information of a third tunnel to the first network;

transmitting first QoS information to the first network;

setting uplink and/or downlink packet filter information in QoS information of a first tunnel to the information of the first IPsec tunnel;

setting uplink and/or downlink packet filter information in first QoS information to the information of the first IPsec tunnel;

modifying uplink and/or downlink packet filter information in QoS information of a third tunnel to the information of the first IPsec tunnel;

setting a traffic descriptor component type identifier in QoS information of a first tunnel to a security parameter index type;

setting a traffic descriptor component type identifier in first QoS information to a security parameter index type;

modifying a traffic descriptor component type identifier in QoS information of a third tunnel to a security parameter index type;

setting a first tunnel to a non-guaranteed bit rate (Guaranteed Bit Rate, GBR) tunnel;

setting QoS information of a first tunnel or first QoS information to contain no GBR related QoS parameter information;

modifying a third tunnel to a non-GBR tunnel;

setting QoS information of a third tunnel to contain no GBR related QoS parameter information;

setting QoS class indication information in QoS information of a first tunnel to first QoS class indication information;

setting QoS class indication information in first QoS information to first QoS class indication information;

modifying QoS class indication information in QoS information of a third tunnel to first QoS class indication information;

setting a QoS priority in QoS information of a first tunnel to a first QoS priority;

setting a QoS priority in first QoS information to a first QoS priority;

modifying a QoS priority in QoS information of a third tunnel to a first QoS priority; and transmitting the information of the first IPsec tunnel to the first network;

where the first tunnel is used for transmitting data of the first IPsec tunnel, or used for transmitting control signaling between the terminal and the second network;

the third tunnel is a tunnel already established for the terminal and the first network; and the first QoS information is new QoS information.

In an implementation, the first QoS information may include no tunnel identifier (for example, QoS flow identifier). No tunnel identifier (for example, QoS flow identifier) is provided when the terminal makes a request to the first network for first QoS information (for example, a QoS rule and/or QoS flow description). After receiving the first QoS information, the first network (for example, an SMF of the first network) allocates a tunnel identifier (for example, a QoS flow identifier) to the first QoS information. The terminal receives granted first QoS information from the first network, and the granted first QoS information includes the allocated tunnel identifier (for example, the QoS flow identifier). In this case, the first QoS information becomes QoS information of a tunnel (for example, a QoS flow) indicated by the allocated tunnel identifier.

In this embodiment of this disclosure, optionally, the QoS information of a first tunnel, the modified QoS information of a third tunnel, and/or the first QoS information contains no GBR related QoS parameter information;

and/or the QoS information of a first tunnel, the modified QoS information of a third tunnel, and/or the first QoS information includes at least one of the following: uplink and/or downlink packet filter information, where the uplink and/or downlink packet filter information is the information of the first IPsec tunnel; a traffic descriptor component type identifier, where the traffic descriptor component type identifier is a security parameter index type; and QoS flow class indication information, where the QoS flow class indication information is first QoS class indication information.

In an implementation of this disclosure, the making a request to the first network for establishing a first tunnel is to make a request to the first network for establishing one first tunnel, where the first tunnel is used for transmitting data of the first IPsec tunnel.

It is easy to understand that by requesting to establish a first tunnel for data of the first IPsec tunnel, the terminal may transmit control signaling to be sent to a second network on the first tunnel. The terminal sets downlink packet filter information of the first tunnel to information of the first IPsec tunnel, a UPF of the first network may filter out the control signaling sent to the first network, and map IPsec tunnel data of the control signaling between the terminal and the second network to the first tunnel. By guaranteeing QoS of the first tunnel, a goal of guaranteeing control signaling between the terminal and the second network can be achieved.

In this embodiment of this disclosure, optionally, after establishment of the first tunnel is completed, or the third tunnel is modified and converted to the first tunnel, the performing a first related operation for a tunnel of a first network further includes at least one of the following:

transmitting control signaling between the terminal and the second network or data of the first IPsec tunnel via the first tunnel;

switching control signaling between the terminal and the second network or data of the first IPsec tunnel to the first tunnel for transmission; and establishing and/or saving an association between the first tunnel and the first IPsec tunnel;

and/or after establishment of the first tunnel is rejected, modification of the third tunnel is rejected, granting the first QoS information is rejected, and/or the first tunnel is released, the first related operation for a tunnel of a first network further includes at least one of the following: initiating a de-registration request to the second network, and turning into a de-registered state.

In this embodiment of this disclosure, optionally, the first tunnel or the third tunnel is a QoS flow.

In this embodiment of this disclosure, optionally, the first tunnel is a first QoS flow or a QoS flow in a first PDU session.

In this embodiment of this disclosure, optionally, the third tunnel is an existing QoS flow in a first PDU session.

In this embodiment of this disclosure, optionally, the first tunnel is a first QoS flow, and the making a request to the first network for establishing a first tunnel includes at least one of the following:

making a request to the first network for establishing a first QoS flow in a first PDU session; and transmitting to the first network a request for modifying a first PDU session or for establishing a first PDU session, where the request for modifying a first PDU session or for establishing a first PDU session contains QoS information of a first QoS flow requested to be established or first QoS information.

In this embodiment of this disclosure, optionally, the first tunnel is a first QoS flow, the third tunnel is an existing QoS flow in a first PDU session, and the making a request to the first network for modifying a third tunnel to a first tunnel includes at least one of the following:

making a request to the first network for modifying a third QoS flow in a first PDU session; and transmitting to the first network a request for modifying a first PDU session;

where the request for modifying a first PDU session contains QoS information of a third QoS flow requested to be modified.

In this embodiment of this disclosure, the first PDU session is a PDU session in the first network used for transmitting control signaling between the terminal and the second network.

In this embodiment of this disclosure, optionally, the first QoS information includes at least one of the following: a first QoS class indication, first priority information, indication information for requesting a separate bearer resource, and indication information of control signaling.

In this embodiment of this disclosure, optionally, the first QoS class indication information and/or the first priority is used for indicating a request for a separate radio bearer resource.

In this embodiment of this disclosure, optionally, the first QoS class indication information includes at least one of the following: an operator-specific QoS class indication; a non-standardized first QoS class indication, where the non-standardized first QoS class indication takes a value of 5 or 69; and a non-GBR QoS class indication. The non-standardized first QoS class indication may be a QFI (QoS flow identifier), a 5QI or a QCI (QoS class identifier).

In this embodiment of this disclosure, optionally, the first priority information includes: the first priority information taking a value of 5.

In this embodiment of this disclosure, optionally, the IPsec tunnel is an IPsec security association (SA).

In this embodiment of this disclosure, optionally, the first IPsec tunnel is referred to as one of the following: signaling IPsec SA, IPsec master SA, and IPsec SA for transmitting control signaling.

In this embodiment of this disclosure, optionally, the information of the first IPsec tunnel includes at least one of the following: an identifier of the first IPsec tunnel, a protocol field indicating encapsulating security payload (ESP), a security parameter index of the first IPsec tunnel, and information of the second network associated with the first IPsec tunnel.

In an embodiment of this disclosure, the first QoS flow is a non-default QoS flow, meaning that the first QoS flow is not a default QoS flow.

In this embodiment of this disclosure, optionally, the obtaining information of a first IPsec tunnel includes: obtaining the information of the first IPsec tunnel from a proxy network element. The proxy network element is a proxy of a first network for interacting with the second network, for example an N3IWF.

In an implementation, the first tunnel may have only one QoS rule, and the QoS rule contains only one piece of packet filter information. The packet filter information may be the information of the first IPsec tunnel. The first tunnel may be used only for transmitting data of the first IPsec tunnel.

According to the embodiments of this disclosure, after obtaining information of a first IPsec tunnel used for transmitting control signaling between a terminal and a second network, a terminal performs a related operation for a tunnel of a first network based on the information of the first IPsec tunnel, so that data of the first IPsec tunnel is properly mapped to a tunnel of the first network, and transmission of control signaling between the terminal and the second network is guaranteed in the first network. After establishment of the first tunnel is completed, when needing to transmit data of the first IPsec tunnel, the terminal maps the first IPsec tunnel to data of the first tunnel based on uplink packet filter information in QoS information of the first tunnel. Next, the data of the first tunnel is mapped to data of a first DRB and transmitted to a RAN network element. Upon receiving data of the first IPsec tunnel, the UPF of the first network maps the first IPsec tunnel to data of the first tunnel based on downlink packet filter information in QoS information of the tunnel. Next, the data of the first tunnel is transmitted to the RAN network element. The RAN network element maps the data of the first tunnel to data of the first DRB. The RAN network element may perform radio resource scheduling for the first DRB based on the QoS information of the first tunnel. It is easy to understand that an effect of guaranteeing control signaling between the terminal and the second network can be achieved in the first network.

The foregoing embodiment describes a method in a first network for guaranteeing transmission of control signaling between a terminal and a second network, and the following describes a method in a first network for guaranteeing transmission of user plane data between a terminal and a second network.

Figure 8:
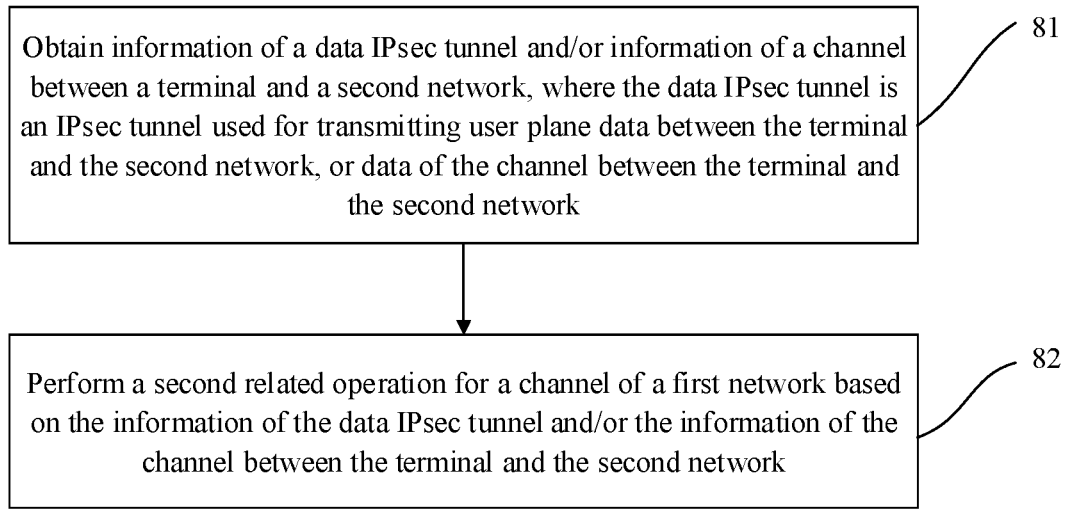
FIG. 8 is a schematic flowchart of a method for guaranteeing data transmission according to another embodiment of this disclosure.

Referring to FIG. 8, an embodiment of this disclosure further provides a method for guaranteeing data transmission, applied to a terminal, where the method includes:

Step 81: Obtain information of a data IPsec tunnel and/or information of a tunnel between the terminal and a second network, where the data IPsec tunnel is an IPsec tunnel used for transmitting user plane data between the terminal and the second network, or data of the tunnel between the terminal and the second network.

Step 82: Perform a second related operation for a tunnel of a first network based on the information of the data IPsec tunnel and/or the information of the tunnel between the terminal and the second network.

In this embodiment of this disclosure, a tunnel between the terminal and the second network may also be referred to as a tunnel of the second network.

In this embodiment of this disclosure, a terminal may obtain information of a data IPsec tunnel used for transmitting user plane data between the terminal and a second network, and/or information of a tunnel between the terminal and a second network, and perform a related operation for a tunnel of a first network based on the obtained information, so that the data IPsec tunnel is properly mapped to a tunnel of the first network, and transmission of user plane data of the second network is guaranteed in the first network.

In an implementation, when a preset condition is met, the second related operation for a tunnel of the first network is performed based on the information of the data IPsec tunnel and/or information of a tunnel between the terminal and the second network. The preset condition includes at least one of the following:

related signaling for establishing a data IPsec tunnel and information about a newly established data IPsec tunnel are received from a proxy network element; and related information about modification of a data IPsec tunnel and information about a modified data IPsec tunnel are received from a proxy network element.

In an implementation, the data IPsec tunnel is an IPsec tunnel that is newly established or modified. In an implementation, modifying an IPsec tunnel is implemented by removing the IPsec tunnel and re-establishing the IPsec tunnel. For example, in a case that the proxy network element determines to modify an IPsec tunnel associated with a tunnel between a terminal and a second network, the proxy network element may remove the IPsec tunnel and then re-establish the IPsec tunnel. Upon re-establishment of the IPsec tunnel, the terminal may receive information about the tunnel, associated with the IPsec tunnel, between the terminal and the second network (for example, an associated QoS flow identifier and a PDU session identifier).

The proxy network element is a proxy of a first network for interacting with the second network, for example an N3IWF.

In this embodiment of this disclosure, optionally, the performing a second related operation for a tunnel of a first network includes at least one of the following:

making a request to the first network for establishing a second tunnel;

making a request to the first network for modifying a fourth tunnel;

transmitting QoS information of a second tunnel to the first network;

transmitting modified QoS information of a fourth tunnel to the first network;

transmitting second QoS information to the first network, where in an implementation, when UE requests to establish second QoS information, no QFI (QoS flow identifier) is provided, and when the second QoS information is granted by the first network, a QFI is allocated to the second QoS information, in which case, the second QoS information becomes QoS information of a QoS flow indicated by the allocated QFI;

requesting the first network to provide one standalone second tunnel or separate second QoS information for each data IPsec tunnel (which may be understood as requesting different second tunnels or second QoS information for different data IPsec tunnels);

requesting the first network to provide a standalone second tunnel or separate second QoS information for the data IPsec tunnel;

requesting the first network to provide one second tunnel for a plurality of data IPsec tunnels, or to map data of a plurality of data IPsec tunnels to one second tunnel or one piece of second QoS information;

modifying a fourth tunnel for the data IPsec tunnel;

mapping the data IPsec tunnel to a fourth tunnel;

setting uplink and/or downlink packet filter information in QoS information of a second tunnel to the information of the data IPsec tunnel;

setting uplink and/or downlink packet filter information in second QoS information to the information of the data IPsec tunnel;

modifying uplink and/or downlink packet filter information in QoS information of a fourth tunnel to the information of the data IPsec tunnel, or adding the information of the data IPsec tunnel to uplink and/or downlink packet filter information in QoS information of a fourth tunnel;

setting a traffic descriptor component type identifier in QoS information of a second tunnel to a security parameter index type;

setting a traffic descriptor component type identifier in second QoS information to a security parameter index type;

modifying a traffic descriptor component type identifier in QoS information of a fourth tunnel to a security parameter index type;

setting QoS parameter information in QoS information of a second tunnel to QoS parameter information corresponding to a tunnel, associated with the data IPsec tunnel, between the terminal and the second network;

setting QoS parameter information in second QoS information to QoS flow description information corresponding to a tunnel, associated with the data IPsec tunnel, between the terminal and the second network;

modifying QoS parameter information in QoS information of a fourth tunnel to QoS parameter information corresponding to a tunnel, associated with the data IPsec tunnel, between the terminal and the second network, or adding such QoS parameter information to QoS parameter information in QoS information of a fourth tunnel; and transmitting the information of the data IPsec tunnel to the first network, where the second tunnel is used for transmitting data of the data IPsec tunnel, or used for transmitting data of the tunnel between the terminal and the second network, or used for transmitting user plane data between the terminal and the second network;

the fourth tunnel is a tunnel already established for the terminal and the first network; and the second QoS information is new QoS information.

In an implementation, second QoS information may include no tunnel identifier (for example, QoS flow identifier). No tunnel identifier (for example, QoS flow identifier) is provided when the terminal makes a request to the first network for second QoS information (for example, a QoS rule and/or QoS flow description). After receiving the second QoS information, the first network (for example, an SMF of the first network) allocates a tunnel identifier (for example, a QoS flow identifier) to the second QoS information. The terminal receives granted second QoS information from the first network, and the granted second QoS information includes the allocated tunnel identifier (for example, the QoS flow identifier). In this case, the second QoS information becomes QoS information of a tunnel (for example, a QoS flow) indicated by the allocated tunnel identifier.

In this embodiment of this disclosure, optionally, the QoS information of a second tunnel, and/or the second QoS information includes at least one of the following: uplink and/or downlink packet filter information, where the uplink and/or downlink packet filter information is the information of the data IPsec tunnel; a traffic descriptor component type identifier, where the traffic descriptor component type identifier is a security parameter index type; and QoS parameter information, where the QoS parameter information is QoS parameter information corresponding to the tunnel, associated with the data IPsec tunnel, between the terminal and the second network;

and/or the modified QoS information of a fourth tunnel includes at least one of the following: uplink packet filter information, where the uplink packet filter information is the information of the data IPsec tunnel or contains the information of the data IPsec tunnel; downlink packet filter information, where the downlink packet filter information is or contains the information of the data IPsec tunnel; a traffic descriptor component type identifier, where the traffic descriptor component type identifier is a security parameter index type; and QoS parameter information, where the QoS parameter information is or contains QoS parameter information corresponding to the tunnel, associated with the data IPsec tunnel, between the terminal and the second network.

In an implementation, in a case that the performing a second related operation for a tunnel of a first network includes setting uplink and/or downlink packet filter information of a second tunnel to the information of the data IPsec tunnel, if the second tunnel is associated with a plurality of data IPsec tunnels, the set packet filter information of the second tunnel is information of the plurality of associated data IPsec tunnels.

In an implementation, optionally, after establishment of the second tunnel is completed, granted QoS information sent by the first network is received containing second QoS information, second QoS information is granted by the first network, and/or transmission from the first network for granting establishment of the first tunnel is received, the performing a second related operation for a tunnel of a first network further includes at least one of the following:

transmitting, via the second tunnel, data of the data IPsec tunnel, data of the tunnel between the terminal and the second network, or user plane data between the terminal and the second network;

switching data of the data IPsec tunnel, data of the tunnel between the terminal and the second network, or user plane data between the terminal and the second network to the second tunnel for transmission; and establishing and/or saving an association between the second tunnel and the data IPsec tunnel;

and/or after modification of the fourth tunnel is completed, granted QoS information sent by the first network is received containing third QoS information, third QoS information is granted by the first network, and/or transmission from the first network for granting modification of a third tunnel is received, the performing a second related operation for a tunnel of a first network further includes at least one of the following:

transmitting data of the data IPsec tunnel via the fourth tunnel;

switching data of the data IPsec tunnel to the fourth tunnel for transmission; and updating an association between the fourth tunnel and an IPsec tunnel, where the IPsec tunnel associated with the fourth tunnel includes a data IPsec tunnel;

and/or after establishment of the second tunnel is rejected, modification of the fourth tunnel is rejected, granting the second QoS information is rejected, and/or the second tunnel is released, the second related operation for a tunnel of a first network further includes at least one of the following: making a request to the second network for releasing a tunnel, associated with a second IPsec tunnel, between the terminal and the second network, and returning to the second network that the tunnel, associated with a second IPsec tunnel, between the terminal and the second network fails to be established.

In an implementation, optionally, when a first condition is met, the first network is requested to provide a standalone second tunnel for the data IPsec tunnel, or the first network is requested to provide separate second QoS information for the data IPsec tunnel, where the first condition includes at least one of the following:

the tunnel, associated with the data IPsec tunnel, between the terminal and the second network is a GBR tunnel or contains GBR related QoS parameter information;

a QoS class indication of the tunnel, associated with the data IPsec tunnel, between the terminal and the second network takes a value of N, where N is one of the following: 1, 5, 69, and 70;

the tunnel, associated with the data IPsec tunnel, between the terminal and the second network is a tunnel carrying voice traffic;

the tunnel, associated with the data IPsec tunnel, between the terminal and the second network is a tunnel carrying emergency traffic;

the tunnel, associated with the data IPsec tunnel, between the terminal and the second network is a tunnel carrying high priority traffic;

the obtained information of the tunnel between the terminal and the second network contains indication information of a separate bearer resource;

QoS information of the fourth tunnel is different from QoS information of the tunnel, associated with the data IPsec tunnel, between the terminal and the second network;

a QoS class indication of the fourth tunnel is different from a QoS class indication of the tunnel, associated with the data IPsec tunnel, between the terminal and the second network;

GBR related QoS parameter information of the fourth tunnel is different from GBR related QoS parameter information of the tunnel, associated with the data IPsec tunnel, between the terminal and the second network;

a priority of the fourth tunnel is different from a priority of the tunnel, associated with the data IPsec tunnel, between the terminal and the second network;

no fourth tunnel is a non-GBR tunnel, and the tunnel, associated with the data IPsec tunnel, between the terminal and the second network is a non-GBR tunnel; and uplink and/or downlink packet filter information of the fourth tunnel contains no information of the data IPsec tunnel;

and/or when a second condition is met, the first network is requested to provide one second tunnel for a plurality of data IPsec tunnels, the first network is requested to provide one piece of second QoS information for a plurality of data IPsec tunnels, to map data of a plurality of data IPsec tunnels to one second tunnel, or to map data of a plurality of data IPsec tunnels to one piece of second QoS information, where the second condition includes at least one of the following:

the tunnel, associated with the data IPsec tunnel, between the terminal and the second network is a non-GBR tunnel or contains no GBR related QoS parameter; and the obtained information of the tunnel between the terminal and the second network contains no indication information of a separate bearer resource, or contains indication information that no separate bearer resource is needed;

and/or when a third condition is met, the fourth tunnel is modified for the data IPsec tunnel, where the third condition includes at least one of the following:

the tunnel, associated with the data IPsec tunnel, between the terminal and the second network is a non-GBR tunnel;

the obtained information of the tunnel between the terminal and the second network contains no indication information of a separate bearer resource, or contains indication information that no separate bearer resource is needed;

QoS information of the fourth tunnel is different from QoS information of the tunnel, associated with the data IPsec tunnel, between the terminal and the second network;

a QoS class indication of the fourth tunnel is the same as a QoS class indication of the tunnel, associated with the data IPsec tunnel, between the terminal and the second network;

GBR related QoS parameter information of the fourth tunnel is different from GBR related QoS parameter information of the tunnel, associated with the data IPsec tunnel, between the terminal and the second network;

a priority of the fourth tunnel is different from a priority of the tunnel, associated with the data IPsec tunnel, between the terminal and the second network;

the existing fourth tunnel is a non-GBR tunnel, and the tunnel, associated with the data IPsec tunnel, between the terminal and the second network is a non-GBR tunnel; and uplink and/or downlink packet filter information of the fourth tunnel contains no information of the data IPsec tunnel, and in this case, it is sufficient to simply modify the fourth tunnel to contain information of the data IPsec tunnel;

and/or when a fourth condition is met, the data IPsec tunnel is mapped to the fourth tunnel, where the fourth condition includes at least one of the following:

QoS information of the fourth tunnel is the same as QoS information of the tunnel, associated with the data IPsec tunnel, between the terminal and the second network;

a QoS parameter requirement of the fourth tunnel is higher than or the same as a QoS parameter requirement of the tunnel, associated with the data IPsec tunnel, between the terminal and the second network;

a QoS class indication of the fourth tunnel is higher than or the same as a QoS class indication of the tunnel, associated with the data IPsec tunnel, between the terminal and the second network;

the existing fourth tunnel is a non-GBR tunnel, and a tunnel, associated with the data IPsec tunnel, between the terminal and the second network is a non-GBR tunnel; and uplink and/or downlink packet filter information of the fourth tunnel contains information of the data IPsec tunnel.

In this embodiment of this disclosure, optionally, when the data IPsec tunnel is associated with one tunnel between the terminal and the second network, the setting QoS parameter information of a second tunnel to QoS parameter information corresponding to a tunnel, associated with the data IPsec tunnel, between the terminal and the second network includes at least one of the following:

setting or modifying a QoS class indication of the second tunnel to a QoS class indication corresponding to the tunnel, associated with the data IPsec tunnel, between the terminal and the second network;

setting or modifying a priority of the second tunnel to a priority of the tunnel, associated with the data IPsec tunnel, between the terminal and the second network;

setting or modifying a packet delay budget of the second tunnel to a packet delay budget of the tunnel, associated with the data IPsec tunnel, between the terminal and the second network;

setting or modifying a packet error rate of the second tunnel to a packet error rate of the tunnel, associated with the data IPsec tunnel, between the terminal and the second network;

setting or modifying a default maximum data burst volume of the second tunnel to a default maximum data burst volume of the tunnel, associated with the data IPsec tunnel, between the terminal and the second network;

setting or modifying a default averaging window of the second tunnel to a default averaging window of the tunnel, associated with the data IPsec tunnel, between the terminal and the second network;

when no averaging window is present for the tunnel, associated with the data IPsec tunnel, between the terminal and the second network, setting or modifying the second tunnel to have no default averaging window;

setting or modifying an uplink GBR or GFBR of the second tunnel to an uplink GBR or GFBR of the tunnel, associated with the data IPsec tunnel, between the terminal and the second network;

setting or modifying a downlink GBR or GFBR of the second tunnel to a downlink GBR or GFBR of the tunnel, associated with the data IPsec tunnel, between the terminal and the second network;

setting or modifying an uplink MBR or MFBR of the second tunnel to an uplink MBR or MFBR of the tunnel, associated with the data IPsec tunnel, between the terminal and the second network; and setting or modifying a downlink MBR or MFBR of the second tunnel to a downlink MBR or MFBR of the tunnel, associated with the data IPsec tunnel, between the terminal and the second network;

and/or when a multi-tunnel condition is met, the setting QoS parameter information of a second tunnel to QoS parameter information corresponding to a tunnel, associated with the data IPsec tunnel, between the terminal and the second network includes at least one of the following:

setting or modifying QoS parameter information of the second tunnel to QoS parameter information having a highest QoS requirement in QoS parameter information corresponding to the tunnels, associated with the data IPsec tunnel, between the terminal and the second network;

setting or modifying a QoS class indication of the second tunnel to a QoS class indication having a highest priority in QoS class indications corresponding to the tunnels, associated with the data IPsec tunnel, between the terminal and the second network;

when there is no standardized QoS class indication corresponding to a combination of the following QoS parameter information of the second tunnel: a priority, a packet delay budget, a packet error rate, a maximum data burst volume, whether it is GBR, and/or whether a default averaging window requirement is set, setting or modifying a QoS class indication of the second tunnel to be a non-standardized QoS class indication or contain no QoS class indication;

when there is no standardized QoS class indication corresponding to QoS parameter information of the second tunnel except for a QoS class indication, setting or modifying the QoS class indication of the second tunnel to be a non-standardized QoS class indication or contain no QoS class indication;

setting or modifying a priority of the second tunnel to a priority with a highest value in priorities corresponding to the tunnels, associated with the data IPsec tunnel, between the terminal and the second network;

setting or modifying a packet delay budget of the second tunnel to a packet delay budget with a lowest value in packet delay budgets corresponding to the tunnels, associated with the data IPsec tunnel, between the terminal and the second network;

setting or modifying a packet error rate of the second tunnel to a packet error rate with a lowest value in packet error rates corresponding to the tunnels, associated with the data IPsec tunnel, between the terminal and the second network; and setting or modifying a default maximum data burst volume of the second tunnel to a default maximum data burst volume with a largest value in default maximum data burst volumes corresponding to the tunnels, associated with the data IPsec tunnel, between the terminal and the second network;

when a tunnel requiring an averaging window is present in the tunnels, associated with the data IPsec tunnel, between the terminal and the second network, setting or modifying the second tunnel to have a default averaging window requirement;

when a GBR tunnel is present in the tunnels, associated with the data IPsec tunnel, between the terminal and the second network, performing at least one of the following:

setting or modifying the second tunnel to a GBR tunnel;

setting or modifying a GFBR or GBR of the second tunnel to a largest value in GFBRs or GBRs corresponding to the plurality of tunnels, associated with the data IPsec tunnel, of the second network;

setting or modifying an MFBR or MBR of the second tunnel to a largest value in MFBRs or MBRs corresponding to the plurality of tunnels, associated with the data IPsec tunnel, of the second network;

setting or modifying an uplink GFBR or GBR of the second tunnel to a largest value in uplink GFBRs or GBRs corresponding to the plurality of tunnels, associated with the data IPsec tunnel, of the second network;

setting or modifying an uplink MFBR or MBR of the second tunnel to a largest value in uplink MFBRs or MBRs corresponding to the plurality of tunnels, associated with the data IPsec tunnel, of the second network;

setting or modifying a downlink GFBR or GBR of the second tunnel to a largest value in downlink GFBRs corresponding to the plurality of tunnels, associated with the data IPsec tunnel, of the second network; and setting or modifying a downlink MFBR or MBR of the second tunnel to a largest value in downlink MFBRs corresponding to the plurality of tunnels, associated with the data IPsec tunnel, of the second network;

when the data IPsec tunnel is associated with a tunnel having a QoS class indication of N between the terminal and the second network, setting or modifying a QoS class indication of the second tunnel to N, or modifying a QoS class indication of the fourth tunnel to N, where a value of N is obtained from the first network or includes one of the following: 1, 5, 69, and 70;

when the data IPsec tunnel is associated with a tunnel carrying voice traffic between the terminal and the second network, setting or modifying QoS parameter information of the second tunnel to QoS parameter information corresponding to voice traffic;

when the data IPsec tunnel is associated with a tunnel carrying emergency traffic between the terminal and the second network, setting or modifying QoS parameter information of the second tunnel to QoS parameter information corresponding to emergency traffic;

when the data IPsec tunnel is associated with a tunnel carrying high priority traffic between the terminal and the second network, setting or modifying QoS parameter information of the second tunnel to QoS parameter information corresponding to high priority traffic;

when a standardized QoS class indication is present for a QoS flow of the second network contained in the data IPsec tunnel, setting or modifying a QoS class indication of the second tunnel to the standardized QoS class indication; and setting QoS parameter information of the second tunnel to QoS parameter information corresponding to a tunnel, newly associated with the data IPsec tunnel, between the terminal and the second network, where the multi-tunnel condition includes at least one of the following:

the data IPsec tunnel is associated with a plurality of tunnels of the second network;

the data IPsec tunnel is newly associated with a tunnel between the terminal and the second network, and the newly associated tunnel between the terminal and the second network has a highest QoS requirement in the tunnels, associated with the data IPsec tunnel, between the terminal and the second network; and the data IPsec tunnel removes association with a tunnel between the terminal and the second network, and the association-removed tunnel between the terminal and the second network has a higher QoS requirement than the tunnels, associated with the data IPsec tunnel, between the terminal and the second network.

In this embodiment of this disclosure, optionally, when the data IPsec tunnel is associated with a plurality of tunnels of the second network, the setting QoS parameter information of a fourth tunnel to QoS parameter information corresponding to a tunnel, associated with the data IPsec tunnel, between the terminal and the second network includes at least one of the following:

modifying the QoS parameter information of the fourth tunnel to QoS parameter information having a highest QoS requirement in QoS parameter information corresponding to the tunnels, associated with the data IPsec tunnel, between the terminal and the second network;

modifying a QoS class indication of the fourth tunnel to a QoS class indication having a highest priority in QoS class indications corresponding to the tunnels, associated with the data IPsec tunnel, between the terminal and the second network;

when there is no standardized QoS class indication corresponding to a combination of the following QoS parameter information of the fourth tunnel: a priority, a packet delay budget, a packet error rate, a maximum data burst volume, whether a GBR is set, and/or whether a default averaging window requirement is set, modifying a QoS class indication of the fourth tunnel to be a non-standardized QoS class indication or contain no QoS class indication;

when there is no standardized QoS class indication corresponding to QoS parameter information of the fourth tunnel except for a QoS class indication, modifying the QoS class indication of the fourth tunnel to be a non-standardized QoS class indication or contain no QoS class indication;

modifying a priority of the fourth tunnel to a priority with a highest value in priorities corresponding to the tunnels, associated with the data IPsec tunnel, between the terminal and the second network;

modifying a packet delay budget of the fourth tunnel to a packet delay budget with a lowest value in packet delay budgets corresponding to the tunnels, associated with the data IPsec tunnel, between the terminal and the second network;

modifying a packet error rate of the fourth tunnel to a packet error rate with a lowest value in packet error rates corresponding to the tunnels, associated with the data IPsec tunnel, between the terminal and the second network;

modifying a default maximum data burst volume of the fourth tunnel to a default maximum data burst volume with a largest value in default maximum data burst volumes corresponding to the tunnels, associated with the data IPsec tunnel, between the terminal and the second network; and when a tunnel requiring an averaging window is present in the tunnels, associated with the data IPsec tunnel, between the terminal and the second network, modifying the fourth tunnel to have a default averaging window requirement;

when a GBR tunnel is present in the tunnels, associated with the data IPsec tunnel, between the terminal and the second network, performing at least one of the following:

modifying the fourth tunnel to a GBR tunnel;

modifying a GFBR or GBR of the fourth tunnel to a largest value in GFBRs or GBRs corresponding to the plurality of tunnels, associated with the data IPsec tunnel, of the second network;

modifying an MFBR or MBR of the fourth tunnel to a largest value in MFBRs or MBRs corresponding to the plurality of tunnels, associated with the data IPsec tunnel, of the second network;

modifying an uplink GFBR or GBR of the fourth tunnel to a largest value in uplink GFBRs or GBRs corresponding to the plurality of tunnels, associated with the data IPsec tunnel, of the second network;

modifying an uplink MFBR or MBR of the fourth tunnel to a largest value in uplink MFBRs or MBRs corresponding to the plurality of tunnels, associated with the data IPsec tunnel, of the second network;

modifying a downlink GFBR or GBR of the fourth tunnel to a largest value in downlink GFBRs corresponding to the plurality of tunnels, associated with the data IPsec tunnel, of the second network; and modifying a downlink MFBR or MBR of the fourth tunnel to a largest value in downlink MFBRs corresponding to the plurality of tunnels, associated with the data IPsec tunnel, of the second network;

when the data IPsec tunnel is associated with a tunnel having a QoS class indication of N between the terminal and the second network, modifying a QoS class indication of the fourth tunnel to N, where a value of N is obtained from the first network or includes one of the following: 1, 5, 69, and 70;

when the data IPsec tunnel is associated with a tunnel carrying voice traffic between the terminal and the second network, modifying QoS parameter information of the fourth tunnel to QoS parameter information corresponding to voice traffic;

when the data IPsec tunnel is associated with a tunnel carrying emergency traffic between the terminal and the second network, modifying QoS parameter information of the fourth tunnel to QoS parameter information corresponding to emergency traffic;

when the data IPsec tunnel is associated with a tunnel carrying high priority traffic between the terminal and the second network, modifying QoS parameter information of the fourth tunnel to QoS parameter information corresponding to high priority traffic; and when a standardized QoS class indication is present for a QoS flow of the second network contained in the data IPsec tunnel, modifying a QoS class indication of the fourth tunnel to the standardized QoS class indication.

In this embodiment of this disclosure, optionally, the second tunnel and/or the fourth tunnel is a QoS flow.

In this embodiment of this disclosure, optionally, the second tunnel is a second QoS flow or a QoS flow in a first PDU session.

In this embodiment of this disclosure, optionally, the fourth tunnel is an existing QoS flow in a first PDU session.

In this embodiment of this disclosure, optionally, a tunnel between the terminal and the second network is a QoS flow between the terminal and the second network.

In this embodiment of this disclosure, optionally, a tunnel between the terminal and the second network is a QoS flow of the second network.

In this embodiment of this disclosure, optionally, the second tunnel is a second QoS flow, and the making a request to the first network for establishing a second tunnel includes at least one of the following:

making a request to the first network for adding a second QoS flow in a first PDU session; and transmitting to the first network a request for modifying a first PDU session or for establishing a first PDU session, the request for modifying a first PDU session or for establishing a first PDU session containing QoS information of a second QoS flow requested to be established.

In this embodiment of this disclosure, optionally, the second tunnel is a second QoS flow, the fourth tunnel is an existing QoS flow in a first PDU session, and the making a request to the first network for modifying a fourth tunnel to a first tunnel includes at least one of the following:

making a request to the first network for modifying a fourth QoS flow in a first PDU session; and transmitting to the first network a request for modifying a first PDU session, where the request for modifying a first PDU session contains QoS information of a fourth QoS flow requested to be modified, and the first PDU session is a PDU session in the first network used for transmitting information between the terminal and the second network.

In this embodiment of this disclosure, optionally, the IPsec tunnel is an IPsec SA.

In this embodiment of this disclosure, optionally, the data IPsec tunnel is referred to as one of the following: data IPsec SA, IPsec child SA, IPsec SA for transmitting user plane data, and IPsec SA for transmitting QoS flow data.

In this embodiment of this disclosure, optionally, the information of the data IPsec tunnel includes at least one of the following: an identifier of the data IPsec tunnel, a protocol field indicating ESP, a security parameter index of the data IPsec tunnel, and identifier information of a tunnel, associated with the data IPsec tunnel, between the terminal and the second network.

In this embodiment of this disclosure, optionally, the information of the tunnel between the terminal and the second network includes at least one of the following: an identifier of the data IPsec tunnel associated with the tunnel between the terminal and the second network, a security parameter index of the data IPsec tunnel associated with the tunnel between the terminal and the second network (which may also be referred to as the tunnel of the second network), a new tunnel between the terminal and the second network, a removed tunnel between the terminal and the second network, QoS parameter information of the tunnel between the terminal and the second network, indication information of a separate bearer resource, and indication information that no separate bearer resource is needed.

In an implementation, the identifier information of a tunnel, associated with the data IPsec tunnel, between the terminal and the second network includes at least one of the following: a QoS flow identifier, and an identifier of a PDU session to which a QoS flow belongs.

The QoS information of the tunnel includes at least one of the following: whether GBR or non-GBR, a QoS class indication (5QI or QFI), a priority, a packet delay budget, a packet error rate, a default maximum data volume, a default averaging window, an uplink GBR, a downlink GBR, an uplink MBR, a downlink MBR, an uplink GFBR, a downlink GFBR, an uplink MFBR, a downlink MFBR, a traffic descriptor component type identifier, and packet filter information.

In this embodiment of this disclosure, optionally, the obtaining information of a data IPsec tunnel and/or information of a tunnel between the terminal and a second network includes:

obtaining the information of the data IPsec tunnel from a proxy network element and/or obtaining the information of the tunnel between the terminal and the second network from the second network.

In an implementation, the second QoS flow is a non-default QoS flow.

In an implementation, the second tunnel may have only one QoS rule, and the QoS rule contains only one piece of packet filter information. The packet filter information may be the information of the data IPsec tunnel. The second tunnel may be used only for transmitting data of the data IPsec tunnel.

In this embodiment of this disclosure, a terminal may obtain information of a data IPsec tunnel used for transmitting user plane data between the terminal and a second network, and/or information of a tunnel between the terminal and a second network, and perform a related operation for a tunnel of a first network based on the obtained information, so that the data IPsec tunnel is properly mapped to a tunnel of the first network, and transmission of user plane data of the second network is guaranteed in the first network. After establishment of the second tunnel is completed, when needing to transmit data of the data IPsec tunnel, the terminal maps the second IPsec tunnel to data of the second tunnel based on uplink packet filter information in QoS information of the second tunnel. Next, data of the second QoS flow is mapped to data of a second DRB and transmitted to a RAN network element. Upon receiving data of the data IPsec tunnel, a UPF of the first network maps the second IPsec tunnel to data of the second tunnel based on downlink packet filter information in QoS information of the second tunnel. Next, the data of the second tunnel is transmitted to the RAN network element. The RAN network element maps the data of the second tunnel to data of the second DRB. The RAN network element may perform radio resource scheduling for the second DRB based on the QoS information of the second tunnel. It is easy to understand that an effect of guaranteeing data, especially data of important traffic, between the terminal and the second network can be achieved in the first network.

Figure 9:
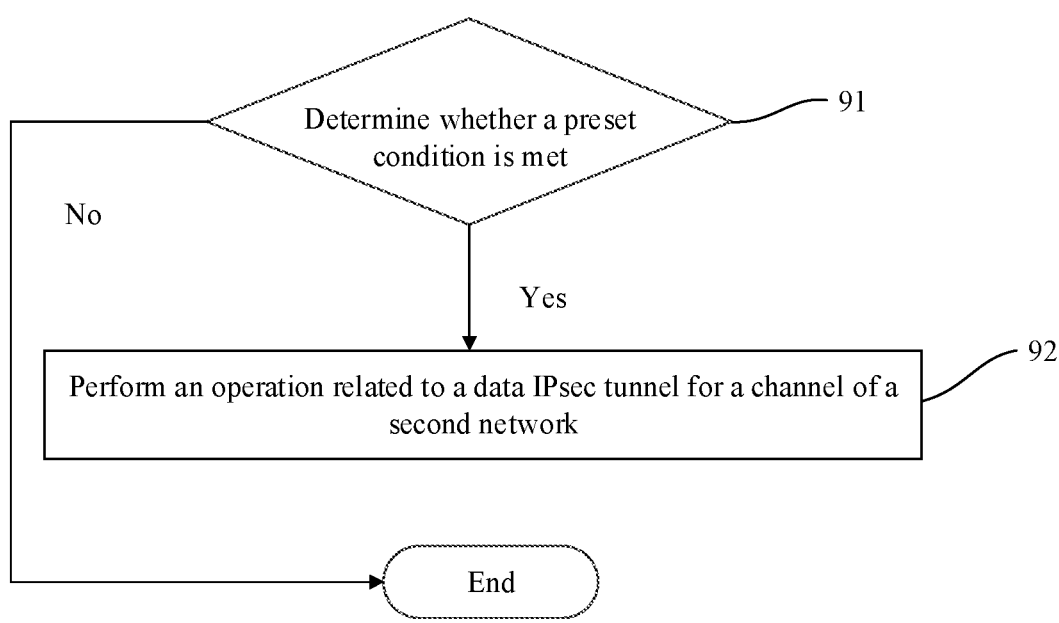
FIG. 9 is a schematic flowchart of a method for guaranteeing data transmission according to a yet another embodiment of this disclosure.

Referring to FIG. 9, an embodiment of this disclosure further provides a method for guaranteeing data transmission, applied to a proxy network element, where the method includes:

Step 91: Determine whether a preset condition is met, and if yes, perform step 92, or otherwise, end the procedure.

Step 92: Perform an operation related to a data IPsec tunnel for a tunnel of a second network when it is determined that the preset condition is met.

The proxy network element is a proxy of a first network for interacting with the second network.

In this embodiment of this disclosure, the proxy network element may perform an operation related to a data IPsec tunnel for a tunnel of the second network, thus implementing a reasonable mapping from tunnels of the second network to data IPsec tunnels to guarantee user plane data of the second network in the first network.

In some embodiments of this disclosure, the data IPsec tunnel is associated with a tunnel between the terminal and a second network, or the data IPsec tunnel is an IPsec tunnel used for transmitting data of a tunnel of the second network.

In this embodiment of this disclosure, optionally, the preset condition includes at least one of the following:

a request for establishing a tunnel between the terminal and the second network is received;

a request for modifying a tunnel between the terminal and the second network is received;

the proxy network element provides 3GPP access;

the first network is a 3GPP network; and an operation of mapping a tunnel between the terminal and the second network to an IPsec tunnel is performed.

In some embodiments of this disclosure, that a request for establishing a tunnel between the terminal and the second network is received is: a request for establishing or modifying a PDU session of the second network is received, or a request for establishing a QoS flow of the second network is received.

In some embodiments of this disclosure, that a request for modifying a tunnel between the terminal and the second network is received is: a request for modifying a PDU session of the second network is received, or a request for modifying of a QoS flow of the second network is received.

In this embodiment of this disclosure, optionally, the performing an operation related to a data IPsec tunnel for a tunnel of a second network includes at least one of the following:

determining a mapping from a tunnel between the terminal and the second network to a data IPsec tunnel;

establishing a standalone data IPsec tunnel for each tunnel between the terminal and the second network, or establishing different data IPsec tunnels for different tunnels between the terminal and the second network;

establishing a standalone data IPsec tunnel for each GBR tunnel between the terminal and the second network;

when a tunnel between the terminal and the second network meets a separate-bearer condition, establishing a standalone data IPsec tunnel for the tunnel between the terminal and the second network;

establishing a non-GBR-specific data IPsec tunnel for a tunnel between the terminal and the second network;

mapping one or more non-GBR tunnels between the terminal and the second network to one data IPsec tunnel;

establishing a priority-specific data IPsec tunnel for a tunnel between the terminal and the second network;

mapping one or more tunnels with a same priority between the terminal and the second network to one data IPsec tunnel;

establishing different data IPsec tunnels for tunnels with different priorities between the terminal and the second network, or mapping tunnels with different priorities between the terminal and the second network to different data IPsec tunnels;

establishing a data IPsec tunnel specific to GBR related QoS parameter information for a tunnel between the terminal and the second network;

establishing different data IPsec tunnels for tunnels with different GBR related QoS parameter information between the terminal and the second network, or mapping tunnels with different GBR related QoS parameter information between the terminal and the second network to different data IPsec tunnels;

mapping one or more tunnels with same GBR related QoS parameter information between the terminal and the second network to one data IPsec tunnel;

establishing a QoS class indication-specific data IPsec tunnel for a tunnel between the terminal and the second network;

establishing different data IPsec tunnels for tunnels with different QoS class indications between the terminal and the second network, or mapping tunnels with different QoS class indications between the terminal and the second network to different data IPsec tunnels;

mapping one or more tunnels with same QoS parameter information between the terminal and the second network to one data IPsec tunnel;

establishing a QoS class indication-specific data IPsec tunnel for a tunnel between the terminal and the second network;

establishing different data IPsec tunnels for tunnels with different QoS class indications between the terminal and the second network; and mapping a plurality of tunnels with same QoS information between the terminal and the second network to one data IPsec tunnel.

In this embodiment of this disclosure, when establishing an IPsec tunnel, the proxy network element may allocate a standalone IPsec tunnel for a tunnel (for example, a QoS flow) of the second network, such as a GBR QoS flow, a QoS flow of important high priority traffic (MPS), a QoS flow of voice traffic with 5QI=1, 5QI=5 or the like, so that the terminal can make a request to the first network for a standalone tunnel of the first network to achieve the effect of guaranteeing QoS.

The separate-bearer condition includes at least one of the following:

a tunnel between the terminal and the second network is a GBR tunnel;

a QoS class indication of a tunnel between the terminal and the second network takes a value of N, where N is one of the following: 1, 5, 69, and 70;

a tunnel between the terminal and the second network is a tunnel carrying voice traffic;

a tunnel between the terminal and the second network is a tunnel carrying emergency traffic;

a tunnel between the terminal and the second network is a tunnel carrying high priority traffic;

a received request for establishing a tunnel between the terminal and the second network carries indication information of a separate bearer resource;

QoS information of an existing tunnel, associated with the data IPsec tunnel, between the terminal and the second network is different from QoS information of a tunnel requested to be established between the terminal and the second network;

a QoS class indication of an existing tunnel, associated with the data IPsec tunnel, between the terminal and the second network is different from a QoS class indication of a tunnel requested to be established between the terminal and the second network;

GBR related QoS parameter information of an existing tunnel, associated with the data IPsec tunnel, between the terminal and the second network is different from GBR related QoS parameter information of a tunnel requested to be established between the terminal and the second network;

a priority of an existing tunnel, associated with the data IPsec tunnel, between the terminal and the second network is different from a priority of a tunnel requested to be established between the terminal and the second network; and no non-GBR tunnel is present in existing tunnels, associated with the data IPsec tunnel, between the terminal and the second network, and a tunnel requested to be established between the terminal and the second network is a non-GBR tunnel.

In this embodiment of this disclosure, optionally, the tunnel is a QoS flow.

In this embodiment of this disclosure, optionally, a tunnel between the terminal and the second network is a QoS flow of the second network.

In some embodiments of this disclosure, the QoS flows of the second network are QoS flows of one PDU session of the second network or QoS flows of a plurality of PDU sessions of the second network.

It is easy to understand that on the basis of the proxy network element controlling a reasonable mapping from QoS flows of the second network to data IPsec tunnels, the terminal can request the first network to provide different second QoS flows for different data IPsec tunnels, and then guaranteeing data between the terminal and the second network can be achieved in the first network. For a QoS flow of the second network carrying important traffic, the proxy network element can map the flow to a standalone data IPsec tunnel. The terminal can request a separate first QoS flow of the first network for the data IPsec tunnel, thus guaranteeing important data between the terminal and the second network in the first network. With the foregoing data transmission method according to this embodiment of this disclosure, a reasonable mapping from tunnels of a second network to IPsec tunnels of a proxy network element can be realized, and a reasonable mapping from IPsec tunnels of the proxy network element to tunnels of a first network can also be realized, and finally the effect of guaranteeing information of the second network or a second network service via the first network can be achieved.

Figure 10:
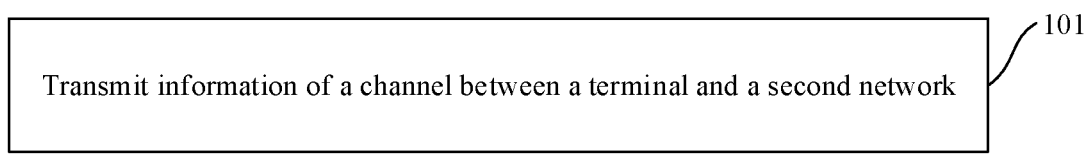
FIG. 10 is a schematic flowchart of a method for guaranteeing data transmission according to a further embodiment of this disclosure.

Referring to FIG. 10, an embodiment of this disclosure further provides a method for guaranteeing data transmission, applied to a communications network element, where the communications network element includes a communications network element of a first network or a communications network element of a second network, and the method includes:

Step 101: Transmit information of a tunnel between a terminal and a second network (which may be referred to as a tunnel of the second network), where the information of the tunnel between the terminal and the second network includes at least one of the following: an identifier of a data IPsec tunnel associated with the tunnel between the terminal and the second network, a security parameter index of a data IPsec tunnel associated with the tunnel between the terminal and the second network, a new tunnel between the terminal and the second network, a removed tunnel between the terminal and the second network, QoS parameter information of the tunnel between the terminal and the second network, indication information of a separate bearer resource, and indication information that no separate bearer resource is needed.

In this embodiment of this disclosure, the communications network element may be a communications network element in the first network, or a communications network element in the second network.

In this embodiment of this disclosure, optionally, the transmitting information of a tunnel between a terminal and a second network includes: transmitting the information of the tunnel between the terminal and the second network to at least one of the following: the terminal, and a proxy network element. The proxy network element is a proxy of a first network for interacting with the second network.

In this embodiment of this disclosure, optionally, when a preset condition is met, the information of the tunnel between the terminal and the second network is transmitted, where the preset condition includes: the terminal accesses the second network via a first network that is a 3GPP network.

It is easy to understand that on the basis of the communications network element providing to the terminal the information of the tunnel between the terminal and the second network, the terminal can request the first network to provide different second QoS flows for different data IPsec tunnels, and then guaranteeing data between the terminal and the second network can be achieved in the first network.

Figure 11:
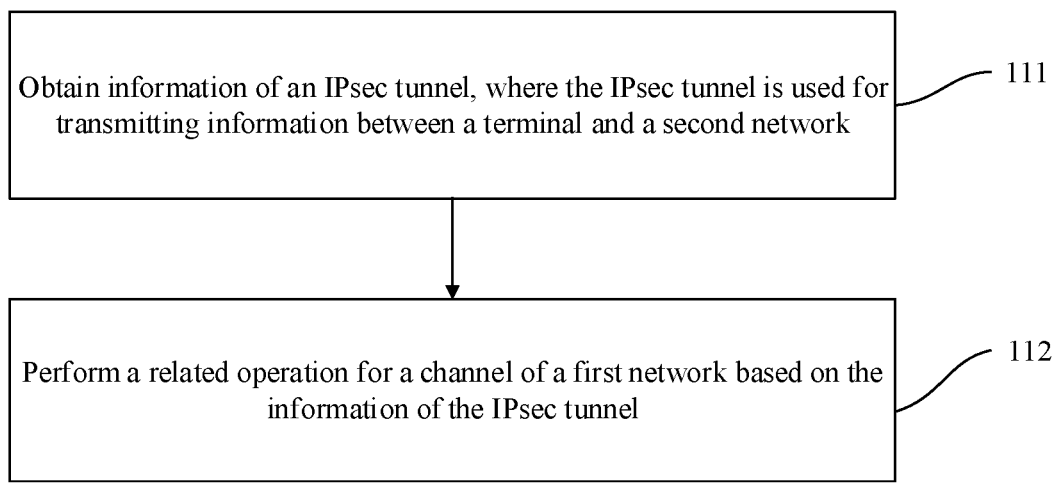
FIG. 11 is a schematic flowchart of a method for guaranteeing data transmission according to yet a further embodiment of this disclosure.

Referring to FIG. 11, this disclosure further provides a method for guaranteeing data transmission, applied to a terminal, where the method includes:

Step 111: Obtain information of an IPsec tunnel, where the IPsec tunnel is used for transmitting information between the terminal and a second network.

Step 112: Perform a related operation for a tunnel of a first network based on information of a first IPsec tunnel.

In this embodiment of this disclosure, optionally, the performing a related operation for a tunnel of a first network includes at least one of the following:

making a request to the first network for establishing or modifying a tunnel of the first network;

setting packet filter information of a tunnel of the first network to information of a first IPsec tunnel;

requesting the first network to provide one tunnel of the first network for each of IPsec tunnel, where the tunnel of the first network is used for transmitting data of the IPsec tunnel; and transmitting packet filter information of a tunnel of the first network to the first network.

In this embodiment of this disclosure, optionally, the information of the IPsec tunnel includes at least one of the following:

an identifier of the IPsec tunnel;

a protocol field indicating ESP; and a security parameter index of the IPsec tunnel.

In this embodiment of this disclosure, optionally, the information between the terminal and the second network includes at least one of the following:

control signaling between the terminal and the second network;

user plane data between the terminal and the second network;

data of a QoS flow between the terminal and the second network; and data of an IPsec tunnel for transmitting information between the terminal and the second network.

In this embodiment of this disclosure, optionally, when the IPsec tunnel is released, or the terminal is detached from the second network, the performing a related operation for a tunnel of a first network includes at least one of the following: making a request to the first network for releasing a tunnel for transmitting data of the IPsec tunnel; starting a first timer; after the first timer expires, making a request to the first network for releasing a tunnel for transmitting data of the IPsec tunnel; and in a case that a request for establishing a released IPsec tunnel is received before the first timer expires, stopping the first timer.

With the foregoing method for guaranteeing data transmission according to this embodiment of this disclosure, a reasonable mapping from tunnels of a second network to IPsec tunnels of a proxy network element can be realized, and a reasonable mapping from IPsec tunnels of the proxy network element to tunnels of a first network can also be realized, and finally the effect of guaranteeing information and/or a second network service through the first network can be achieved.

With reference to specific application scenarios, the following describes a method for guaranteeing data transmission in the embodiments of this disclosure.

With reference to specific application scenarios, the following describes a data transmission method in the embodiments of this disclosure.

Figure 12A:
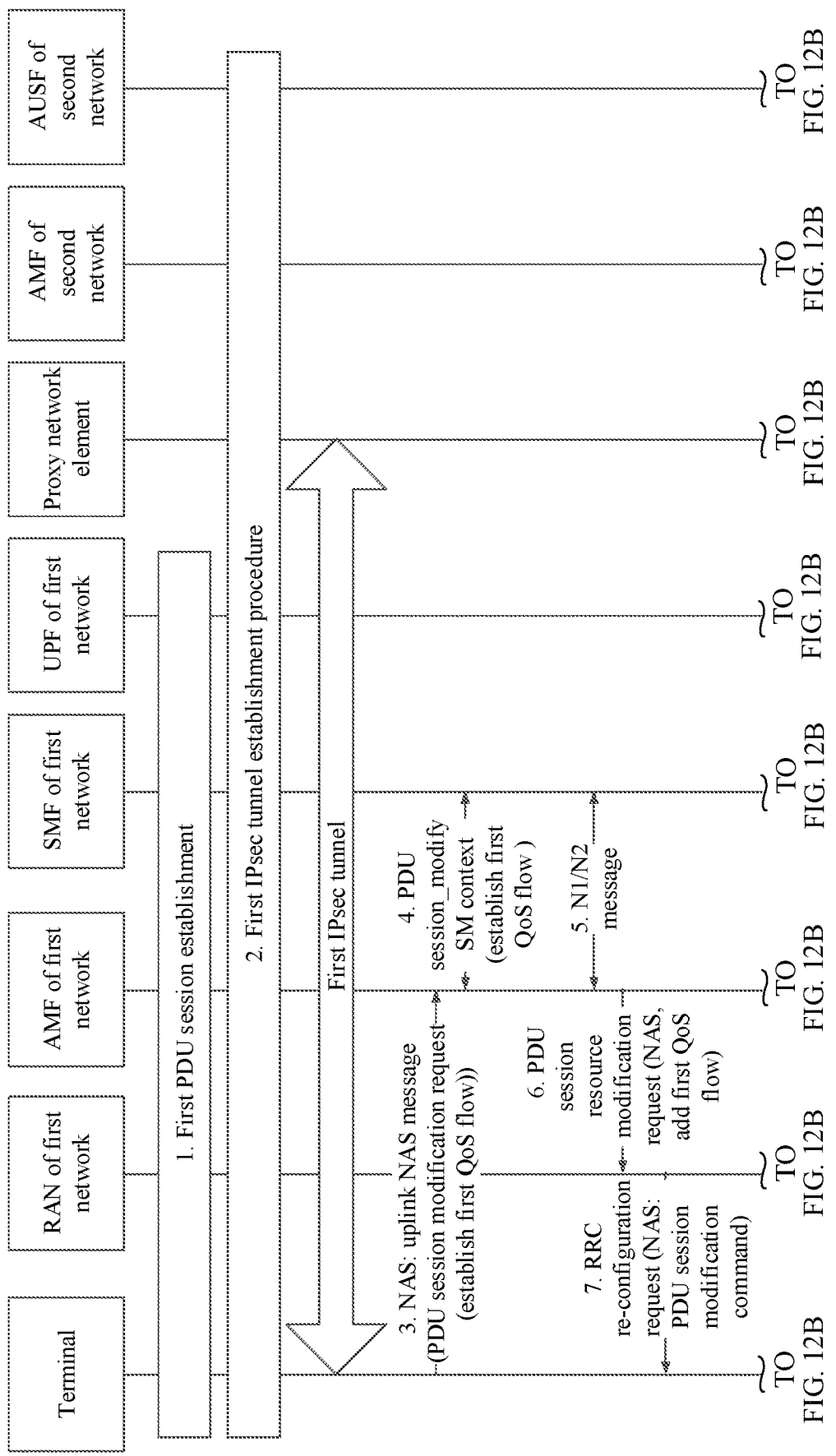
FIGS. 12A and 12B are a schematic flowchart of a method for guaranteeing data transmission in an application scenario 1 according to an embodiment of this disclosure.
Figure 12B:
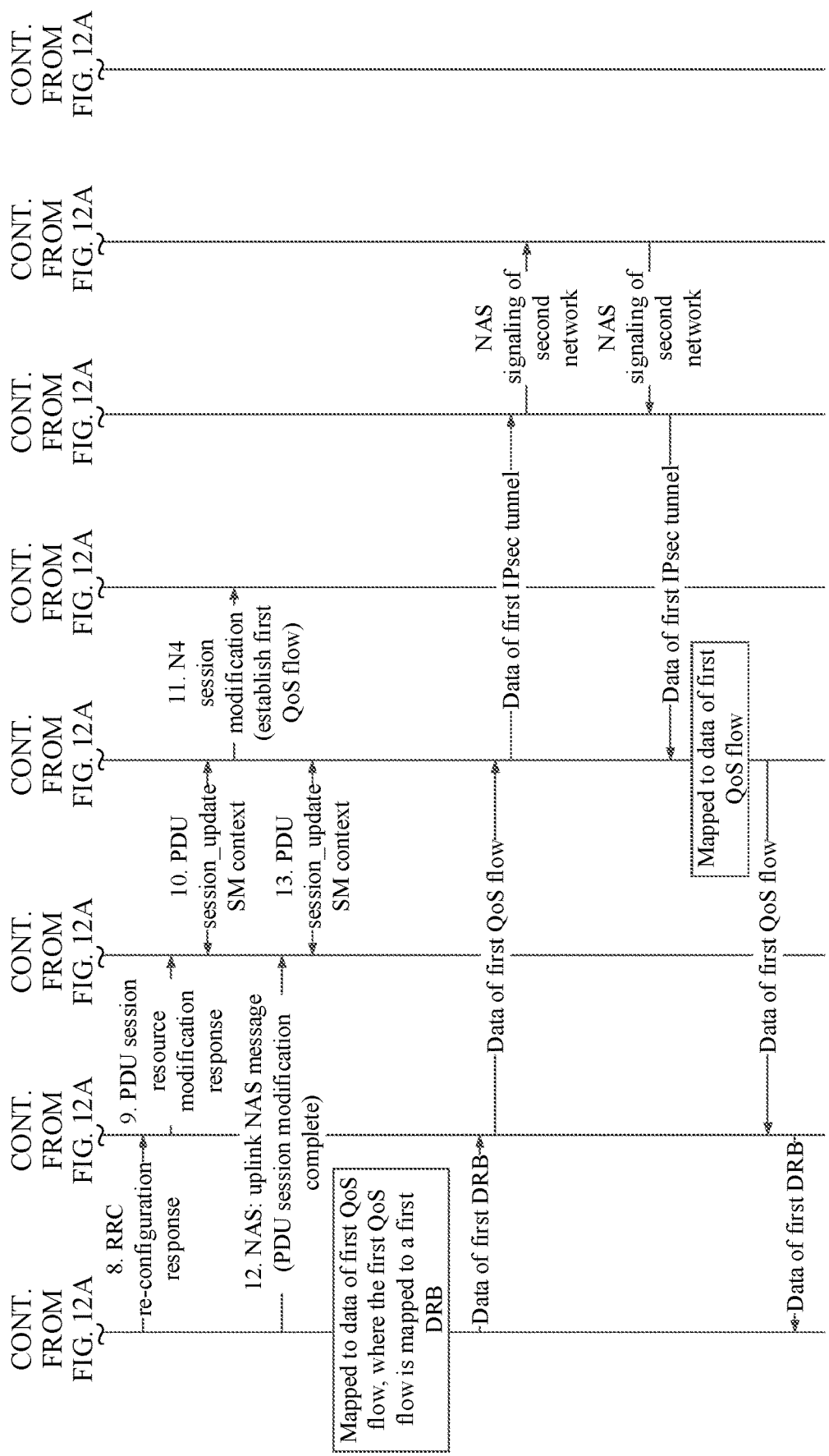

Application Scenario 1 of the Embodiments of this Disclosure:

The application scenario 1 of the embodiments of this disclosure is mainly a procedure that a terminal (UE is taken as an example for description) makes a request to a first network for establishing a first QoS flow after a first IPsec tunnel between the terminal and a proxy network element is established. The proxy network element is a proxy (for example, N3IWF) between the first network and a second network, and can be a communications network element of the first network, or a communications network element of the second network. The first IPsec tunnel is an IPsec tunnel used for transmitting control signaling between the terminal and the second network. The following description uses an AMF to represent an AMF of the first network, an SMF to represent an SMF of the first network, a UPF to represent a UPF of the first network, and a RAN network element to represent a RAN network element of the first network. Referring to FIGS. 12A and 12B, the data transmission method involved includes the following steps.

Step 1: A first-network PDU (protocol data unit) session (referred to as a first PDU session) is established between the UE and the first network. The SMF of the first network can establish a Match-all default QoS flow for the terminal. The first-network PDU session is used for transmitting information between the terminal and the second network. The information between the terminal and the second network can be control signaling and/or user plane data.

Step 2: Through interactions between the UE, the proxy network element, and the second network, a first IPsec tunnel (for example, signaling IPsec SA) between the UE and the proxy network element is established for transmitting control signaling (for example, NAS information) between the UE and the second network.

The UE obtains information of the first IPsec tunnel from the proxy network element. For details of the information of the first IPsec tunnel, refer to the foregoing description of the embodiment in FIG. 7. Details are not described herein again.

Based on the information of the first IPsec tunnel, the UE performs a first related operation for a tunnel of the first network. For details, refer to the foregoing description of the embodiment in FIG. 7. Details are not described herein again.

Step 3: The UE transmits to the AMF an uplink NAS message for adding a first QoS flow in the first PDU session. The NAS message includes a PDU session modification request. The PDU session modification request includes the following information: a PDU session identifier of the first PDU session, a requested QoS rule, and/or requested QoS flow description information.

The requested QoS rule includes a QoS flow identifier and a QoS rule of the first QoS flow requested.

The requested QoS flow description includes a QoS flow identifier and a QoS flow description of the first QoS flow requested.

The QoS flow description of the first QoS flow includes first QoS class indication information.

A traffic descriptor component type identifier in the QoS rule of the first QoS flow is set to a security parameter index type. The security parameter index type for example is 01100000.

Uplink and/or downlink packet filter information in the QoS rule of the first QoS flow is information of the first IPsec tunnel (the information of the first IPsec tunnel includes at least one of the following: an identifier of the first IPsec tunnel, a protocol field indicating ESP, and an SPI of the first IPsec tunnel).

The QoS flow description of the first QoS flow includes no GBR related QoS parameters (such as, uplink/downlink GFBR, uplink/downlink MFBR, and GBR 5QI).

The QoS flow description and/or the QoS rule of the first QoS flow includes a first QoS class indication (also referred to as QFI, QCI, 5QI, or the like).

Step 4: The AMF transmits a PDU session_SM (session management) context modification request message to the SMF.

The PDU session_SM context modification request includes the following information: a PDU session identifier of the first PDU session, a requested QoS rule, and/or requested QoS flow description information.

The requested QoS rule includes a QoS flow identifier and a QoS rule of the first QoS flow requested.

The requested QoS flow description information includes a QoS flow identifier and QoS flow description information of the first QoS flow requested.

The QoS flow description information of the first QoS flow includes first QoS class indication information.

A traffic descriptor component type identifier in the QoS rule of the first QoS flow is set to a security parameter index type.

Uplink and/or downlink packet filter information in the QoS rule of the first QoS flow is information of the first IPsec tunnel (the information of the first IPsec tunnel includes at least one of the following: an identifier of the first IPsec tunnel, a protocol field indicating ESP, and a security parameter index SPI of the first IPsec tunnel).

The QoS flow description of the first QoS flow includes no GBR related QoS parameters (such as, uplink/downlink GFBR, uplink/downlink MFBR, and GBR 5QI).

The QoS flow description and/or the QoS rule of the first QoS flow includes a first QoS class indication (also referred to as QFI, QCI, 5QI, or the like).

Determining that the first QoS flow is established, the first network returns a PDU session_SM context modification response to the AMF of the first network.

Step 5: The SMF transmits an N1/N2 message to the AMF.

Step 6: The AMF transmits a PDU session resource modification request to the RAN network element. The PDU session resource modification request includes a QoS context and a QoS flow identifier of the first QoS flow, and a NAS message (a PDU session modification command).

The QoS flow identifier may be a first QoS class indication.

The QoS context of the first QoS flow may include the first QoS class indication.

Based on the first QoS class indication, the RAN network element allocates a separate DRB (referred to as a first DRB) to the first QoS flow. That is, the first DRB is used to transmit or only to transmit data of the first QoS flow.

Step 7: The RAN network element transmits an RRC re-configuration request to the UE. The RRC re-configuration request includes a configuration of the first DRB to which the first QoS flow is mapped and a NAS message (a PDU session modification command).

Step 8: The UE returns an RRC re-configuration response to the RAN network element.

Step 9: The RAN network element returns a PDU session resource modification response to the AMF.

Step 10: The AMF triggers a PDU session_SM context modification procedure to the SMF.

Step 11: The SMF transmits an N4 PDU session modification request to the UPF, for adding the first QoS flow in the first PDU session. The N4 PDU session modification request includes a QoS rule of the first QoS flow to be added.

A traffic descriptor component type identifier in the QoS rule of the first QoS flow is set to a security parameter index type.

Uplink and/or downlink packet filter information in the QoS rule of the first QoS flow is information of the first IPsec tunnel (the information of the first IPsec tunnel includes at least one of the following: an identifier of the first IPsec tunnel, a protocol field indicating ESP, and an SPI of the first IPsec tunnel).

Establishment of the first QoS flow is completed, and the UPF returns an N4 PDU session modification response to the SMF.

Step 12: The UE transmits an uplink NAS message to the AMF of the first-network. The NAS message includes a PDU session modification complete.

Step 13: The AMF triggers a PDU session_SM context modification procedure to the SMF.

Later, when needing to transmit data of the first IPsec tunnel, the terminal maps the first IPsec tunnel to data of the first QoS flow based on the uplink packet filter information of the first QoS flow. Next, the data of the first QoS flow is mapped to data of the first DRB and transmitted to the RAN network element. Upon receiving the data of the first IPsec tunnel, the UPF of the first network maps the first IPsec tunnel to the data of the first QoS flow based on the downlink packet filter information of the first QoS flow. Next, the data of the first QoS flow is transmitted to the RAN network element. The RAN network element maps the data of the first QoS flow to data of the first DRB. The RAN network element may preferentially guarantee the first DRB based on the QoS information of the first QoS flow. It is easy to understand that an effect of guaranteeing control signaling between the terminal and the second network can be achieved in the first network.

Figure 13A:
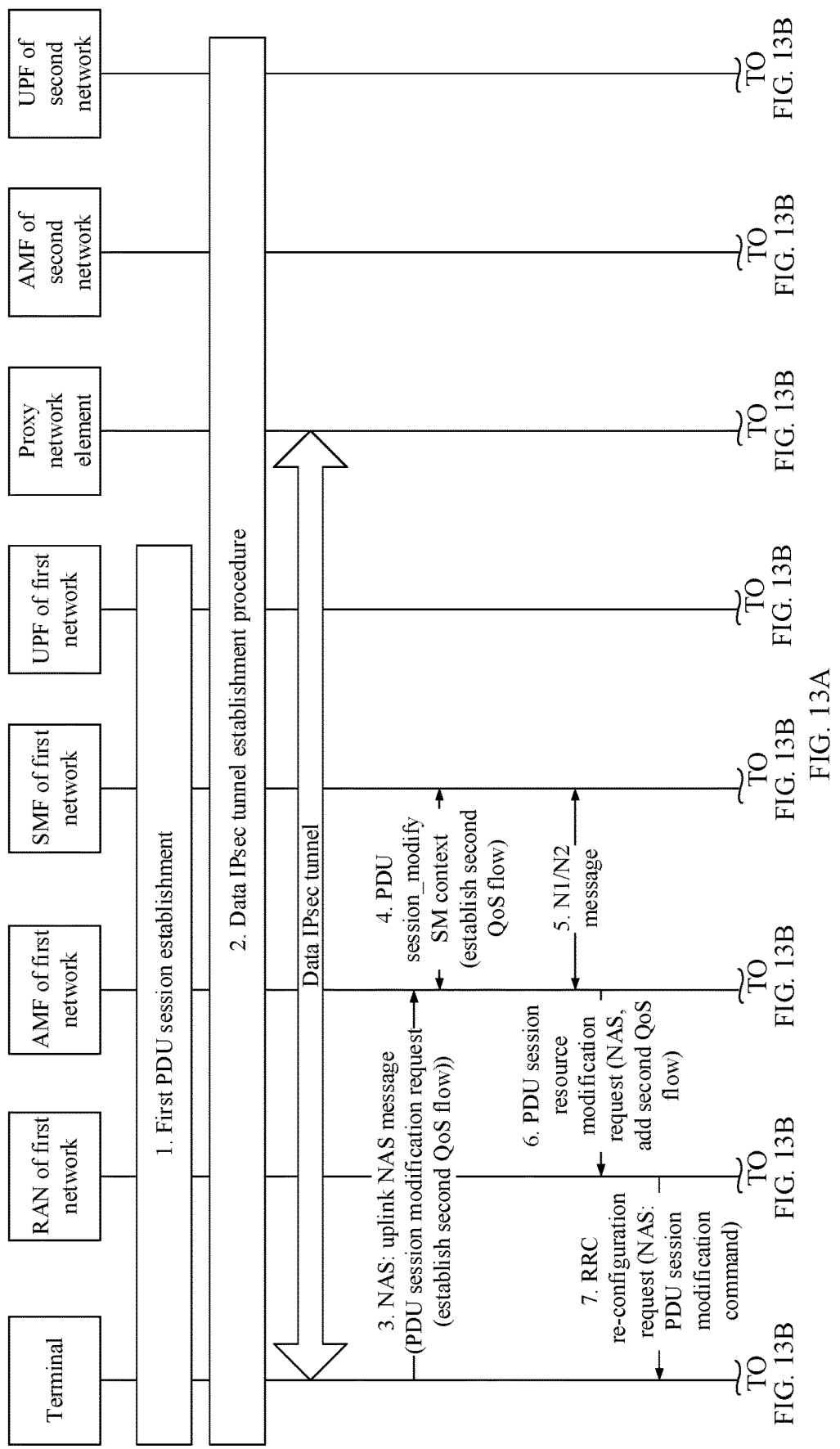
FIGS. 13A and 13B are a schematic flowchart of a method for guaranteeing data transmission in an application scenario 2 according to an embodiment of this disclosure.
Figure 13B:
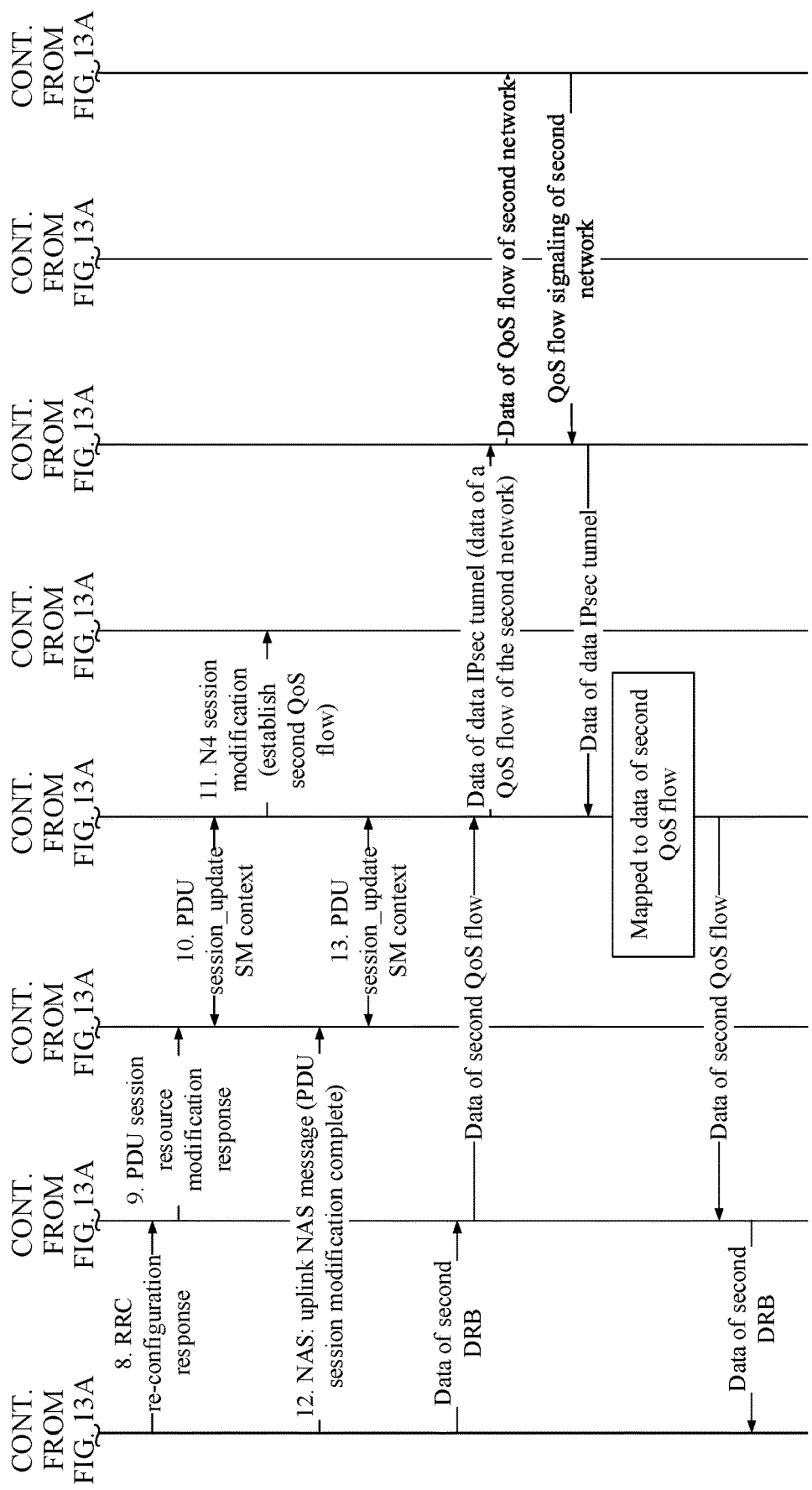

Application Scenario 2 of the Embodiments of this Disclosure:

In the application scenario 2 of the embodiments of this disclosure is mainly a procedure that a terminal (UE is taken as an example for description) makes a request to a first network for establishing a second QoS flow after a data IPsec tunnel between the terminal and a proxy network element is established. The proxy network element is a proxy (for example, N3IWF) between the first network and a second network, and can be a communications network element of the first network, or a communications network element of the second network. The data IPsec tunnel is an IPsec tunnel used for transmitting user plane data between the terminal and the second network, or data of a tunnel between the terminal and the second network. The following description uses an AMF to represent an AMF of the first network, an SMF to represent an SMF of the first network, a UPF to represent a UPF of the first network, and a RAN network element to represent a RAN network element of the first network. Referring to FIGS. 13A and 13B, the data transmission method involved includes the following steps.

Step 1: A first-network PDU (protocol data unit) session (referred to as a first PDU session) is established between the UE and the first network. The SMF of the first network establishes a Match-all default QoS flow for the terminal. The first-network PDU session is used for transmitting information between the terminal and the second network. The information between the terminal and the second network can be control signaling and/or user plane data.

Step 2: Through interactions between the UE, the proxy network element, and the second network, a data IPsec tunnel (for example, data IPsec SA) between the UE and the proxy network element is established for transmitting control signaling (for example, NAS information) between the UE and the second network.

The UE obtains information of the data IPsec tunnel from the proxy network element. For details of the information of the data IPsec tunnel, refer to the foregoing description of the embodiment in FIG. 8. Details are not described herein again.

Based on the information of the data IPsec tunnel, the UE performs a second related operation for a tunnel of the first network. For details, refer to the foregoing description of the embodiment in FIG. 8. Details are not described herein again.

Step 3: The UE transmits to the AMF an uplink NAS message for adding a second QoS flow in the first PDU session. The NAS message includes a PDU session modification request. The PDU session modification request includes the following information: a PDU session identifier of the first PDU session, a requested QoS rule, and/or a requested QoS flow description.

The requested QoS rule includes a QoS flow identifier and a QoS rule of the second QoS flow requested.

The requested QoS flow description includes a QoS flow identifier and a QoS flow description of the second QoS flow requested.

The QoS description of the second QoS flow includes QoS information corresponding to a tunnel, associated with the data IPsec tunnel, between the terminal and the second network;

A traffic descriptor component type identifier in the QoS rule of the second QoS flow is set to a security parameter index type.

Uplink and/or downlink packet filter information in the QoS rule of the second QoS flow is information of the data IPsec tunnel (the information of the data IPsec tunnel includes at least one of the following: an identifier of the data IPsec tunnel, a protocol field indicating ESP, a security parameter index of the data IPsec tunnel, and identifier information of the tunnel, associated with the data IPsec tunnel, between the terminal and the second network).

The QoS flow description and/or the QoS rule of the second QoS flow includes QoS information corresponding to the tunnel, associated with the data IPsec tunnel, between the terminal and the second network (the identifier information of the tunnel, associated with the data IPsec tunnel, between the terminal and the second network includes: a QoS flow identifier, and an identifier of a PDU session to which a QoS flow belongs).

Step 4: The AMF transmits a PDU session_SM (session management) context modification request message to the SMF.

The PDU session_SM context modification request includes the following information: a PDU session identifier of the first PDU session, a requested QoS rule, and/or a requested QoS flow description.

The requested QoS rule includes a QoS flow identifier and a QoS rule of the second QoS flow requested.

The requested QoS flow description includes a QoS flow identifier and a QoS flow description of the second QoS flow requested.

The QoS description of the second QoS flow includes QoS information corresponding to the tunnel, associated with the data IPsec tunnel, between the terminal and the second network;

A traffic descriptor component type identifier in the QoS rule of the second QoS flow is set to a security parameter index type.

Uplink and/or downlink packet filter information in the QoS rule of the second QoS flow is information of the data IPsec tunnel (the information of the data IPsec tunnel includes at least one of the following: an identifier of the data IPsec tunnel, a protocol field indicating ESP, a security parameter index of the data IPsec tunnel, and identifier information of the tunnel, associated with the data IPsec tunnel, between the terminal and the second network).

The QoS flow description and/or the QoS rule of the second QoS flow includes QoS information corresponding to the tunnel, associated with the data IPsec tunnel, between the terminal and the second network (the identifier information of the tunnel, associated with the data IPsec tunnel, between the terminal and the second network includes: a QoS flow identifier, and an identifier of a PDU session to which a QoS flow belongs).

Determining that the second QoS flow is established, the first network returns a PDU session_SM context modification response to the AMF of the first network.

Step 5: The SMF transmits an N1/N2 message to the AMF.

Step 6: The AMF transmits a PDU session resource modification request to the RAN network element, and transmits QoS information of the second QoS flow to the RAN network element, requesting to establish a second QoS flow. The PDU session resource modification request includes a QoS context and a QoS flow identifier of the second QoS flow, and a NAS message (a PDU session modification command).

The QoS flow identifier may be a QoS class indication (hereinafter referred to as a second QoS class indication) corresponding to a QoS flow of the second network associated with the data IPsec tunnel.

The QoS context of the second QoS flow may include the second QoS class indication.

Based on the QoS information of the second QoS flow, when a first condition is met (as described in the foregoing method embodiment), the RAN network element allocates a separate DRB (referred to as a second DRB) to the second QoS flow. Alternatively, the RAN network element maps data of each second QoS flow to one second DRB. That is, the second DRB is used to transmit or only to transmit data of the second QoS flow.

Step 7: The RAN network element transmits an RRC re-configuration request to the UE. The RRC re-configuration request includes a configuration of the DRB to which the second QoS flow is mapped and a NAS message (a PDU session modification command).

Step 8: The UE returns an RRC re-configuration response to the RAN network element.

Step 9: The RAN network element returns a PDU session resource modification response to the AMF.

Step 10: The AMF triggers a PDU session_SM context modification procedure to the SMF.

Step 11: The SMF transmits an N4 PDU session modification request to the UPF, for adding the second QoS flow in the first PDU session. The N4 PDU session modification request includes a QoS rule of the second QoS flow to be added.

A traffic descriptor component type identifier in the QoS rule of the second QoS flow is set to a security parameter index type.

Uplink and/or downlink packet filter information in the QoS rule of the second QoS flow is information of the data IPsec tunnel (the information of the data IPsec tunnel includes at least one of the following: an identifier of the data IPsec tunnel, a protocol field indicating ESP, a security parameter index of the data IPsec tunnel, and identifier information of the tunnel, associated with the data IPsec tunnel, between the terminal and the second network).

Establishment of the second QoS flow is completed, and the UPF returns an N4 PDU session modification response to the SMF.

Step 12: The UE transmits an uplink NAS message to the AMF of the first network. The NAS message includes a PDU session modification complete.

Step 13: The AMF triggers a PDU session_SM context modification procedure to the SMF.

Later, when needing to transmit data of the data IPsec tunnel, the terminal maps the second IPsec tunnel to data of the second QoS flow based on the uplink packet filter information of the second QoS flow. Next, the data of the second QoS flow is mapped to data of the second DRB and transmitted to the RAN network element. Upon receiving the data of the data IPsec tunnel, the UPF of the first network maps the second IPsec tunnel to the data of the second QoS flow based on the downlink packet filter information of the second QoS flow. Next, the data of the second QoS flow is transmitted to the RAN network element. For some important traffic (for example, voice traffic), the RAN network element maps the data of the second QoS flow to data pf the second DRB. It is easy to understand that an effect of guaranteeing data, especially data of important traffic, between the terminal and the second network can be achieved in the first network.

Figure 14A:
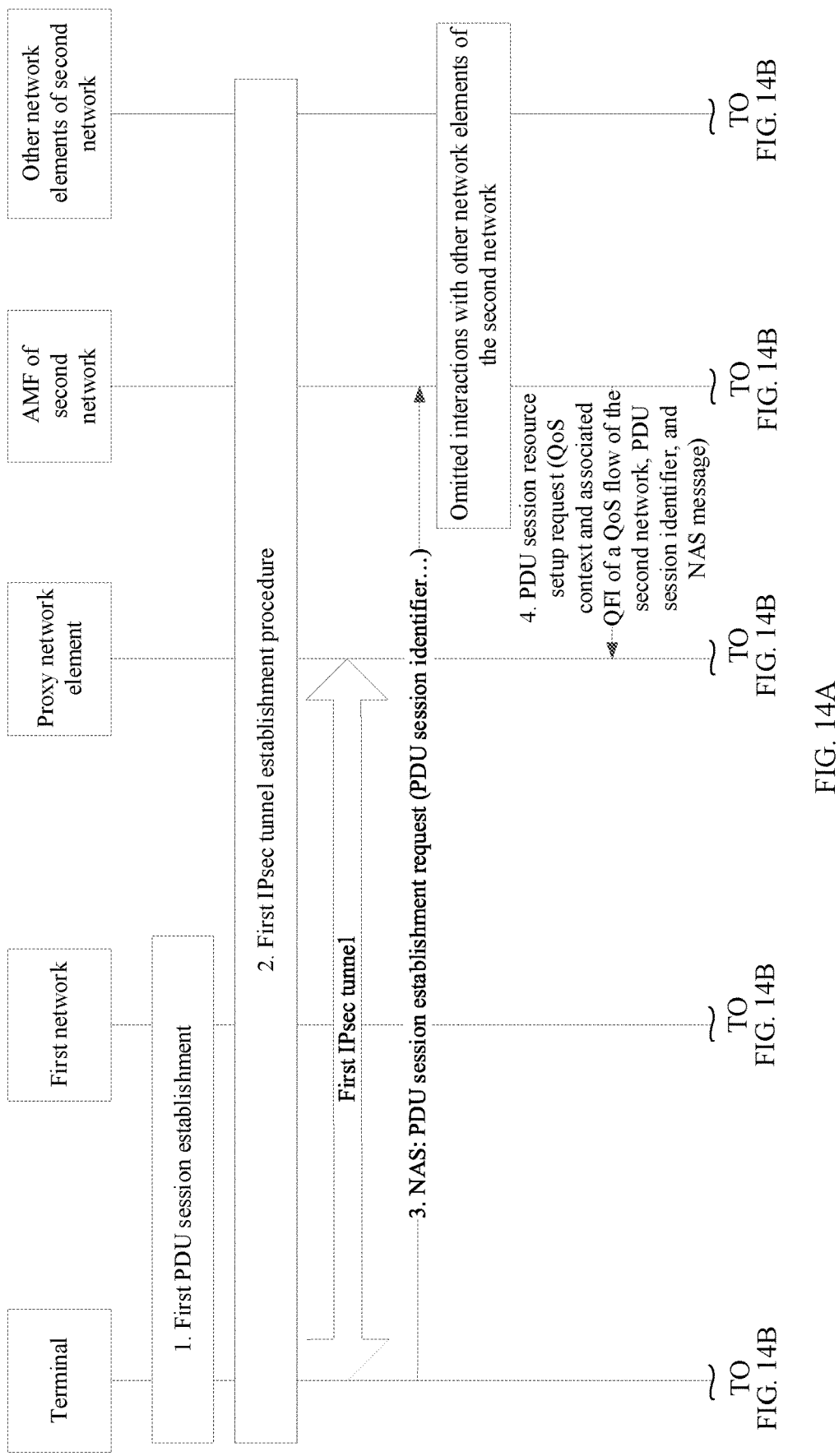
FIGS. 14A and 14B are a schematic flowchart of a method for guaranteeing data transmission in an application scenario 3 according to an embodiment of this disclosure.
Figure 14B:
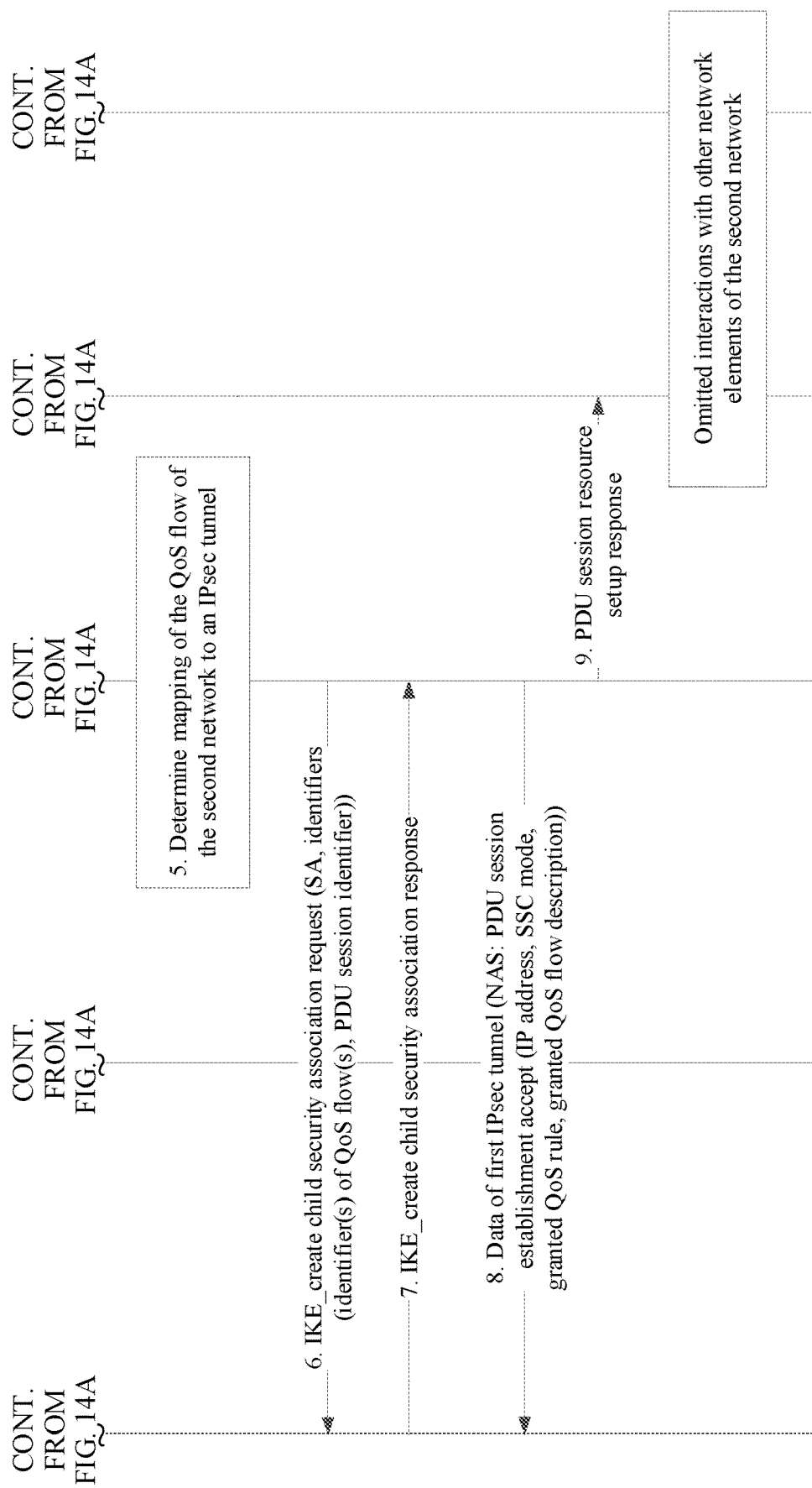

Application Scenario 3 of the Embodiments of this Disclosure:

In the application scenario 3 of the embodiments of this disclosure is mainly a procedure that a terminal (UE is taken as an example for description) makes a request to a second network for establishing a PDU session and a data IPsec tunnel is established between the terminal and a proxy network element. The proxy network element is a proxy (for example, N3IWF) between a first network and the second network, and can be a communications network element of the first network, or a communications network element of the second network. A first IPsec tunnel is an IPsec tunnel used for transmitting control signaling between the terminal and the second network. Referring to FIGS. 14A and 14B, the data transmission method involved includes the following steps.

Step 1: A first-network PDU (protocol data unit) session (referred to as a first PDU session) is established between the UE and the first network. The first-network PDU session is used for transmitting information between the terminal and the second network. The information between the terminal and the second network can be control signaling and/or user plane data.

Step 2: Through interactions between the UE, the proxy network element, and the second network, a first IPsec tunnel (for example, signaling IPsec SA) between the UE and the proxy network element is established for transmitting control signaling (for example, NAS information) between the UE and the second network.

Step 3: Via the first IPsec tunnel, the UE transmits an uplink NAS message to an AMF of the second network, requesting to establish a PDU session with the second network.

Interactions between the AMF of the second network and other network elements of the second network are omitted.

Step 4: The AMF of the second network transmits a PDU session resource setup request to the proxy network element. The PDU session resource setup request includes a QoS context and a QoS flow identifier of a QoS flow of the second network, and a NAS message (a PDU session establishment accept).

Step 5: When it is determined that a preset condition is met, the proxy network element performs an operation related to a data IPsec tunnel for a tunnel of the second network (the QoS flow of the second network). For details, refer to the foregoing description of the embodiment in FIG. 9. Details are not described herein again.

Specifically, the proxy network element determines a mapping from the QoS flow of the second network to a data IPsec tunnel.

Step 6: The proxy network element transmits an IKE_create child security association request to the UE. The IKE_create child security association request includes an identifier of an IPsec tunnel to be established, an identifier of a QoS flow to be associated, and an identifier of a PDU session to which the QoS flow belongs.

Step 7: The UE returns an IKE_create child security association response to the proxy network element.

When a plurality of IPsec tunnels need to be established, step 5 and step 6 are repeated.

Step 8: The proxy network element transmits the NAS message received in step 4 to the UE via the first IPsec tunnel.

Step 9: The proxy network element returns a PDU session resource setup response to the AMF of the second network.

Interactions between the AMF of the second network and other network elements of the second network are omitted.

It is easy to understand that on the basis of the proxy network element controlling a reasonable mapping from QoS flows of the second network to data IPsec tunnels, the terminal can request the first network to provide different second QoS flows for different data IPsec tunnels, and then guaranteeing data between the terminal and the second network can be achieved in the first network. For a QoS flow of the second network carrying important traffic, the proxy network element can map the flow to a standalone data IPsec tunnel. The terminal can request a separate first QoS flow of the first network for the data IPsec tunnel, thus guaranteeing important data between the terminal and the second network in the first network.

Figure 15A:
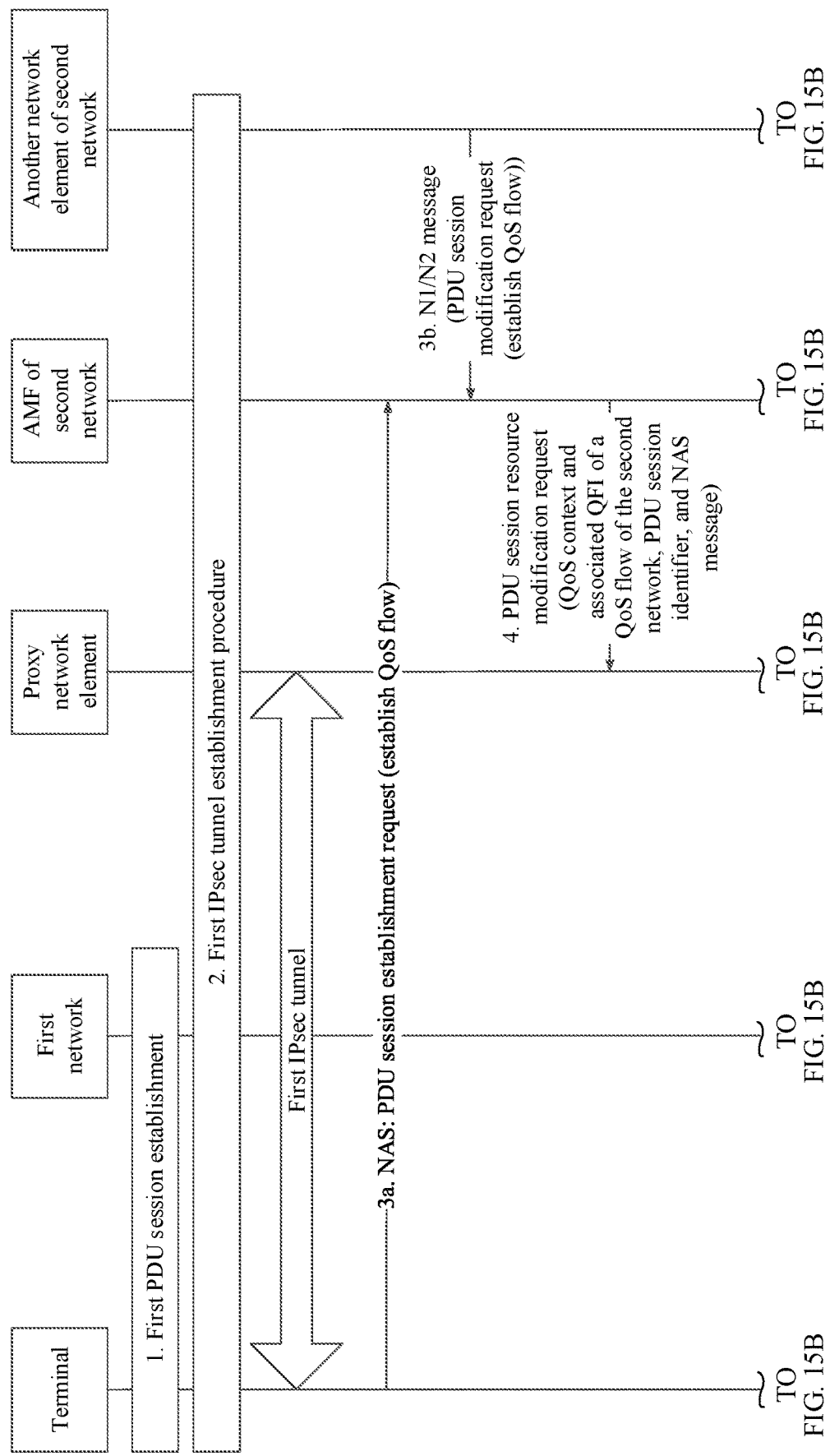
FIGS. 15A and 15B are a schematic flowchart of a method for guaranteeing data transmission in an application scenario 4 according to an embodiment of this disclosure.
Figure 15B:
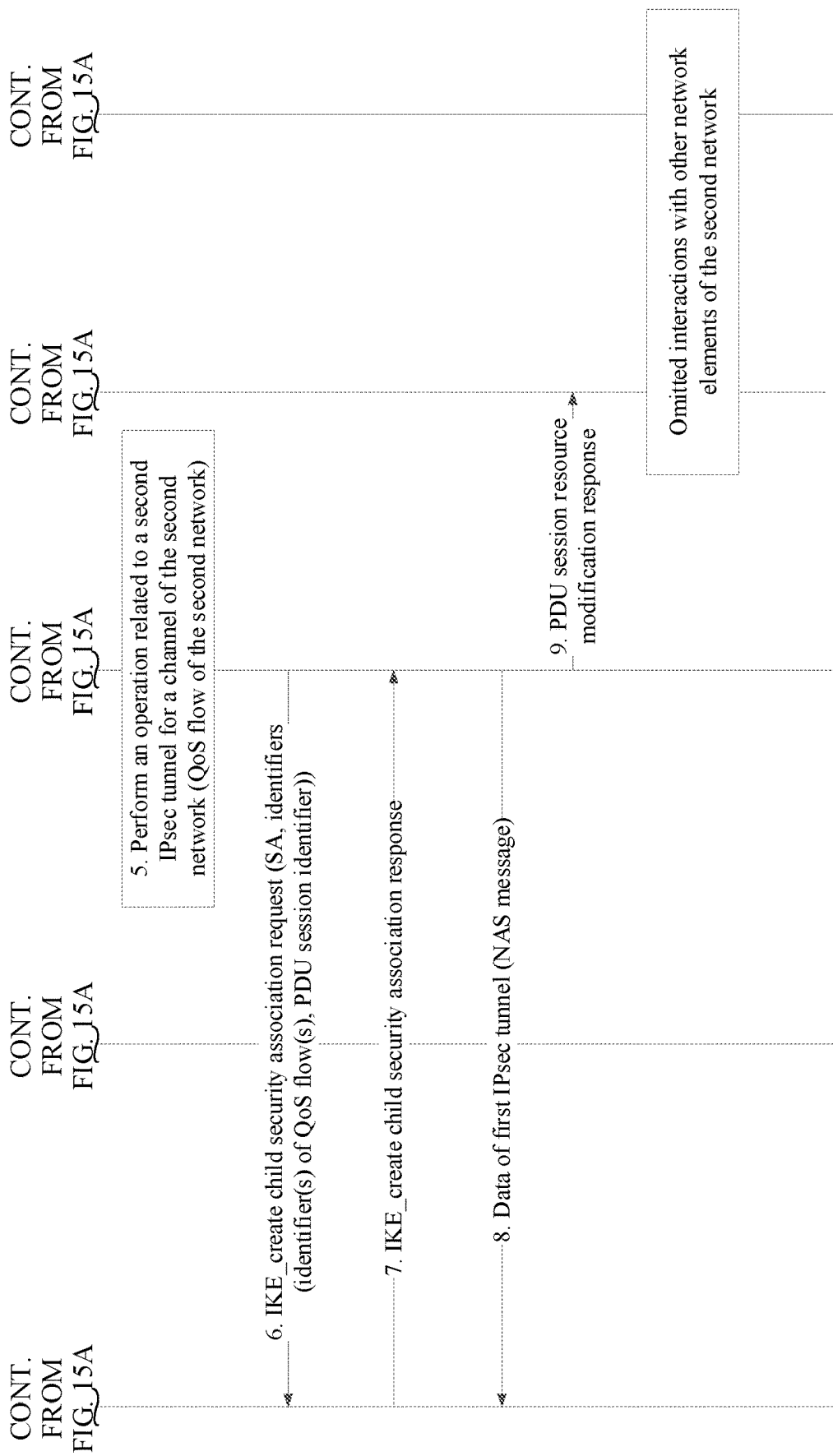

Application Scenario 4 of the Embodiments of this Disclosure:

The application scenario 4 of the embodiments of this disclosure is mainly a procedure that a terminal (UE is taken as an example for description) or a network element of a second network initiates a PDU session modification of the second network, requesting to add a QoS flow in a PDU session of the second network. A proxy network element is a proxy (for example, N3IWF) between a first network and the second network, and can be a communications network element of the first network, or a communications network element of the second network. A first IPsec tunnel is an IPsec tunnel used for transmitting control signaling between the terminal and the second network. Referring to FIGS. 15A and 15B, the data transmission method involved includes the following steps.

Step 1: A first-network PDU (protocol data unit) session (referred to as a first PDU session) is established between the UE and the first network. The first-network PDU session is used for transmitting information between the terminal and the second network. The information between the terminal and the second network can be control signaling and/or user plane data.

Step 2: Through interactions between the UE, the proxy network element, and the second network, a first IPsec tunnel (for example, signaling IPsec SA) between the UE and the proxy network element is established for transmitting control signaling (for example, NAS information) between the UE and the second network.

Step 3a: Via the first IPsec tunnel, the UE transmits an uplink NAS message to an AMF of the second network, requesting to add a QoS flow in a PDU session of the second network (referred to as a QoS flow of the second network).

Step 3b: Another network element of the second network transmits a PDU session modification request to an AMF of the second network, requesting to add a QoS flow in a PDU session of the second network (referred to as a QoS flow of the second network).

Step 4: The AMF of the second network transmits a PDU session resource modification request to the proxy network element. The PDU session resource modification request includes a QoS context and a QoS flow identifier of the QoS flow of the second network, and a NAS message (for example, a PDU session modification command).

Step 5: When it is determined that a preset condition is met, the proxy network element performs an operation related to a data IPsec tunnel for a tunnel of the second network (the QoS flow of the second network). For details, refer to the foregoing description of the embodiment in FIG. 9. Details are not described herein again.

Specifically, the proxy network element determines a mapping from the QoS flow of the second network to a data IPsec tunnel.

When it is determined that a new data IPsec tunnel is to be established for the QoS flow of the second network, the proxy network element proceeds to step 6 to step 7.

When it is determined that an existing data IPsec tunnel is to be modified (for example, adding an associated QoS flow of the second network for the existing IPsec tunnel, or mapping a QoS flow of the second network to the existing IPsec tunnel), the proxy network element may firstly remove the existing data IPsec tunnel and then proceed to step 6 to step 7 to establish a data IPsec tunnel.

Step 6: The proxy network element transmits an IKE_create child security association request to the UE. The IKE_create child security association request includes an identifier of an IPsec tunnel to be established, an identifier of a QoS flow to be associated, and an identifier of a PDU session to which the QoS flow belongs.

Step 7: The UE returns an IKE_create child security association response to the proxy network element.

When a plurality of IPsec tunnels need to be established, step 5 and step 6 are repeated.

Step 8: The proxy network element transmits the NAS message received in step 4 to the UE via the first IPsec tunnel.

Step 9: The proxy network element returns a PDU session resource modification response to the AMF of the second network.

Interactions between the AMF of the second network and other network elements of the second network are omitted.

It is easy to understand that on the basis of the proxy network element controlling a reasonable mapping from QoS flows of the second network to data IPsec tunnels, the terminal can request the first network to provide different second QoS flows for different data IPsec tunnels, and then guaranteeing data between the terminal and the second network can be achieved in the first network. For a QoS flow of the second network carrying important traffic, the proxy network element can map the flow to a standalone data IPsec tunnel. The terminal can request a separate first QoS flow of the first network for the data IPsec tunnel, thus guaranteeing important data between the terminal and the second network in the first network.

Figure 16:
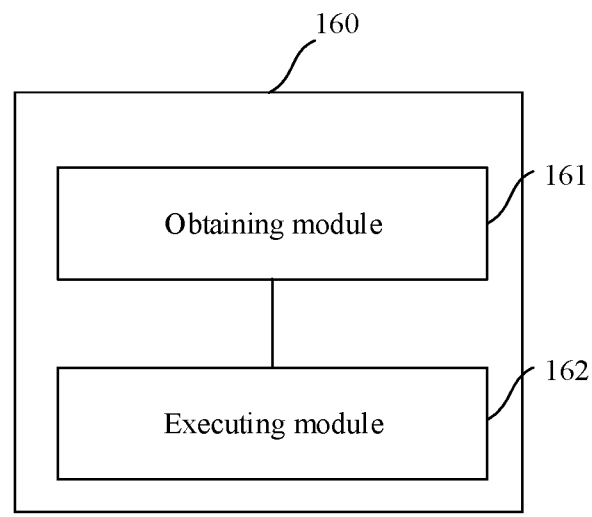
FIG. 16 is a schematic structural diagram of a terminal according to an embodiment of this disclosure.

Referring to FIG. 16, an embodiment of this disclosure further provides a terminal 160, including:

an obtaining module 161, configured to obtain information of a first IPsec tunnel, where the first IPsec tunnel is an IPsec tunnel used for transmitting control signaling between the terminal and a second network; and an executing module 162, configured to perform a first related operation for a tunnel of a first network based on the information of the first IPsec tunnel.

Optionally, the performing a first related operation for a tunnel of a first network includes at least one of the following:

making a request to the first network for establishing a first tunnel;

making a request to the first network for modifying a third tunnel to a first tunnel;

transmitting QoS information of a first tunnel to the first network;

transmitting modified QoS information of a third tunnel to the first network;

transmitting first QoS information to the first network;

setting uplink and/or downlink packet filter information in QoS information of a first tunnel to the information of the first IPsec tunnel;

setting uplink and/or downlink packet filter information in first QoS information to the information of the first IPsec tunnel;

modifying uplink and/or downlink packet filter information in QoS information of a third tunnel to the information of the first IPsec tunnel;

setting a traffic descriptor component type identifier in QoS information of a first tunnel to a security parameter index type;

setting a traffic descriptor component type identifier in first QoS information to a security parameter index type;

modifying a traffic descriptor component type identifier in QoS information of a third tunnel to a security parameter index type;

setting a first tunnel to a non-guaranteed bit rate (non-GBR) tunnel;

setting QoS information of a first tunnel or first QoS information to contain no GBR related QoS parameter information;

modifying a third tunnel to a non-GBR tunnel;

setting QoS information of a third tunnel to contain no GBR related QoS parameter information;

setting QoS class indication information in QoS information of a first tunnel to first QoS class indication information;

setting QoS class indication information in first QoS information to first QoS class indication information;

modifying QoS class indication information in QoS information of a third tunnel to first QoS class indication information;

setting a QoS priority in QoS information of a first tunnel to a first QoS priority;

setting a QoS priority in first QoS information to a first QoS priority;

modifying a QoS priority in QoS information of a third tunnel to a first QoS priority; and transmitting the information of the first IPsec tunnel to the first network;

where the first tunnel is used for transmitting data of the first IPsec tunnel, or used for transmitting control signaling between the terminal and the second network;

the third tunnel is a tunnel already established for the terminal and the first network; and the first QoS information is new QoS information.

Optionally, the QoS information of a first tunnel, the modified QoS information of a third tunnel, and/or the first QoS information contains no GBR related QoS parameter information;

and/or the QoS information of a first tunnel, the modified QoS information of a third tunnel, and/or the first QoS information includes at least one of the following: uplink and/or downlink packet filter information, where the uplink and/or downlink packet filter information is the information of the first IPsec tunnel; a traffic descriptor component type identifier, where the traffic descriptor component type identifier is a security parameter index type; and QoS flow class indication information, where the QoS flow class indication information is first QoS class indication information.

Optionally, after establishment of the first tunnel is completed, establishment of the first tunnel is granted, the first QoS information is granted, the modified QoS information of the third tunnel is granted, and/or the third tunnel is modified and converted to the first tunnel, the first related operation for a tunnel of a first network further includes at least one of the following:

transmitting control signaling between the terminal and the second network or data of the first IPsec tunnel via the first tunnel;

switching control signaling between the terminal and the second network or data of the first IPsec tunnel to the first tunnel for transmission; and establishing and/or saving an association between the first tunnel and the first IPsec tunnel;

and/or after establishment of the first tunnel is rejected, modification of the third tunnel is rejected, granting the first QoS information is rejected, and/or the first tunnel is released, the first related operation for a tunnel of a first network further includes at least one of the following: initiating a de-registration request to the second network, and turning into a de-registered state.

Optionally, the first tunnel and/or the third tunnel is a QoS flow;

and/or the first tunnel is a first QoS flow or a QoS flow in a first PDU session;

and/or the third tunnel is an existing QoS flow in a first PDU session;

and/or the first tunnel is a first QoS flow, and the making a request to the first network for establishing a first tunnel includes at least one of the following:

making a request to the first network for establishing a first QoS flow in a first PDU session; and transmitting to the first network a request for modifying a first PDU session or for establishing a first PDU session, where the request for modifying a first PDU session or for establishing a first PDU session contains QoS information of a first QoS flow requested to be established or first QoS information;

and/or the first tunnel is a first QoS flow, the third tunnel is an existing QoS flow in a first PDU session, and the making a request to the first network for modifying a third tunnel to a first tunnel includes at least one of the following:

making a request to the first network for modifying a third QoS flow in a first PDU session; and transmitting to the first network a request for modifying a first PDU session;

where the request for modifying a first PDU session contains QoS information of a third QoS flow requested to be modified, and the first PDU session is a PDU session in the first network used for transmitting information between the terminal and the second network;

and/or the first QoS class indication information and/or the first priority is used for indicating a request for a separate radio bearer resource;

and/or the first QoS class indication information includes at least one of the following: an operator-specific QoS class indication; a non-standardized first QoS class indication, where the non-standardized first QoS class indication takes a value of 5 or 69; and a non-GBR QoS class indication;

and/or the first priority information takes a value of 5.

Optionally, the information of the first IPsec tunnel includes at least one of the following: an identifier of the first IPsec tunnel, a protocol field indicating that the encapsulation is ESP, a security parameter index SPI of the first IPsec tunnel, and information of the second network associated with the first IPsec tunnel.

Optionally, the first QoS flow is a non-default QoS flow.

Optionally, the obtaining module is configured to obtain the information of the first IPsec tunnel from a proxy network element.

Figure 17:
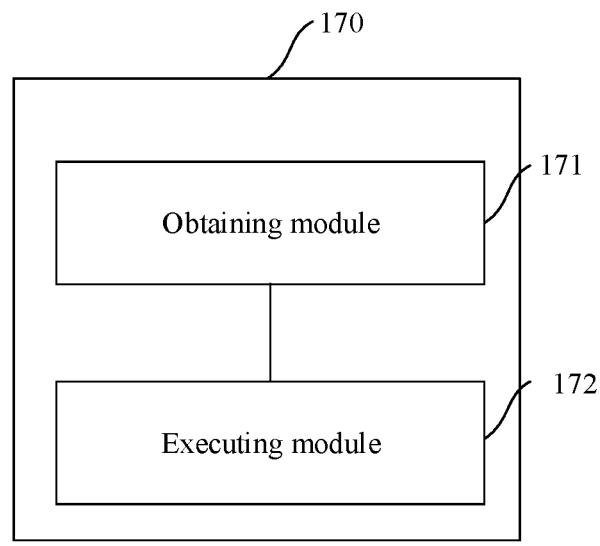
FIG. 17 is a schematic structural diagram of a terminal according to another embodiment of this disclosure.

Referring to FIG. 17, an embodiment of this disclosure further provides a terminal 170, including:

an obtaining module 171, configured to obtain information of a data IPsec tunnel and/or information of a tunnel between the terminal and a second network, where the data IPsec tunnel is an IPsec tunnel used for transmitting user plane data between the terminal and the second network, or data of the tunnel between the terminal and the second network; and an executing module 172, configured to perform a second related operation for a tunnel of a first network based on the information of the data IPsec tunnel and/or the information of the tunnel between the terminal and the second network.

Optionally, when a preset condition is met, the second related operation for a tunnel of the first network is performed based on the information of the data IPsec tunnel and/or the information of the tunnel between the terminal and the second network.

The preset condition includes:

information about establishing a data IPsec tunnel and a newly established data IPsec tunnel is received from a proxy network element; and information about modification of a data IPsec tunnel and a modified data IPsec tunnel is received from a proxy network element.

Optionally, the performing a second related operation for a tunnel of a first network includes at least one of the following:

making a request to the first network for establishing a second tunnel;

making a request to the first network for modifying a fourth tunnel;

transmitting QoS information of a second tunnel to the first network;

transmitting modified QoS information of a fourth tunnel to the first network;

transmitting second QoS information to the first network;

requesting the first network to provide a standalone second tunnel or separate second QoS information for each data IPsec tunnel;

requesting the first network to provide a standalone second tunnel or separate second QoS information for the data IPsec tunnel;

requesting the first network to provide one second tunnel for a plurality of data IPsec tunnels, or to map data of a plurality of data IPsec tunnels to one second tunnel or one piece of second QoS information;

modifying a fourth tunnel for the data IPsec tunnel;

mapping the data IPsec tunnel to a fourth tunnel;

setting uplink and/or downlink packet filter information in QoS information of a second tunnel to the information of the data IPsec tunnel;

setting uplink and/or downlink packet filter information in second QoS information to the information of the data IPsec tunnel;

modifying uplink and/or downlink packet filter information in QoS information of a fourth tunnel to the information of the data IPsec tunnel, or adding the information of the data IPsec tunnel to uplink and/or downlink packet filter information in QoS information of a fourth tunnel;

setting a traffic descriptor component type identifier in QoS information of a second tunnel to a security parameter index type;

setting a traffic descriptor component type identifier in second QoS information to a security parameter index type;

modifying a traffic descriptor component type identifier in QoS information of a fourth tunnel to a security parameter index type;

setting QoS parameter information in QoS information of a second tunnel to QoS parameter information corresponding to a tunnel, associated with the data IPsec tunnel, between the terminal and the second network;

setting QoS parameter information in second QoS information to QoS flow description information corresponding to a tunnel, associated with the data IPsec tunnel, between the terminal and the second network;

modifying QoS parameter information in QoS information of a fourth tunnel to QoS parameter information corresponding to a tunnel, associated with the data IPsec tunnel, between the terminal and the second network, or adding such QoS parameter information to QoS parameter information in QoS information of a fourth tunnel; and transmitting the information of the data IPsec tunnel to the first network, where the second tunnel is used for transmitting data of the data IPsec tunnel, or used for transmitting data of the tunnel between the terminal and the second network, or used for transmitting user plane data between the terminal and the second network;

the fourth tunnel is a tunnel already established for the terminal and the first network; and the second QoS information is new QoS information.

Optionally, the QoS information of a second tunnel, and/or the second QoS information includes at least one of the following: uplink and/or downlink packet filter information, where the uplink and/or downlink packet filter information is the information of the data IPsec tunnel; a traffic descriptor component type identifier, where the traffic descriptor component type identifier is a security parameter index type; and QoS parameter information, where the QoS parameter information is QoS parameter information corresponding to the tunnel, associated with the data IPsec tunnel, between the terminal and the second network;

and/or the modified QoS information of a fourth tunnel includes at least one of the following: uplink packet filter information, where the uplink packet filter information is the information of the data IPsec tunnel or contains the information of the data IPsec tunnel; downlink packet filter information, where the downlink packet filter information is or contains the information of the data IPsec tunnel; a traffic descriptor component type identifier, where the traffic descriptor component type identifier is a security parameter index type; and QoS parameter information, where the QoS parameter information is or contains QoS parameter information corresponding to the tunnel, associated with the data IPsec tunnel, between the terminal and the second network.

Optionally, after establishment of the second tunnel is completed, granted QoS information sent by the first network is received containing second QoS information, second QoS information is granted by the first network, and/or transmission from the first network for granting establishment of the first tunnel is received, the performing a second related operation for a tunnel of a first network further includes at least one of the following:

transmitting, via the second tunnel, data of the data IPsec tunnel, data of the tunnel between the terminal and the second network, or user plane data between the terminal and the second network;

switching data of the data IPsec tunnel, data of the tunnel between the terminal and the second network, or user plane data between the terminal and the second network to the second tunnel for transmission; and establishing and/or saving an association between the second tunnel and the data IPsec tunnel;

and/or after modification of the fourth tunnel is completed, granted QoS information sent by the first network is received containing third QoS information, third QoS information is granted by the first network, and/or transmission from the first network for granting modification of a third tunnel is received, the performing a second related operation for a tunnel of a first network further includes at least one of the following:

transmitting data of the data IPsec tunnel via the fourth tunnel;

switching data of the data IPsec tunnel to the fourth tunnel for transmission; and updating an association between the fourth tunnel and an IPsec tunnel, where the IPsec tunnel associated with the fourth tunnel includes a data IPsec tunnel;

and/or after establishment of the second tunnel is rejected, modification of the fourth tunnel is rejected, granting the second QoS information is rejected, and/or the second tunnel is released, the second related operation for a tunnel of a first network further includes at least one of the following: making a request to the second network for releasing a tunnel, associated with a second IPsec tunnel, between the terminal and the second network, and returning to the second network that the tunnel, associated with a second IPsec tunnel, between the terminal and the second network fails to be established.

Optionally, when a first condition is met, the first network is requested to provide a standalone second tunnel for the data IPsec tunnel, or the first network is requested to provide separate second QoS information for the data IPsec tunnel, where the first condition includes at least one of the following:

the tunnel, associated with the data IPsec tunnel, between the terminal and the second network is a GBR tunnel or contains GBR related QoS parameter information;

a QoS class indication of the tunnel, associated with the data IPsec tunnel, between the terminal and the second network takes a value of N, where N is one of the following: 1, 5, 69, and 70;

the tunnel, associated with the data IPsec tunnel, between the terminal and the second network is a tunnel carrying voice traffic;

the tunnel, associated with the data IPsec tunnel, between the terminal and the second network is a tunnel carrying emergency traffic;

the tunnel, associated with the data IPsec tunnel, between the terminal and the second network is a tunnel carrying high priority traffic;

the obtained information of the tunnel between the terminal and the second network contains indication information of a separate bearer resource;

QoS information of the fourth tunnel is different from QoS information of the tunnel, associated with the data IPsec tunnel, between the terminal and the second network;

a QoS class indication of the fourth tunnel is different from a QoS class indication of the tunnel, associated with the data IPsec tunnel, between the terminal and the second network;

GBR related QoS parameter information of the fourth tunnel is different from GBR related QoS parameter information of the tunnel, associated with the data IPsec tunnel, between the terminal and the second network;

a priority of the fourth tunnel is different from a priority of the tunnel, associated with the data IPsec tunnel, between the terminal and the second network;

no fourth tunnel is a non-GBR tunnel, and the tunnel, associated with the data IPsec tunnel, between the terminal and the second network is a non-GBR tunnel; and uplink and/or downlink packet filter information of the fourth tunnel contains no information of the data IPsec tunnel;

and/or when a second condition is met, the first network is requested to provide one second tunnel for a plurality of data IPsec tunnels, the first network is requested to provide one piece of second QoS information for a plurality of data IPsec tunnels, to map data of a plurality of data IPsec tunnels to one second tunnel, or to map data of a plurality of data IPsec tunnels to one piece of second QoS information, where the second condition includes at least one of the following:

the tunnel, associated with the data IPsec tunnel, between the terminal and the second network is a non-GBR tunnel or contains no GBR related QoS parameter; and the obtained information of the tunnel between the terminal and the second network contains no indication information of a separate bearer resource, or contains indication information that no separate bearer resource is needed;

and/or when a third condition is met, the fourth tunnel is modified for the data IPsec tunnel, where the third condition includes at least one of the following:

the tunnel, associated with the data IPsec tunnel, between the terminal and the second network is a non-GBR tunnel;

the obtained information of the tunnel between the terminal and the second network contains no indication information of a separate bearer resource, or contains indication information that no separate bearer resource is needed;

QoS information of the fourth tunnel is different from QoS information of the tunnel, associated with the data IPsec tunnel, between the terminal and the second network;

a QoS class indication of the fourth tunnel is the same as a QoS class indication of the tunnel, associated with the data IPsec tunnel, between the terminal and the second network;

GBR related QoS parameter information of the fourth tunnel is different from GBR related QoS parameter information of the tunnel, associated with the data IPsec tunnel, between the terminal and the second network;

a priority of the fourth tunnel is different from a priority of the tunnel, associated with the data IPsec tunnel, between the terminal and the second network;

the existing fourth tunnel is a non-GBR tunnel, and the tunnel, associated with the data IPsec tunnel, between the terminal and the second network is a non-GBR tunnel; and uplink and/or downlink packet filter information of the fourth tunnel contains no information of the data IPsec tunnel;

and/or when a fourth condition is met, the data IPsec tunnel is mapped to the fourth tunnel, where the fourth condition includes at least one of the following:

QoS information of the fourth tunnel is the same as QoS information of the tunnel, associated with the data IPsec tunnel, between the terminal and the second network;

a QoS parameter requirement of the fourth tunnel is higher than or the same as a QoS parameter requirement of the tunnel, associated with the data IPsec tunnel, between the terminal and the second network;

a QoS class indication of the fourth tunnel is higher than or the same as a QoS class indication of the tunnel, associated with the data IPsec tunnel, between the terminal and the second network;

the existing fourth tunnel is a non-GBR tunnel, and a tunnel, associated with the data IPsec tunnel, between the terminal and the second network is a non-GBR tunnel; and uplink and/or downlink packet filter information of the fourth tunnel contains information of the data IPsec tunnel.

Optionally, when the data IPsec tunnel is associated with one tunnel between the terminal and the second network, the setting QoS parameter information of a second tunnel to QoS parameter information corresponding to a tunnel, associated with the data IPsec tunnel, between the terminal and the second network includes at least one of the following:

setting or modifying a QoS class indication of the second tunnel to a QoS class indication corresponding to the tunnel, associated with the data IPsec tunnel, between the terminal and the second network;

setting or modifying a priority of the second tunnel to a priority of the tunnel, associated with the data IPsec tunnel, between the terminal and the second network;

setting or modifying a packet delay budget of the second tunnel to a packet delay budget of the tunnel, associated with the data IPsec tunnel, between the terminal and the second network;

setting or modifying a packet error rate of the second tunnel to a packet error rate of the tunnel, associated with the data IPsec tunnel, between the terminal and the second network;

setting or modifying a default maximum data burst volume of the second tunnel to a default maximum data burst volume of the tunnel, associated with the data IPsec tunnel, between the terminal and the second network;

setting or modifying a default averaging window of the second tunnel to a default averaging window of the tunnel, associated with the data IPsec tunnel, between the terminal and the second network;

when no averaging window is present for the tunnel, associated with the data IPsec tunnel, between the terminal and the second network, setting or modifying the second tunnel to have no default averaging window;

setting or modifying an uplink GBR or GFBR of the second tunnel to an uplink GBR or GFBR of the tunnel, associated with the data IPsec tunnel, between the terminal and the second network;

setting or modifying a downlink GBR or GFBR of the second tunnel to a downlink GBR or GFBR of the tunnel, associated with the data IPsec tunnel, between the terminal and the second network;

setting or modifying an uplink MBR or MFBR of the second tunnel to an uplink MBR or MFBR of the tunnel, associated with the data IPsec tunnel, between the terminal and the second network; and setting or modifying a downlink MBR or MFBR of the second tunnel to a downlink MBR or MFBR of the tunnel, associated with the data IPsec tunnel, between the terminal and the second network;

and/or when a multi-tunnel condition is met, the setting QoS parameter information of a second tunnel to QoS parameter information corresponding to a tunnel, associated with the data IPsec tunnel, between the terminal and the second network includes at least one of the following:

setting or modifying QoS parameter information of the second tunnel to QoS parameter information having a highest QoS requirement in QoS parameter information corresponding to the tunnels, associated with the data IPsec tunnel, between the terminal and the second network;

setting or modifying a QoS class indication of the second tunnel to a QoS class indication having a highest priority in QoS class indications corresponding to the tunnels, associated with the data IPsec tunnel, between the terminal and the second network;

when there is no standardized QoS class indication corresponding to a combination of the following QoS parameter information of the second tunnel: a priority, a packet delay budget, a packet error rate, a maximum data burst volume, whether it is GBR, and/or whether a default averaging window requirement is set, setting or modifying a QoS class indication of the second tunnel to be a non-standardized QoS class indication or contain no QoS class indication;

when there is no standardized QoS class indication corresponding to QoS parameter information of the second tunnel except for a QoS class indication, setting or modifying the QoS class indication of the second tunnel to be a non-standardized QoS class indication or contain no QoS class indication;

setting or modifying a priority of the second tunnel to a priority with a highest value in priorities corresponding to the tunnels, associated with the data IPsec tunnel, between the terminal and the second network;

setting or modifying a packet delay budget of the second tunnel to a packet delay budget with a lowest value in packet delay budgets corresponding to the tunnels, associated with the data IPsec tunnel, between the terminal and the second network;

setting or modifying a packet error rate of the second tunnel to a packet error rate with a lowest value in packet error rates corresponding to the tunnels, associated with the data IPsec tunnel, between the terminal and the second network; and setting or modifying a default maximum data burst volume of the second tunnel to a default maximum data burst volume with a largest value in default maximum data burst volumes corresponding to the tunnels, associated with the data IPsec tunnel, between the terminal and the second network;

when a tunnel requiring an averaging window is present in the tunnels, associated with the data IPsec tunnel, between the terminal and the second network, setting or modifying the second tunnel to have a default averaging window requirement;

when a GBR tunnel is present in the tunnels, associated with the data IPsec tunnel, between the terminal and the second network, performing at least one of the following:

setting or modifying the second tunnel to a GBR tunnel;

setting or modifying a GFBR or GBR of the second tunnel to a largest value in GFBRs or GBRs corresponding to the plurality of tunnels, associated with the data IPsec tunnel, of the second network;

setting or modifying an MFBR or MBR of the second tunnel to a largest value in MFBRs or MBRs corresponding to the plurality of tunnels, associated with the data IPsec tunnel, of the second network;

setting or modifying an uplink GFBR or GBR of the second tunnel to a largest value in uplink GFBRs or GBRs corresponding to the plurality of tunnels, associated with the data IPsec tunnel, of the second network;

setting or modifying an uplink MFBR or MBR of the second tunnel to a largest value in uplink MFBRs or MBRs corresponding to the plurality of tunnels, associated with the data IPsec tunnel, of the second network;

setting or modifying a downlink GFBR or GBR of the second tunnel to a largest value in downlink GFBRs corresponding to the plurality of tunnels, associated with the data IPsec tunnel, of the second network; and setting or modifying a downlink MFBR or MBR of the second tunnel to a largest value in downlink MFBRs corresponding to the plurality of tunnels, associated with the data IPsec tunnel, of the second network;

when the data IPsec tunnel is associated with a tunnel having a QoS class indication of N between the terminal and the second network, setting or modifying a QoS class indication of the second tunnel to N, or modifying a QoS class indication of the fourth tunnel to N, where a value of N is obtained from the first network or includes one of the following: 1, 5, 69, and 70;

when the data IPsec tunnel is associated with a tunnel carrying voice traffic between the terminal and the second network, setting or modifying QoS parameter information of the second tunnel to QoS parameter information corresponding to voice traffic;

when the data IPsec tunnel is associated with a tunnel carrying emergency traffic between the terminal and the second network, setting or modifying QoS parameter information of the second tunnel to QoS parameter information corresponding to emergency traffic;

when the data IPsec tunnel is associated with a tunnel carrying high priority traffic between the terminal and the second network, setting or modifying QoS parameter information of the second tunnel to QoS parameter information corresponding to high priority traffic;

when a standardized QoS class indication is present for a QoS flow of the second network contained in the data IPsec tunnel, setting or modifying a QoS class indication of the second tunnel to the standardized QoS class indication; and setting QoS parameter information of the second tunnel to QoS parameter information corresponding to a tunnel, newly associated with the data IPsec tunnel, between the terminal and the second network, where the multi-tunnel condition includes at least one of the following:

the data IPsec tunnel is associated with a plurality of tunnels of the second network;

the data IPsec tunnel is newly associated with a tunnel between the terminal and the second network, and the newly associated tunnel between the terminal and the second network has a highest QoS requirement in the tunnels, associated with the data IPsec tunnel, between the terminal and the second network; and the data IPsec tunnel removes association with a tunnel between the terminal and the second network, and the association-removed tunnel between the terminal and the second network has a higher QoS requirement than the tunnels, associated with the data IPsec tunnel, between the terminal and the second network.

Optionally, when the data IPsec tunnel is associated with a plurality of tunnels of the second network, the setting QoS parameter information of a fourth tunnel to QoS parameter information corresponding to a tunnel, associated with the data IPsec tunnel, between the terminal and the second network includes at least one of the following:

modifying the QoS parameter information of the fourth tunnel to QoS parameter information having a highest QoS requirement in QoS parameter information corresponding to the tunnels, associated with the data IPsec tunnel, between the terminal and the second network;

modifying a QoS class indication of the fourth tunnel to a QoS class indication having a highest priority in QoS class indications corresponding to the tunnels, associated with the data IPsec tunnel, between the terminal and the second network;

when there is no standardized QoS class indication corresponding to a combination of the following QoS parameter information of the fourth tunnel: a priority, a packet delay budget, a packet error rate, a maximum data burst volume, whether a GBR is set, and/or whether a default averaging window requirement is set, modifying a QoS class indication of the fourth tunnel to be a non-standardized QoS class indication or contain no QoS class indication;

when there is no standardized QoS class indication corresponding to QoS parameter information of the fourth tunnel except for a QoS class indication, modifying the QoS class indication of the fourth tunnel to be a non-standardized QoS class indication or contain no QoS class indication;

modifying a priority of the fourth tunnel to a priority with a highest value in priorities corresponding to the tunnels, associated with the data IPsec tunnel, between the terminal and the second network;

modifying a packet delay budget of the fourth tunnel to a packet delay budget with a lowest value in packet delay budgets corresponding to the tunnels, associated with the data IPsec tunnel, between the terminal and the second network;

modifying a packet error rate of the fourth tunnel to a packet error rate with a lowest value in packet error rates corresponding to the tunnels, associated with the data IPsec tunnel, between the terminal and the second network;

modifying a default maximum data burst volume of the fourth tunnel to a default maximum data burst volume with a largest value in default maximum data burst volumes corresponding to the tunnels, associated with the data IPsec tunnel, between the terminal and the second network; and when a tunnel requiring an averaging window is present in the tunnels, associated with the data IPsec tunnel, between the terminal and the second network, modifying the fourth tunnel to have a default averaging window requirement;

when a GBR tunnel is present in the tunnels, associated with the data IPsec tunnel, between the terminal and the second network, performing at least one of the following:

modifying the fourth tunnel to a GBR tunnel;

modifying a GFBR or GBR of the fourth tunnel to a largest value in GFBRs or GBRs corresponding to the plurality of tunnels, associated with the data IPsec tunnel, of the second network;

modifying an MFBR or MBR of the fourth tunnel to a largest value in MFBRs or MBRs corresponding to the plurality of tunnels, associated with the data IPsec tunnel, of the second network;

modifying an uplink GFBR or GBR of the fourth tunnel to a largest value in uplink GFBRs or GBRs corresponding to the plurality of tunnels, associated with the data IPsec tunnel, of the second network;

modifying an uplink MFBR or MBR of the fourth tunnel to a largest value in uplink MFBRs or MBRs corresponding to the plurality of tunnels, associated with the data IPsec tunnel, of the second network;

modifying a downlink GFBR or GBR of the fourth tunnel to a largest value in downlink GFBRs corresponding to the plurality of tunnels, associated with the data IPsec tunnel, of the second network; and modifying a downlink MFBR or MBR of the fourth tunnel to a largest value in downlink MFBRs corresponding to the plurality of tunnels, associated with the data IPsec tunnel, of the second network;

when the data IPsec tunnel is associated with a tunnel having a QoS class indication of N between the terminal and the second network, modifying a QoS class indication of the fourth tunnel to N, where a value of N is obtained from the first network or includes one of the following: 1, 5, 69, and 70;

when the data IPsec tunnel is associated with a tunnel carrying voice traffic between the terminal and the second network, modifying QoS parameter information of the fourth tunnel to QoS parameter information corresponding to voice traffic;

when the data IPsec tunnel is associated with a tunnel carrying emergency traffic between the terminal and the second network, modifying QoS parameter information of the fourth tunnel to QoS parameter information corresponding to emergency traffic;

when the data IPsec tunnel is associated with a tunnel carrying high priority traffic between the terminal and the second network, modifying QoS parameter information of the fourth tunnel to QoS parameter information corresponding to high priority traffic; and when a standardized QoS class indication is present for a QoS flow of the second network contained in the data IPsec tunnel, modifying a QoS class indication of the fourth tunnel to the standardized QoS class indication.

Optionally, the second tunnel and/or the fourth tunnel is a QoS flow;

and/or the second tunnel is a second QoS flow or a QoS flow in a first PDU session;

and/or the fourth tunnel is an existing QoS flow in a first PDU session;

and/or a tunnel between the terminal and the second network is a QoS flow between the terminal and the second network;

and/or a tunnel between the terminal and the second network is a QoS flow of the second network;

and/or the second tunnel is a second QoS flow, and the making a request to the first network for establishing a second tunnel includes at least one of the following:

making a request to the first network for adding a second QoS flow in a first PDU session; and transmitting to the first network a request for modifying a first PDU session or for establishing a first PDU session, the request for modifying a first PDU session or for establishing a first PDU session containing QoS information of a second QoS flow requested to be established;

and/or the second tunnel is a second QoS flow, the fourth tunnel is an existing QoS flow in a first PDU session, and the making a request to the first network for modifying a fourth tunnel to a first tunnel includes at least one of the following:

making a request to the first network for modifying a fourth QoS flow in a first PDU session; and transmitting to the first network a request for modifying a first PDU session, where the request for modifying a first PDU session contains QoS information of a fourth QoS flow requested to be modified, and the first PDU session is a PDU session in the first network used for transmitting information between the terminal and the second network.

Optionally, the information of the data IPsec tunnel includes at least one of the following: an identifier of the data IPsec tunnel, a protocol field indicating ESP, a security parameter index of the data IPsec tunnel, and identifier information of a tunnel, associated with the data IPsec tunnel, between the terminal and the second network;

and/or the information of the tunnel between the terminal and the second network includes at least one of the following: an identifier of the data IPsec tunnel associated with the tunnel between the terminal and the second network, a security parameter index of the data IPsec tunnel associated with the tunnel between the terminal and the second network, a new tunnel between the terminal and the second network, a removed tunnel between the terminal and the second network, QoS parameter information of the tunnel between the terminal and the second network, indication information of a separate bearer resource, and indication information that no separate bearer resource is needed.

Optionally, the identifier information of a tunnel, associated with the data IPsec tunnel, between the terminal and the second network includes a QoS flow identifier, and an identifier of a PDU session to which a QoS flow belongs.

The QoS information includes at least one of the following: whether GBR or non-GBR, a QoS class indication (5QI or QFI), a priority, a packet delay budget, a packet error rate, a default maximum data volume, a default averaging window, an uplink GBR, a downlink GBR, an uplink MBR, a downlink MBR, an uplink GFBR, a downlink GFBR, an uplink MFBR, a downlink MFBR, a traffic descriptor component type identifier, and packet filter information.

Optionally, the obtaining module is configured to obtain the information of the data IPsec tunnel from a proxy network element and/or obtaining the information of the tunnel between the terminal and the second network from the second network.

Optionally, the second QoS flow is a non-default QoS flow.

Figure 18:
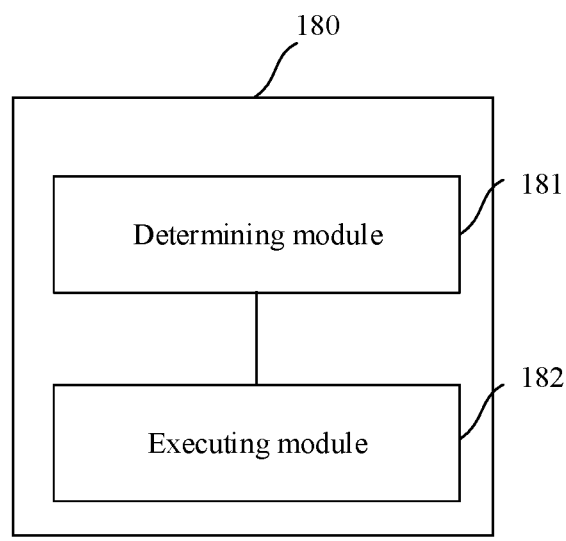
FIG. 18 is a schematic structural diagram of a proxy network element according to an embodiment of this disclosure.

Referring to FIG. 18, an embodiment of this disclosure further provides a proxy network element 180, including:

a determining module 181, configured to determine whether a preset condition is met; and an executing module 182, configured to, when it is determined that the preset condition is met, perform an operation related to a data IPsec tunnel for a tunnel of a second network.

The proxy network element is a proxy of a first network for interacting with the second network.

Optionally, the preset condition includes at least one of the following:

a request for establishing a tunnel between the terminal and the second network is received;

a request for modifying a tunnel between the terminal and the second network is received;

the proxy network element provides 3GPP access;

the first network is a 3GPP network; and an operation of mapping a tunnel between the terminal and the second network to an IPsec tunnel is performed.

Optionally, the performing an operation related to a data IPsec tunnel for a tunnel of a second network includes at least one of the following:

determining a mapping from a tunnel between the terminal and the second network to a data IPsec tunnel;

establishing a standalone data IPsec tunnel for each tunnel between the terminal and the second network, or establishing different data IPsec tunnels for different tunnels between the terminal and the second network;

establishing a standalone data IPsec tunnel for each GBR tunnel between the terminal and the second network;

when a tunnel between the terminal and the second network meets a separate-bearer condition, establishing a standalone data IPsec tunnel for the tunnel between the terminal and the second network;

establishing a non-GBR-specific data IPsec tunnel for a tunnel between the terminal and the second network;

mapping one or more non-GBR tunnels between the terminal and the second network to one data IPsec tunnel;

establishing a priority-specific data IPsec tunnel for a tunnel between the terminal and the second network;

mapping one or more tunnels with a same priority between the terminal and the second network to one data IPsec tunnel;

establishing different data IPsec tunnels for tunnels with different priorities between the terminal and the second network, or mapping tunnels with different priorities between the terminal and the second network to different data IPsec tunnels;

establishing a data IPsec tunnel specific to GBR related QoS parameter information for a tunnel between the terminal and the second network;

establishing different data IPsec tunnels for tunnels with different GBR related QoS parameter information between the terminal and the second network, or mapping tunnels with different GBR related QoS parameter information between the terminal and the second network to different data IPsec tunnels;

mapping one or more tunnels with same GBR related QoS parameter information between the terminal and the second network to one data IPsec tunnel;

establishing a QoS class indication-specific data IPsec tunnel for a tunnel between the terminal and the second network;

establishing different data IPsec tunnels for tunnels with different QoS class indications between the terminal and the second network, or mapping tunnels with different QoS class indications between the terminal and the second network to different data IPsec tunnels;

mapping one or more tunnels with a same QoS class indication between the terminal and the second network to one data IPsec tunnel;

establishing a QoS class indication-specific data IPsec tunnel for a tunnel between the terminal and the second network;

establishing different data IPsec tunnels for tunnels with different QoS class indications between the terminal and the second network; and mapping a plurality of tunnels with same QoS parameter information between the terminal and the second network to one data IPsec tunnel.

The separate-bearer condition includes at least one of the following:

a tunnel between the terminal and the second network is a GBR tunnel;

a QoS class indication of a tunnel between the terminal and the second network takes a value of N, where N is one of the following: 1, 5, 69, and 70;

a tunnel between the terminal and the second network is a tunnel carrying voice traffic;

a tunnel between the terminal and the second network is a tunnel carrying emergency traffic;

a tunnel between the terminal and the second network is a tunnel carrying high priority traffic;

a received request for establishing a tunnel between the terminal and the second network carries indication information of a separate bearer resource;

QoS information of an existing tunnel, associated with the data IPsec tunnel, between the terminal and the second network is different from QoS information of a tunnel requested to be established between the terminal and the second network;

a QoS class indication of an existing tunnel, associated with the data IPsec tunnel, between the terminal and the second network is different from a QoS class indication of a tunnel requested to be established between the terminal and the second network;

GBR related QoS parameter information of an existing tunnel, associated with the data IPsec tunnel, between the terminal and the second network is different from GBR related QoS parameter information of a tunnel requested to be established between the terminal and the second network;

a priority of an existing tunnel, associated with the data IPsec tunnel, between the terminal and the second network is different from a priority of a tunnel requested to be established between the terminal and the second network; and no non-GBR tunnel is present in existing tunnels, associated with the data IPsec tunnel, between the terminal and the second network, and a tunnel requested to be established between the terminal and the second network is a non-GBR tunnel.

Optionally, the tunnel is a QoS flow;

and/or a tunnel between the terminal and the second network is a QoS flow of the second network.

Figure 19:
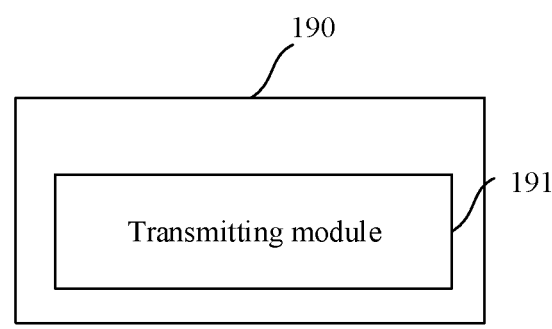
FIG. 19 is a schematic structural diagram of a communications network element according to an embodiment of this disclosure.

Referring to FIG. 19, an embodiment of this disclosure further provides a communications network element 190, including:

a transmitting module 191, configured to transmit information of a tunnel between a terminal and a second network, where the information of the tunnel between the terminal and the second network includes at least one of the following: an identifier of a data IPsec tunnel associated with a tunnel between the terminal and the second network, a security parameter index of a data IPsec tunnel associated with a tunnel between the terminal and the second network, a new tunnel between the terminal and the second network, a removed tunnel between the terminal and the second network, QoS parameter information of a tunnel between the terminal and the second network, indication information of a separate bearer resource, and indication information that no separate bearer resource is needed.

Optionally, the transmitting information of a tunnel between a terminal and a second network includes:

transmitting the information of the tunnel between the terminal and the second network to at least one of the following: the terminal, and a proxy network element.

Optionally, when a preset condition is met, the information of the tunnel between the terminal and the second network is transmitted, where the preset condition includes: the terminal accesses the second network via a first network that is a 3GPP network.

Figure 20:
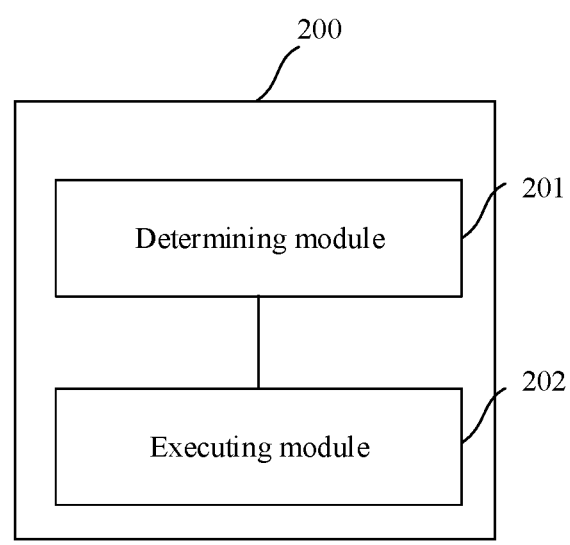
FIG. 20 is a schematic structural diagram of a terminal according to yet another embodiment of this disclosure.

Referring to FIG. 20, an embodiment of this disclosure further provides a terminal 200, including:

an obtaining module 201, configured to obtain information of an IPsec tunnel, where the IPsec tunnel is used for transmitting control signaling between the terminal and a second network; and an executing module 202, configured to perform a related operation for a tunnel of a first network based on the information of the IPsec tunnel.

Optionally, the performing a related operation for a tunnel of a first network includes at least one of the following:

making a request to the first network for establishing or modifying a tunnel of the first network;

setting packet filter information of a tunnel of the first network to information of a first IPsec tunnel;

requesting the first network to provide one tunnel of the first network for each of IPsec tunnel, where the tunnel of the first network is used for transmitting data of the IPsec tunnel; and transmitting packet filter information of a tunnel of the first network to the first network.

Optionally, the information of the IPsec tunnel includes at least one of the following:

an identifier of the IPsec tunnel;

a protocol field indicating ESP; and a security parameter index of the IPsec tunnel.

Optionally, the information between the terminal and the second network includes at least one of the following:

control signaling between the terminal and the second network;

user plane data between the terminal and the second network;

data of a QoS flow between the terminal and the second network; and data of an IPsec tunnel for transmitting information between the terminal and the second network.

Optionally, when the IPsec tunnel is released, or the terminal is detached from the second network, the performing a related operation for a tunnel of a first network includes making a request to the first network for releasing a tunnel for transmitting data of the IPsec tunnel.

Figure 21:
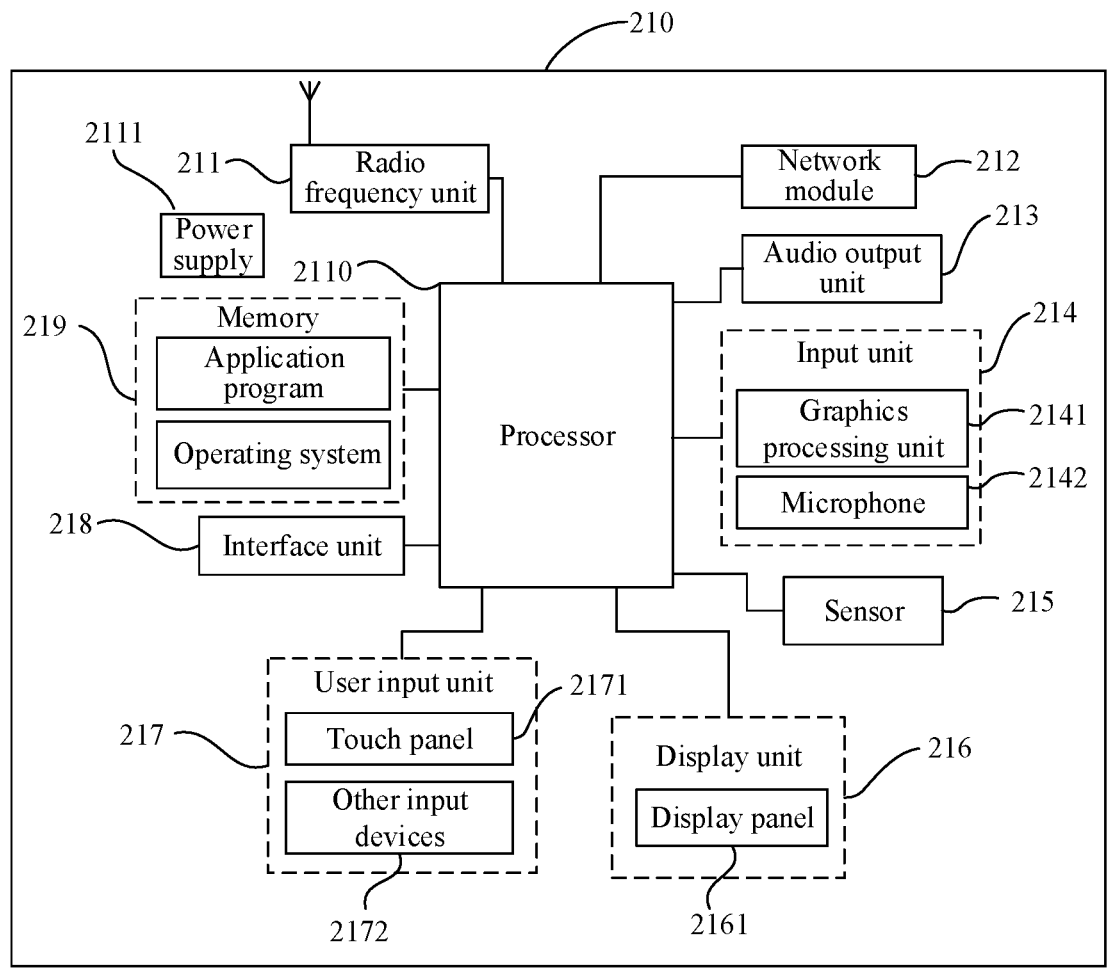
FIG. 21 is a schematic structural diagram of a terminal according to a further embodiment of this disclosure.

Referring to FIG. 21, FIG. 21 is a schematic structural diagram of a terminal according to another embodiment of this disclosure. The terminal 210 includes, but is not limited to, components such as a radio frequency unit 211, a network module 212, an audio output unit 213, an input unit 214, a sensor 215, a display unit 216, a user input unit 217, an interface unit 218, a memory 219, a processor 2110, and a power supply 2111. A person skilled in the art may understand that the terminal structure shown in FIG. 21 does not constitute a limitation to the terminal. The terminal may include more or fewer components than those shown in the figure, or combine some components, or have a different arrangement of components. In this embodiment of this disclosure, the terminal includes, but is not limited to, a mobile phone, a tablet computer, a notebook computer, a palmtop computer, an in-vehicle terminal, a wearable device, a pedometer, or the like.

The processor 2110 is configured to: obtain information of a first internet protocol security (Ipsec) tunnel, where the first IPsec tunnel is an IPsec tunnel used for transmitting control signaling between the terminal and a second network; and perform a first related operation for a tunnel of a first network based on the information of the first IPsec tunnel.

Alternatively, the processor 2110 is configured to: obtain information of a data IPsec tunnel and/or information of a tunnel between the terminal and a second network, where the data IPsec tunnel is an IPsec tunnel used for transmitting user plane data between the terminal and the second network, or data of the tunnel between the terminal and the second network; and perform a second related operation for a tunnel of a first network based on the information of the data IPsec tunnel and/or the information of the tunnel between the terminal and the second network.

Alternatively, the processor 2110 is configured to: obtain information of an IPsec tunnel, where the IPsec tunnel is used for transmitting information between the terminal and a second network; and perform a related operation for a tunnel of a first network based on the information of the IPsec tunnel.

It should be understood that, in this embodiment of this disclosure, the radio frequency unit 211 may be configured to send or receive a signal in an information sending/receiving or call process. Specifically, the radio frequency unit 211 receives downlink data from a base station and sends the downlink data to the processor 2110 for processing; and sends uplink data to the base station. Usually, the radio frequency unit 211 includes, but is not limited to, an antenna, at least one amplifier, a transceiver, a coupler, a low noise amplifier, a duplexer, and the like. In addition, the radio frequency unit 211 may further communicate with a network and another device via a wireless communications system.

The terminal provides a user with wireless broadband internet access through the network module 212, for example, helping the user to send or receive an email, to browse a web page, or to access streaming media.

The audio output unit 213 may convert audio data into an audio signal, and output the audio signal as sound, where the audio data is received by the radio frequency unit 211 or the network module 212, or stored in the memory 219. In addition, the audio output unit 213 may further provide audio output (for example, a call signal reception tone or a message reception tone) that is related to a specific function performed by the terminal 210. The audio output unit 213 includes a loudspeaker, a buzzer, a phone receiver, and the like.

The input unit 214 is configured to receive an audio signal or a video signal. The input unit 214 may include a graphics processing unit (GPU) 2141 and a microphone 2142, and the graphics processing unit 2141 processes image data of a still picture or a video obtained by an image capture apparatus (for example, a camera) in an image capture mode or a video capture mode. A processed image frame may be displayed on the display unit 216. An image frame processed by the graphics processing unit 2141 may be stored in the memory 219 (or another storage medium), or may be sent by the radio frequency unit 211 or the network module 212. The microphone 2142 may receive a sound, and can process the sound into audio data. In a phone call mode, processed audio data may be converted, for output, into a format for transmission by the radio frequency unit 211 to a mobile communications base station.

The terminal 210 further includes at least one sensor 215, for example, an optical sensor, a motion sensor, and other sensors. Specifically, the optical sensor includes an ambient light sensor and a proximity sensor. The ambient light sensor may adjust brightness of a display panel 2161 based on intensity of ambient light. When the terminal 210 moves near an ear, the proximity sensor may shut down the display panel 2161 and/or backlight. As a motion sensor, an accelerometer sensor may detect accelerations in various directions (there are usually three axes), may detect the magnitude and direction of gravity when the terminal is static, and may be configured for terminal posture recognition (for example, landscape/portrait mode switching, a related game, or magnetometer posture calibration), and functions related to vibration recognition (for example, a pedometer or tapping) and the like. The sensor 215 may further include a fingerprint sensor, a pressure sensor, an iris sensor, a molecular sensor, a gyroscope, a barometer, a hygrometer, a thermometer, or an infrared sensor. Details are not described herein.

The display unit 216 is configured to display information input by the user or information provided for the user. The display unit 216 may include a display panel 2161, and the display panel 2161 may be configured in the form of a liquid crystal display (LCD), an organic light-emitting diode (OLED), or the like.

The user input unit 217 may be configured to receive input digit or character information, and generate key signal input that is related to user setting and function control of the terminal. Specifically, the user input unit 217 includes a touch panel 2171 and other input devices 2172. The touch panel 2171 is also referred to as a touchscreen and can collect a touch operation of a user on or near the touch panel 2171 (for example, an operation performed by the user on the touch panel 2171 or near the touch panel 2171 with a finger or by using any appropriate object or accessory such as a stylus). The touch panel 2171 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, sends the touch point coordinates to the processor 2110, and receives and executes a command sent by the processor 2110. In addition, the touch panel 2171 may be implemented in a plurality of types, for example, as a resistive, capacitive, infrared, or surface acoustic wave touch panel. In addition to the touch panel 2171, the user input unit 217 may further include the other input devices 2172. Specifically, the other input devices 2172 may include, but are not limited to, a physical keyboard, a function key (for example, a volume control key or a power on/off key), a track ball, a mouse, and a joystick. Details are not described herein again.

Further, the touch panel 2171 may cover the display panel 2161. After detecting a touch operation on or near the touch panel 2171, the touch panel 2171 transmits the touch operation to the processor 2110 to determine a type of a touch event. Then the processor 2110 provides corresponding visual output on the display panel 2161 based on the type of the touch event. In FIG. 21, the touch panel 2171 and the display panel 2161 serve as two separate components to implement input and output functions of the terminal. However, in some embodiments, the touch panel 2171 and the display panel 2161 may be integrated to implement the input and output functions of the terminal. This is not specifically limited herein.

The interface unit 218 is an interface for connecting an external apparatus to the terminal 210. For example, the external apparatus may include a wired or wireless headphone port, an external power (or battery charger) port, a wired or wireless data port, a memory card port, a port for connecting an apparatus having an identification module, an audio input/output (I/O) port, a video I/O port, or an earphone port. The interface unit 218 may be configured to: receive input (for example, data information and power) from the external apparatus, and transmit the received input to one or more elements in the terminal 210, or may be configured to transmit data between the terminal 210 and the external apparatus.

The memory 219 may be configured to store software programs and various types of data. The memory 219 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 219 may include a high-speed random access memory, or may further include a nonvolatile memory, for example, at least one magnetic disk storage device or a flash memory device, or other volatile solid-state storage devices.

The processor 2110 is a control center of the terminal, connects various parts of the entire terminal by using various interfaces and lines, and executes various functions and data processing of the terminal by running or executing a software program and/or a module stored in the memory 219 and invoking data stored in the memory 219, so as to perform overall monitoring on the terminal. The processor 2110 may include one or more processing units. Optionally, the processor 2110 may integrate an application processor and a modem processor. The application processor mainly processes an operating system, a user interface, an application program, and the like. The modem processor mainly processes wireless communication. It can be understood that the modem processor may be alternatively not integrated in the processor 2110.

The terminal 210 may further include a power supply 2111 (for example, a battery) that supplies power to the components. Optionally, the power supply 2111 may be logically connected to the processor 2110 by using a power management system, so as to implement functions such as charging management, discharging management, and power consumption management by using the power management system.

In addition, the terminal 210 includes some functional modules that are not shown. Details are not described herein.

An embodiment of this disclosure further provides a terminal, where the terminal includes a processor and a memory. In this embodiment of this disclosure, the terminal further includes a computer program stored in the memory and capable of running on the processor. When the computer program is executed by the processor, the following steps are implemented:

obtaining information of a first IPsec tunnel, where the first IPsec tunnel is an IPsec tunnel used for transmitting control signaling between the terminal and a second network; and performing a first related operation for a tunnel of a first network based on the information of the first IPsec tunnel.

The processor is responsible for management of the bus architecture and general processing, and the memory may store data that is used by the processor to perform an operation.

Optionally, the performing a first related operation for a tunnel of a first network includes at least one of the following:

making a request to the first network for establishing a first tunnel;

making a request to the first network for modifying a third tunnel to a first tunnel;

transmitting QoS information of a first tunnel to the first network;

transmitting modified QoS information of a third tunnel to the first network;

transmitting first QoS information to the first network;

setting uplink and/or downlink packet filter information in QoS information of a first tunnel to the information of the first IPsec tunnel;

setting uplink and/or downlink packet filter information in first QoS information to the information of the first IPsec tunnel;

modifying uplink and/or downlink packet filter information in QoS information of a third tunnel to the information of the first IPsec tunnel;

setting a traffic descriptor component type identifier in QoS information of a first tunnel to a security parameter index type;

setting a traffic descriptor component type identifier in first QoS information to a security parameter index type;

modifying a traffic descriptor component type identifier in QoS information of a third tunnel to a security parameter index type;

setting a first tunnel to a non-guaranteed bit rate (non-GBR) tunnel;

setting QoS information of a first tunnel or first QoS information to contain no GBR related QoS parameter information;

modifying a third tunnel to a non-GBR tunnel;

setting QoS information of a third tunnel to contain no GBR related QoS parameter information;

setting QoS class indication information in QoS information of a first tunnel to first QoS class indication information;

setting QoS class indication information in first QoS information to first QoS class indication information;

modifying QoS class indication information in QoS information of a third tunnel to first QoS class indication information;

setting a QoS priority in QoS information of a first tunnel to a first QoS priority;

setting a QoS priority in first QoS information to a first QoS priority;

modifying a QoS priority in QoS information of a third tunnel to a first QoS priority; and transmitting the information of the first IPsec tunnel to the first network;

where the first tunnel is used for transmitting data of the first IPsec tunnel, or used for transmitting control signaling between the terminal and the second network;

the third tunnel is a tunnel already established for the terminal and the first network; and the first QoS information is new QoS information.

Optionally, the QoS information of a first tunnel, the modified QoS information of a third tunnel, and/or the first QoS information contains no GBR related QoS parameter information;

and/or the QoS information of a first tunnel, the modified QoS information of a third tunnel, and/or the first QoS information includes at least one of the following: uplink and/or downlink packet filter information, where the uplink and/or downlink packet filter information is the information of the first IPsec tunnel; a traffic descriptor component type identifier, where the traffic descriptor component type identifier is a security parameter index type; and QoS flow class indication information, where the QoS flow class indication information is first QoS class indication information.

Optionally, after establishment of the first tunnel is completed, establishment of the first tunnel is granted, the first QoS information is granted, the modified QoS information of the third tunnel is granted, and/or the third tunnel is modified and converted to the first tunnel, the first related operation for a tunnel of a first network further includes at least one of the following:

transmitting control signaling between the terminal and the second network or data of the first IPsec tunnel via the first tunnel;

switching control signaling between the terminal and the second network or data of the first IPsec tunnel to the first tunnel for transmission; and establishing and/or saving an association between the first tunnel and the first IPsec tunnel;

and/or after establishment of the first tunnel is rejected, modification of the third tunnel is rejected, granting the first QoS information is rejected, and/or the first tunnel is released, the first related operation for a tunnel of a first network further includes at least one of the following: initiating a de-registration request to the second network, and turning into a de-registered state.

Optionally, the first tunnel and/or the third tunnel is a QoS flow;

and/or the first tunnel is a first QoS flow or a QoS flow in a first PDU session;

and/or the third tunnel is an existing QoS flow in a first PDU session;

and/or the first tunnel is a first QoS flow, and the making a request to the first network for establishing a first tunnel includes at least one of the following:

making a request to the first network for establishing a first QoS flow in a first PDU session; and transmitting to the first network a request for modifying a first PDU session or for establishing a first PDU session, where the request for modifying a first PDU session or for establishing a first PDU session contains QoS information of a first QoS flow requested to be established or first QoS information;

and/or the first tunnel is a first QoS flow, the third tunnel is an existing QoS flow in a first PDU session, and the making a request to the first network for modifying a third tunnel to a first tunnel includes at least one of the following:

making a request to the first network for modifying a third QoS flow in a first PDU session; and transmitting to the first network a request for modifying a first PDU session;

where the request for modifying a first PDU session contains QoS information of a third QoS flow requested to be modified, and the first PDU session is a PDU session in the first network used for transmitting information between the terminal and the second network;

and/or the first QoS class indication information and/or the first priority is used for indicating a request for a separate radio bearer resource;

and/or the first QoS class indication information includes at least one of the following: an operator-specific QoS class indication; a non-standardized first QoS class indication, where the non-standardized first QoS class indication takes a value of 5 or 69; and a non-GBR QoS class indication;

and/or the first priority information takes a value of 5.

Optionally, the information of the first IPsec tunnel includes at least one of the following: an identifier of the first IPsec tunnel, a protocol field indicating ESP, a security parameter index SPI of the first IPsec tunnel, and information of the second network associated with the first IPsec tunnel.

Optionally, the first QoS flow is a non-default QoS flow.

Optionally, the obtaining information of a first IPsec tunnel includes:

obtaining the information of the first IPsec tunnel from a proxy network element.

This disclosure further provides a terminal, where the terminal includes a processor and a memory. In this embodiment of this disclosure, the terminal further includes a computer program stored in the memory and capable of running on the processor. When the computer program is executed by the processor, the following steps are implemented:

obtaining information of a data IPsec tunnel and/or information of a tunnel between the terminal and a second network, where the data IPsec tunnel is an IPsec tunnel used for transmitting user plane data between the terminal and the second network, or data of the tunnel between the terminal and the second network; and performing a second related operation for a tunnel of a first network based on the information of the data IPsec tunnel and/or the information of the tunnel between the terminal and the second network.

Optionally, when a preset condition is met, the second related operation for a tunnel of the first network is performed based on the information of the data IPsec tunnel and/or the information of the tunnel between the terminal and the second network.

The preset condition includes:

information about establishing a data IPsec tunnel and a newly established data IPsec tunnel is received from a proxy network element; and information about modification of a data IPsec tunnel and a modified data IPsec tunnel is received from a proxy network element.

Optionally, the performing a second related operation for a tunnel of a first network includes at least one of the following:

making a request to the first network for establishing a second tunnel;

making a request to the first network for modifying a fourth tunnel;

transmitting QoS information of a second tunnel to the first network;

transmitting modified QoS information of a fourth tunnel to the first network;

transmitting second QoS information to the first network;

requesting the first network to provide a standalone second tunnel or separate second QoS information for each data IPsec tunnel;

requesting the first network to provide a standalone second tunnel or separate second QoS information for the data IPsec tunnel;

requesting the first network to provide one second tunnel for a plurality of data IPsec tunnels, or to map data of a plurality of data IPsec tunnels to one second tunnel or one piece of second QoS information;

modifying a fourth tunnel for the data IPsec tunnel;

mapping the data IPsec tunnel to a fourth tunnel;

setting uplink and/or downlink packet filter information in QoS information of a second tunnel to the information of the data IPsec tunnel;

setting uplink and/or downlink packet filter information in second QoS information to the information of the data IPsec tunnel;

modifying uplink and/or downlink packet filter information in QoS information of a fourth tunnel to the information of the data IPsec tunnel, or adding the information of the data IPsec tunnel to uplink and/or downlink packet filter information in QoS information of a fourth tunnel;

setting a traffic descriptor component type identifier in QoS information of a second tunnel to a security parameter index type;

setting a traffic descriptor component type identifier in second QoS information to a security parameter index type;

modifying a traffic descriptor component type identifier in QoS information of a fourth tunnel to a security parameter index type;

setting QoS parameter information in QoS information of a second tunnel to QoS parameter information corresponding to a tunnel, associated with the data IPsec tunnel, between the terminal and the second network;

setting QoS parameter information in second QoS information to QoS flow description information corresponding to a tunnel, associated with the data IPsec tunnel, between the terminal and the second network;

modifying QoS parameter information in QoS information of a fourth tunnel to QoS parameter information corresponding to a tunnel, associated with the data IPsec tunnel, between the terminal and the second network, or adding such QoS parameter information to QoS parameter information in QoS information of a fourth tunnel; and transmitting the information of the data IPsec tunnel to the first network, where the second tunnel is used for transmitting data of the data IPsec tunnel, or used for transmitting data of the tunnel between the terminal and the second network, or used for transmitting user plane data between the terminal and the second network;

the fourth tunnel is a tunnel already established for the terminal and the first network; and the second QoS information is new QoS information.

Optionally, the QoS information of a second tunnel, and/or the second QoS information includes at least one of the following: uplink and/or downlink packet filter information, where the uplink and/or downlink packet filter information is the information of the data IPsec tunnel; a traffic descriptor component type identifier, where the traffic descriptor component type identifier is a security parameter index type; and QoS parameter information, where the QoS parameter information is QoS parameter information corresponding to the tunnel, associated with the data IPsec tunnel, between the terminal and the second network;

and/or the modified QoS information of a fourth tunnel includes at least one of the following: uplink packet filter information, where the uplink packet filter information is the information of the data IPsec tunnel or contains the information of the data IPsec tunnel; downlink packet filter information, where the downlink packet filter information is or contains the information of the data IPsec tunnel; a traffic descriptor component type identifier, where the traffic descriptor component type identifier is a security parameter index type; and QoS parameter information, where the QoS parameter information is or contains QoS parameter information corresponding to the tunnel, associated with the data IPsec tunnel, between the terminal and the second network.

Optionally, after establishment of the second tunnel is completed, granted QoS information sent by the first network is received containing second QoS information, second QoS information is granted by the first network, and/or transmission from the first network for granting establishment of the first tunnel is received, the performing a second related operation for a tunnel of a first network further includes at least one of the following:

transmitting, via the second tunnel, data of the data IPsec tunnel, data of the tunnel between the terminal and the second network, or user plane data between the terminal and the second network;

switching data of the data IPsec tunnel, data of the tunnel between the terminal and the second network, or user plane data between the terminal and the second network to the second tunnel for transmission; and establishing and/or saving an association between the second tunnel and the data IPsec tunnel;

and/or after modification of the fourth tunnel is completed, granted QoS information sent by the first network is received containing third QoS information, third QoS information is granted by the first network, and/or transmission from the first network for granting modification of a third tunnel is received, the performing a second related operation for a tunnel of a first network further includes at least one of the following:

transmitting data of the data IPsec tunnel via the fourth tunnel;

switching data of the data IPsec tunnel to the fourth tunnel for transmission; and updating an association between the fourth tunnel and an IPsec tunnel, where the IPsec tunnel associated with the fourth tunnel includes a data IPsec tunnel;

and/or after establishment of the second tunnel is rejected, modification of the fourth tunnel is rejected, granting the second QoS information is rejected, and/or the second tunnel is released, the second related operation for a tunnel of a first network further includes at least one of the following: making a request to the second network for releasing a tunnel, associated with a second IPsec tunnel, between the terminal and the second network, and returning to the second network that the tunnel, associated with a second IPsec tunnel, between the terminal and the second network fails to be established.

Optionally, when a first condition is met, the first network is requested to provide a standalone second tunnel for the data IPsec tunnel, or the first network is requested to provide separate second QoS information for the data IPsec tunnel, where the first condition includes at least one of the following:

the tunnel, associated with the data IPsec tunnel, between the terminal and the second network is a GBR tunnel or contains GBR related QoS parameter information;

a QoS class indication of the tunnel, associated with the data IPsec tunnel, between the terminal and the second network takes a value of N, where N is one of the following: 1, 5, 69, and 70;

the tunnel, associated with the data IPsec tunnel, between the terminal and the second network is a tunnel carrying voice traffic;

the tunnel, associated with the data IPsec tunnel, between the terminal and the second network is a tunnel carrying emergency traffic;

the tunnel, associated with the data IPsec tunnel, between the terminal and the second network is a tunnel carrying high priority traffic;

the obtained information of the tunnel between the terminal and the second network contains indication information of a separate bearer resource;

QoS information of the fourth tunnel is different from QoS information of the tunnel, associated with the data IPsec tunnel, between the terminal and the second network;

a QoS class indication of the fourth tunnel is different from a QoS class indication of the tunnel, associated with the data IPsec tunnel, between the terminal and the second network;

GBR related QoS parameter information of the fourth tunnel is different from GBR related QoS parameter information of the tunnel, associated with the data IPsec tunnel, between the terminal and the second network;

a priority of the fourth tunnel is different from a priority of the tunnel, associated with the data IPsec tunnel, between the terminal and the second network;

no fourth tunnel is a non-GBR tunnel, and the tunnel, associated with the data IPsec tunnel, between the terminal and the second network is a non-GBR tunnel; and uplink and/or downlink packet filter information of the fourth tunnel contains no information of the data IPsec tunnel;

and/or when a second condition is met, the first network is requested to provide one second tunnel for a plurality of data IPsec tunnels, the first network is requested to provide one piece of second QoS information for a plurality of data IPsec tunnels, to map data of a plurality of data IPsec tunnels to one second tunnel, or to map data of a plurality of data IPsec tunnels to one piece of second QoS information, where the second condition includes at least one of the following:

the tunnel, associated with the data IPsec tunnel, between the terminal and the second network is a non-GBR tunnel or contains no GBR related QoS parameter; and the obtained information of the tunnel between the terminal and the second network contains no indication information of a separate bearer resource, or contains indication information that no separate bearer resource is needed;

and/or when a third condition is met, the fourth tunnel is modified for the data IPsec tunnel, where the third condition includes at least one of the following:

the tunnel, associated with the data IPsec tunnel, between the terminal and the second network is a non-GBR tunnel;

the obtained information of the tunnel between the terminal and the second network contains no indication information of a separate bearer resource, or contains indication information that no separate bearer resource is needed;

QoS information of the fourth tunnel is different from QoS information of the tunnel, associated with the data IPsec tunnel, between the terminal and the second network;

a QoS class indication of the fourth tunnel is the same as a QoS class indication of the tunnel, associated with the data IPsec tunnel, between the terminal and the second network;

GBR related QoS parameter information of the fourth tunnel is different from GBR related QoS parameter information of the tunnel, associated with the data IPsec tunnel, between the terminal and the second network;

a priority of the fourth tunnel is different from a priority of the tunnel, associated with the data IPsec tunnel, between the terminal and the second network;

the existing fourth tunnel is a non-GBR tunnel, and the tunnel, associated with the data IPsec tunnel, between the terminal and the second network is a non-GBR tunnel; and uplink and/or downlink packet filter information of the fourth tunnel contains no information of the data IPsec tunnel;

and/or when a fourth condition is met, the data IPsec tunnel is mapped to the fourth tunnel, where the fourth condition includes at least one of the following:

QoS information of the fourth tunnel is the same as QoS information of the tunnel, associated with the data IPsec tunnel, between the terminal and the second network;

a QoS parameter requirement of the fourth tunnel is higher than or the same as a QoS parameter requirement of the tunnel, associated with the data IPsec tunnel, between the terminal and the second network;

a QoS class indication of the fourth tunnel is higher than or the same as a QoS class indication of the tunnel, associated with the data IPsec tunnel, between the terminal and the second network;

the existing fourth tunnel is a non-GBR tunnel, and a tunnel, associated with the data IPsec tunnel, between the terminal and the second network is a non-GBR tunnel; and uplink and/or downlink packet filter information of the fourth tunnel contains information of the data IPsec tunnel.

Optionally, when the data IPsec tunnel is associated with one tunnel between the terminal and the second network, the setting QoS parameter information of a second tunnel to QoS parameter information corresponding to a tunnel, associated with the data IPsec tunnel, between the terminal and the second network includes at least one of the following:

setting or modifying a QoS class indication of the second tunnel to a QoS class indication corresponding to the tunnel, associated with the data IPsec tunnel, between the terminal and the second network;

setting or modifying a priority of the second tunnel to a priority of the tunnel, associated with the data IPsec tunnel, between the terminal and the second network;

setting or modifying a packet delay budget of the second tunnel to a packet delay budget of the tunnel, associated with the data IPsec tunnel, between the terminal and the second network;

setting or modifying a packet error rate of the second tunnel to a packet error rate of the tunnel, associated with the data IPsec tunnel, between the terminal and the second network;

setting or modifying a default maximum data burst volume of the second tunnel to a default maximum data burst volume of the tunnel, associated with the data IPsec tunnel, between the terminal and the second network;

setting or modifying a default averaging window of the second tunnel to a default averaging window of the tunnel, associated with the data IPsec tunnel, between the terminal and the second network;

when no averaging window is present for the tunnel, associated with the data IPsec tunnel, between the terminal and the second network, setting or modifying the second tunnel to have no default averaging window;

setting or modifying an uplink GBR or GFBR of the second tunnel to an uplink GBR or GFBR of the tunnel, associated with the data IPsec tunnel, between the terminal and the second network;

setting or modifying a downlink GBR or GFBR of the second tunnel to a downlink GBR or GFBR of the tunnel, associated with the data IPsec tunnel, between the terminal and the second network;

setting or modifying an uplink MBR or MFBR of the second tunnel to an uplink MBR or MFBR of the tunnel, associated with the data IPsec tunnel, between the terminal and the second network; and setting or modifying a downlink MBR or MFBR of the second tunnel to a downlink MBR or MFBR of the tunnel, associated with the data IPsec tunnel, between the terminal and the second network;

and/or when a multi-tunnel condition is met, the setting QoS parameter information of a second tunnel to QoS parameter information corresponding to a tunnel, associated with the data IPsec tunnel, between the terminal and the second network includes at least one of the following:

setting or modifying QoS parameter information of the second tunnel to QoS parameter information having a highest QoS requirement in QoS parameter information corresponding to the tunnels, associated with the data IPsec tunnel, between the terminal and the second network;

setting or modifying a QoS class indication of the second tunnel to a QoS class indication having a highest priority in QoS class indications corresponding to the tunnels, associated with the data IPsec tunnel, between the terminal and the second network;

when there is no standardized QoS class indication corresponding to a combination of the following QoS parameter information of the second tunnel: a priority, a packet delay budget, a packet error rate, a maximum data burst volume, whether it is GBR, and/or whether a default averaging window requirement is set, setting or modifying a QoS class indication of the second tunnel to be a non-standardized QoS class indication or contain no QoS class indication;

when there is no standardized QoS class indication corresponding to QoS parameter information of the second tunnel except for a QoS class indication, setting or modifying the QoS class indication of the second tunnel to be a non-standardized QoS class indication or contain no QoS class indication;

setting or modifying a priority of the second tunnel to a priority with a highest value in priorities corresponding to the tunnels, associated with the data IPsec tunnel, between the terminal and the second network;

setting or modifying a packet delay budget of the second tunnel to a packet delay budget with a lowest value in packet delay budgets corresponding to the tunnels, associated with the data IPsec tunnel, between the terminal and the second network;

setting or modifying a packet error rate of the second tunnel to a packet error rate with a lowest value in packet error rates corresponding to the tunnels, associated with the data IPsec tunnel, between the terminal and the second network; and setting or modifying a default maximum data burst volume of the second tunnel to a default maximum data burst volume with a largest value in default maximum data burst volumes corresponding to the tunnels, associated with the data IPsec tunnel, between the terminal and the second network;

when a tunnel requiring an averaging window is present in the tunnels, associated with the data IPsec tunnel, between the terminal and the second network, setting or modifying the second tunnel to have a default averaging window requirement;

when a GBR tunnel is present in the tunnels, associated with the data IPsec tunnel, between the terminal and the second network, performing at least one of the following:

setting or modifying the second tunnel to a GBR tunnel;

setting or modifying a GFBR or GBR of the second tunnel to a largest value in GFBRs or GBRs corresponding to the plurality of tunnels, associated with the data IPsec tunnel, of the second network;

setting or modifying an MFBR or MBR of the second tunnel to a largest value in MFBRs or MBRs corresponding to the plurality of tunnels, associated with the data IPsec tunnel, of the second network;

setting or modifying an uplink GFBR or GBR of the second tunnel to a largest value in uplink GFBRs or GBRs corresponding to the plurality of tunnels, associated with the data IPsec tunnel, of the second network;

setting or modifying an uplink MFBR or MBR of the second tunnel to a largest value in uplink MFBRs or MBRs corresponding to the plurality of tunnels, associated with the data IPsec tunnel, of the second network;

setting or modifying a downlink GFBR or GBR of the second tunnel to a largest value in downlink GFBRs corresponding to the plurality of tunnels, associated with the data IPsec tunnel, of the second network; and setting or modifying a downlink MFBR or MBR of the second tunnel to a largest value in downlink MFBRs corresponding to the plurality of tunnels, associated with the data IPsec tunnel, of the second network;

when the data IPsec tunnel is associated with a tunnel having a QoS class indication of N between the terminal and the second network, setting or modifying a QoS class indication of the second tunnel to N, or modifying a QoS class indication of the fourth tunnel to N, where a value of N is obtained from the first network or includes one of the following: 1, 5, 69, and 70;

when the data IPsec tunnel is associated with a tunnel carrying voice traffic between the terminal and the second network, setting or modifying QoS parameter information of the second tunnel to QoS parameter information corresponding to voice traffic;

when the data IPsec tunnel is associated with a tunnel carrying emergency traffic between the terminal and the second network, setting or modifying QoS parameter information of the second tunnel to QoS parameter information corresponding to emergency traffic;

when the data IPsec tunnel is associated with a tunnel carrying high priority traffic between the terminal and the second network, setting or modifying QoS parameter information of the second tunnel to QoS parameter information corresponding to high priority traffic;

when a standardized QoS class indication is present for a QoS flow of the second network contained in the data IPsec tunnel, setting or modifying a QoS class indication of the second tunnel to the standardized QoS class indication; and setting QoS parameter information of the second tunnel to QoS parameter information corresponding to a tunnel, newly associated with the data IPsec tunnel, between the terminal and the second network, where the multi-tunnel condition includes at least one of the following:

the data IPsec tunnel is associated with a plurality of tunnels of the second network;

the data IPsec tunnel is newly associated with a tunnel between the terminal and the second network, and the newly associated tunnel between the terminal and the second network has a highest QoS requirement in the tunnels, associated with the data IPsec tunnel, between the terminal and the second network; and the data IPsec tunnel removes association with a tunnel between the terminal and the second network, and the association-removed tunnel between the terminal and the second network has a higher QoS requirement than the tunnels, associated with the data IPsec tunnel, between the terminal and the second network.

Optionally, when the data IPsec tunnel is associated with a plurality of tunnels of the second network, the setting QoS parameter information of a fourth tunnel to QoS parameter information corresponding to a tunnel, associated with the data IPsec tunnel, between the terminal and the second network includes at least one of the following:

modifying the QoS parameter information of the fourth tunnel to QoS parameter information having a highest QoS requirement in QoS parameter information corresponding to the tunnels, associated with the data IPsec tunnel, between the terminal and the second network;

modifying a QoS class indication of the fourth tunnel to a QoS class indication having a highest priority in QoS class indications corresponding to the tunnels, associated with the data IPsec tunnel, between the terminal and the second network;

when there is no standardized QoS class indication corresponding to a combination of the following QoS parameter information of the fourth tunnel: a priority, a packet delay budget, a packet error rate, a maximum data burst volume, whether a GBR is set, and/or whether a default averaging window requirement is set, modifying a QoS class indication of the fourth tunnel to be a non-standardized QoS class indication or contain no QoS class indication;

when there is no standardized QoS class indication corresponding to QoS parameter information of the fourth tunnel except for a QoS class indication, modifying the QoS class indication of the fourth tunnel to be a non-standardized QoS class indication or contain no QoS class indication;

modifying a priority of the fourth tunnel to a priority with a highest value in priorities corresponding to the tunnels, associated with the data IPsec tunnel, between the terminal and the second network;

modifying a packet delay budget of the fourth tunnel to a packet delay budget with a lowest value in packet delay budgets corresponding to the tunnels, associated with the data IPsec tunnel, between the terminal and the second network;

modifying a packet error rate of the fourth tunnel to a packet error rate with a lowest value in packet error rates corresponding to the tunnels, associated with the data IPsec tunnel, between the terminal and the second network;

modifying a default maximum data burst volume of the fourth tunnel to a default maximum data burst volume with a largest value in default maximum data burst volumes corresponding to the tunnels, associated with the data IPsec tunnel, between the terminal and the second network; and when a tunnel requiring an averaging window is present in the tunnels, associated with the data IPsec tunnel, between the terminal and the second network, modifying the fourth tunnel to have a default averaging window requirement;

when a GBR tunnel is present in the tunnels, associated with the data IPsec tunnel, between the terminal and the second network, performing at least one of the following:

modifying the fourth tunnel to a GBR tunnel;

modifying a GFBR or GBR of the fourth tunnel to a largest value in GFBRs or GBRs corresponding to the plurality of tunnels, associated with the data IPsec tunnel, of the second network;

modifying an MFBR or MBR of the fourth tunnel to a largest value in MFBRs or MBRs corresponding to the plurality of tunnels, associated with the data IPsec tunnel, of the second network;

modifying an uplink GFBR or GBR of the fourth tunnel to a largest value in uplink GFBRs or GBRs corresponding to the plurality of tunnels, associated with the data IPsec tunnel, of the second network;

modifying an uplink MFBR or MBR of the fourth tunnel to a largest value in uplink MFBRs or MBRs corresponding to the plurality of tunnels, associated with the data IPsec tunnel, of the second network;

modifying a downlink GFBR or GBR of the fourth tunnel to a largest value in downlink GFBRs corresponding to the plurality of tunnels, associated with the data IPsec tunnel, of the second network; and modifying a downlink MFBR or MBR of the fourth tunnel to a largest value in downlink MFBRs corresponding to the plurality of tunnels, associated with the data IPsec tunnel, of the second network;

when the data IPsec tunnel is associated with a tunnel having a QoS class indication of N between the terminal and the second network, modifying a QoS class indication of the fourth tunnel to N where a value of N is obtained from the first network or includes one of the following: 1, 5, 69, and 70;

when the data IPsec tunnel is associated with a tunnel carrying voice traffic between the terminal and the second network, modifying QoS parameter information of the fourth tunnel to QoS parameter information corresponding to voice traffic;

when the data IPsec tunnel is associated with a tunnel carrying emergency traffic between the terminal and the second network, modifying QoS parameter information of the fourth tunnel to QoS parameter information corresponding to emergency traffic;

when the data IPsec tunnel is associated with a tunnel carrying high priority traffic between the terminal and the second network, modifying QoS parameter information of the fourth tunnel to QoS parameter information corresponding to high priority traffic; and when a standardized QoS class indication is present for a QoS flow of the second network contained in the data IPsec tunnel, modifying a QoS class indication of the fourth tunnel to the standardized QoS class indication.

Optionally, the second tunnel and/or the fourth tunnel is a QoS flow;

and/or the second tunnel is a second QoS flow or a QoS flow in a first PDU session;

and/or the fourth tunnel is an existing QoS flow in a first PDU session;

and/or a tunnel between the terminal and the second network is a QoS flow between the terminal and the second network;

and/or a tunnel between the terminal and the second network is a QoS flow of the second network;

and/or the second tunnel is a second QoS flow, and the making a request to the first network for establishing a second tunnel includes at least one of the following:

making a request to the first network for adding a second QoS flow in a first PDU session; and transmitting to the first network a request for modifying a first PDU session or for establishing a first PDU session, the request for modifying a first PDU session or for establishing a first PDU session containing QoS information of a second QoS flow requested to be established;

and/or the second tunnel is a second QoS flow, the fourth tunnel is an existing QoS flow in a first PDU session, and the making a request to the first network for modifying a fourth tunnel to a first tunnel includes at least one of the following:

making a request to the first network for modifying a fourth QoS flow in a first PDU session; and transmitting to the first network a request for modifying a first PDU session, where the request for modifying a first PDU session contains QoS information of a fourth QoS flow requested to be modified, and the first PDU session is a PDU session in the first network used for transmitting information between the terminal and the second network.

Optionally, the information of the data IPsec tunnel includes at least one of the following: an identifier of the data IPsec tunnel, a protocol field indicating ESP, a security parameter index of the data IPsec tunnel, and identifier information of a tunnel, associated with the data IPsec tunnel, between the terminal and the second network;

and/or the information of the tunnel between the terminal and the second network includes at least one of the following: an identifier of the data IPsec tunnel associated with the tunnel between the terminal and the second network, a security parameter index of the data IPsec tunnel associated with the tunnel between the terminal and the second network, a new tunnel between the terminal and the second network, a removed tunnel between the terminal and the second network, QoS parameter information of the tunnel between the terminal and the second network, indication information of a separate bearer resource, and indication information that no separate bearer resource is needed.

Optionally, the identifier information of a tunnel, associated with the data IPsec tunnel, between the terminal and the second network includes a QoS flow identifier, and an identifier of a PDU session to which a QoS flow belongs.

The QoS information includes at least one of the following: whether GBR or non-GBR, a QoS class indication (5QI or QFI), a priority, a packet delay budget, a packet error rate, a default maximum data volume, a default averaging window, an uplink GBR, a downlink GBR, an uplink MBR, a downlink MBR, an uplink GFBR, a downlink GFBR, an uplink MFBR, a downlink MFBR, a traffic descriptor component type identifier, and packet filter information.

Optionally, the obtaining information of a data IPsec tunnel and/or information of a tunnel between the terminal and a second network includes:

obtaining the information of the data IPsec tunnel from a proxy network element and/or obtaining the information of the tunnel between the terminal and the second network from the second network.

Optionally, the second QoS flow is a non-default QoS flow.

An embodiment of this disclosure further provides a proxy network element, where the proxy network element includes a processor and a memory. In this embodiment of this disclosure, the proxy network element further includes a computer program stored in the memory and capable of running on the processor. When the computer program is executed by the processor, the following steps are implemented:

determining whether a preset condition is met; and when it is determined that the preset condition is met, performing an operation related to a data IPsec tunnel for a tunnel of a second network.

The proxy network element is a proxy of a first network for interacting with the second network.

Optionally, the preset condition includes at least one of the following:

a request for establishing a tunnel between the terminal and the second network is received;

a request for modifying a tunnel between the terminal and the second network is received;

the proxy network element provides 3GPP access;

the first network is a 3GPP network; and an operation of mapping a tunnel between the terminal and the second network to an IPsec tunnel is performed.

Optionally, the performing an operation related to a data IPsec tunnel for a tunnel of a second network includes at least one of the following:

determining a mapping from a tunnel between the terminal and the second network to a data IPsec tunnel;

establishing a standalone data IPsec tunnel for each tunnel between the terminal and the second network, or establishing different data IPsec tunnels for different tunnels between the terminal and the second network;

establishing a standalone data IPsec tunnel for each GBR tunnel between the terminal and the second network;

when a tunnel between the terminal and the second network meets a separate-bearer condition, establishing a standalone data IPsec tunnel for the tunnel between the terminal and the second network;

establishing a non-GBR-specific data IPsec tunnel for a tunnel between the terminal and the second network;

mapping one or more non-GBR tunnels between the terminal and the second network to one data IPsec tunnel;

establishing a priority-specific data IPsec tunnel for a tunnel between the terminal and the second network;

mapping one or more tunnels with a same priority between the terminal and the second network to one data IPsec tunnel;

establishing different data IPsec tunnels for tunnels with different priorities between the terminal and the second network, or mapping tunnels with different priorities between the terminal and the second network to different data IPsec tunnels;

establishing a data IPsec tunnel specific to GBR related QoS parameter information for a tunnel between the terminal and the second network;

establishing different data IPsec tunnels for tunnels with different GBR related QoS parameter information between the terminal and the second network, or mapping tunnels with different GBR related QoS parameter information between the terminal and the second network to different data IPsec tunnels;

mapping one or more tunnels with same GBR related QoS parameter information between the terminal and the second network to one data IPsec tunnel;

establishing a QoS class indication-specific data IPsec tunnel for a tunnel between the terminal and the second network;

establishing different data IPsec tunnels for tunnels with different QoS class indications between the terminal and the second network, or mapping tunnels with different QoS class indications between the terminal and the second network to different data IPsec tunnels;

mapping one or more tunnels with a same QoS class indication between the terminal and the second network to one data IPsec tunnel;

establishing a QoS class indication-specific data IPsec tunnel for a tunnel between the terminal and the second network;

establishing different data IPsec tunnels for tunnels with different QoS class indications between the terminal and the second network; and mapping a plurality of tunnels with same QoS information between the terminal and the second network to one data IPsec tunnel.

The separate-bearer condition includes at least one of the following:

a tunnel between the terminal and the second network is a GBR tunnel;

a QoS class indication of a tunnel between the terminal and the second network takes a value of N, where N is one of the following: 1, 5, 69, and 70;

a tunnel between the terminal and the second network is a tunnel carrying voice traffic;

a tunnel between the terminal and the second network is a tunnel carrying emergency traffic;

a tunnel between the terminal and the second network is a tunnel carrying high priority traffic;

a received request for establishing a tunnel between the terminal and the second network carries indication information of a separate bearer resource;

QoS information of an existing tunnel, associated with the data IPsec tunnel, between the terminal and the second network is different from QoS information of a tunnel requested to be established between the terminal and the second network;

a QoS class indication of an existing tunnel, associated with the data IPsec tunnel, between the terminal and the second network is different from a QoS class indication of a tunnel requested to be established between the terminal and the second network;

GBR related QoS parameter information of an existing tunnel, associated with the data IPsec tunnel, between the terminal and the second network is different from GBR related QoS parameter information of a tunnel requested to be established between the terminal and the second network;

a priority of an existing tunnel, associated with the data IPsec tunnel, between the terminal and the second network is different from a priority of a tunnel requested to be established between the terminal and the second network; and no non-GBR tunnel is present in existing tunnels, associated with the data IPsec tunnel, between the terminal and the second network, and a tunnel requested to be established between the terminal and the second network is a non-GBR tunnel.

Optionally, the tunnel is a QoS flow;

and/or a tunnel between the terminal and the second network is a QoS flow of the second network.

An embodiment of this disclosure further provides a communications network element, where the communications network element includes a processor and a memory. In this embodiment of this disclosure, the communications network element further includes a computer program stored in the memory and capable of running on the processor. When the computer program is executed by the processor, the following steps are implemented:

transmitting information of a tunnel between a terminal and a second network, where the information of the tunnel between the terminal and the second network includes at least one of the following: an identifier of a data IPsec tunnel associated with a tunnel between the terminal and the second network, a security parameter index of a data IPsec tunnel associated with a tunnel between the terminal and the second network, a new tunnel between the terminal and the second network, a removed tunnel between the terminal and the second network, QoS parameter information of a tunnel between the terminal and the second network, indication information of a separate bearer resource, and indication information that no separate bearer resource is needed.

Optionally, the transmitting information of a tunnel between a terminal and a second network includes:

transmitting the information of the tunnel between the terminal and the second network to at least one of the following: the terminal, and a proxy network element.

Optionally, when a preset condition is met, the information of the tunnel between the terminal and the second network is transmitted, where the preset condition includes: the terminal accesses the second network via a first network that is a 3GPP network.

An embodiment of this disclosure further provides a computer-readable storage medium. The computer-readable storage medium stores a program. When the program is executed by a processor, the processes in the foregoing embodiments of the method for guaranteeing data transmission are implemented, and a same technical effect can be achieved. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . ." does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this disclosure essentially, or a part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. In light of this disclosure, persons of ordinary skill in the art may develop many other forms without departing from principles of this disclosure and the protection scope of the claims, and all such forms shall fall within the protection scope of this disclosure.

What is claimed is:

1. A method for guaranteeing data transmission, applied to a terminal and comprising:
   obtaining information of a data IPsec tunnel and/or information of a tunnel between the terminal and a second network, wherein the data IPsec tunnel is an IPsec tunnel used for transmitting user plane data between the terminal and the second network, or data of the tunnel between the terminal and the second network; and
   performing a second related operation for a tunnel of a first network based on the information of the data IPsec tunnel and/or the information of the tunnel between the terminal and the second network;
   wherein the performing a second related operation for a tunnel of a first network comprises at least one of the following:
   requesting the first network to provide a standalone second tunnel for each data IPsec tunnel;
   setting QoS parameter information in QoS information of a second tunnel to QoS parameter information corresponding to a tunnel, associated with the data IPsec tunnel, between the terminal and the second network;
   wherein the second tunnel is used for transmitting data of the data IPsec tunnel, or used for transmitting data of the tunnel between the terminal and the second network, or used for transmitting user plane data between the terminal and the second network.

2. The method according to claim 1, wherein the performing a second related operation for a tunnel of a first network comprises at least one of the following:
   making a request to the first network for establishing a second tunnel;
   making a request to the first network for modifying a fourth tunnel;
   transmitting quality of service (QoS) information of a second tunnel to the first network;
   transmitting modified QoS information of a fourth tunnel to the first network;
   transmitting second QoS information to the first network;
   requesting the first network to provide separate second QoS information for each data IPsec tunnel;
   requesting the first network to provide a standalone second tunnel or separate second QoS information for the data IPsec tunnel;
   requesting the first network to provide one second tunnel for a plurality of data IPsec tunnels, or to map data of a plurality of data IPsec tunnels to one second tunnel or one piece of second QoS information;
   modifying a fourth tunnel for the data IPsec tunnel;
   mapping the data IPsec tunnel to a fourth tunnel;
   setting uplink and/or downlink packet filter information in QoS information of a second tunnel to the information of the data IPsec tunnel;
   setting uplink and/or downlink packet filter information in second QoS information to the information of the data IPsec tunnel;
   modifying uplink and/or downlink packet filter information in QoS information of a fourth tunnel to the information of the data IPsec tunnel, or adding the information of the data IPsec tunnel to uplink and/or downlink packet filter information in QoS information of a fourth tunnel;
   setting a traffic descriptor component type identifier in QoS information of a second tunnel to a security parameter index type;
   setting a traffic descriptor component type identifier in second QoS information to a security parameter index type;
   modifying a traffic descriptor component type identifier in QoS information of a fourth tunnel to a security parameter index type;
   setting QoS parameter information in second QoS information to QoS flow description information corresponding to a tunnel, associated with the data IPsec tunnel, between the terminal and the second network;
   modifying QoS parameter information in QoS information of a fourth tunnel to QoS parameter information corresponding to a tunnel, associated with the data IPsec tunnel, between the terminal and the second network, or adding such QoS parameter information to QoS parameter information in QoS information of a fourth tunnel; and
   transmitting the information of the data IPsec tunnel to the first network;
   wherein
   the fourth tunnel is a tunnel already established for the terminal and the first network; and
   the second QoS information is new QoS information.

3. The method according to claim 2, wherein the QoS information of a second tunnel, and/or the second QoS information comprises at least one of the following: uplink and/or downlink packet filter information, wherein the uplink and/or downlink packet filter information is the information of the data IPsec tunnel; a traffic descriptor component type identifier, wherein the traffic descriptor component type identifier is a security parameter index type; and QoS parameter information, wherein the QoS parameter information is QoS parameter information corresponding to the tunnel, associated with the data IPsec tunnel, between the terminal and the second network;

and/or the modified QoS information of a fourth tunnel comprises at least one of the following: uplink packet filter information, wherein the uplink packet filter information is the information of the data IPsec tunnel or contains the information of the data IPsec tunnel; downlink packet filter information, wherein the downlink packet filter information is or contains the information of the data IPsec tunnel; a traffic descriptor component type identifier, wherein the traffic descriptor component type identifier is a security parameter index type; and QoS parameter information, wherein the QoS parameter information is or contains QoS parameter information corresponding to the tunnel, associated with the data IPsec tunnel, between the terminal and the second network.

4. The method according to claim 3, wherein the QoS class indication comprises 5QI or QCI.

5. The method according to claim 2, wherein after establishment of the second tunnel is completed, granted QoS information sent by the first network is received containing second QoS information, second QoS information is granted by the first network, and/or transmission from the first network for granting establishment of the first tunnel is received, the performing a second related operation for a tunnel of a first network further comprises at least one of the following:

transmitting, via the second tunnel, data of the tunnel between the terminal and the second network, or user plane data between the terminal and the second network;

switching data of the data IPsec tunnel, data of the tunnel between the terminal and the second network, or user plane data between the terminal and the second network to the second tunnel for transmission;

and/or after modification of the fourth tunnel is completed, granted QoS information sent by the first network is received containing third QoS information, third QoS information is granted by the first network, and/or transmission from the first network for granting modification of a third tunnel is received, the performing a second related operation for a tunnel of a first network further comprises at least one of the following:

transmitting data of the data IPsec tunnel via the fourth tunnel;

switching data of the data IPsec tunnel to the fourth tunnel for transmission; and updating an association between the fourth tunnel and an IPsec tunnel, wherein the IPsec tunnel associated with the fourth tunnel comprises a data IPsec tunnel;

and/or after establishment of the second tunnel is rejected, modification of the fourth tunnel is rejected, granting the second QoS information is rejected, and/or the second tunnel is released, the second related operation for a tunnel of a first network further comprises at least one of the following making a request to the second network for releasing a tunnel, associated with a second IPsec tunnel, between the terminal and the second network, and returning to the second network that the tunnel, associated with a second IPsec, between the terminal and the second network fails to be established.

6. The method according to claim 2, wherein when a first condition is met, the first network is requested to provide a standalone second tunnel for the data IPsec tunnel, or the first network is requested to provide separate second QoS information for the data IPsec tunnel, wherein the first condition comprises at least one of the following:

the tunnel, associated with the data IPsec tunnel, between the terminal and the second network is a GBR tunnel or contains GBR related QoS parameter information;

a QoS class indication of the tunnel, associated with the data IPsec tunnel, between the terminal and the second network takes a value of N, wherein N is one of the following: 1, 5, 69, and 70;

the tunnel, associated with the data IPsec tunnel, between the terminal and the second network is a tunnel carrying voice traffic;

the tunnel, associated with the data IPsec tunnel, between the terminal and the second network is a tunnel carrying emergency traffic;

the tunnel, associated with the data IPsec tunnel, between the terminal and the second network is a tunnel carrying high priority traffic;

the obtained information of the tunnel between the terminal and the second network contains indication information of a separate bearer resource;

QoS information of the fourth tunnel is different from QoS information of the tunnel, associated with the data IPsec tunnel, between the terminal and the second network;

a QoS class indication of the fourth tunnel is different from a QoS class indication of the tunnel, associated with the data IPsec tunnel, between the terminal and the second network;

GBR related QoS parameter information of the fourth tunnel is different from GBR related QoS parameter information of the tunnel, associated with the data IPsec tunnel, between the terminal and the second network;

a priority of the fourth tunnel is different from a priority of the tunnel, associated with the data IPsec tunnel, between the terminal and the second network;

no fourth tunnel is a non-GBR tunnel, and the tunnel, associated with the data IPsec tunnel, between the terminal and the second network is a non-GBR tunnel; and uplink and/or downlink packet filter information of the fourth tunnel contains no information of the data IPsec tunnel;

and/or when a second condition is met, the first network is requested to provide one second tunnel for a plurality of data IPsec tunnels, the first network is requested to provide one piece of second QoS information for a plurality of data IPsec tunnels, to map data of a plurality of data IPsec tunnels to one second tunnel, or to map data of a plurality of data IPsec tunnels to one piece of second QoS information, wherein the second condition comprises at least one of the following:

the tunnel, associated with the data IPsec tunnel, between the terminal and the second network is a non-GBR tunnel or contains no GBR related QoS parameter; and the obtained information of the tunnel between the terminal and the second network contains no indication information of a separate bearer resource, or contains indication information that no separate bearer resource is needed;

and/or when a third condition is met, the fourth tunnel is modified for the data IPsec tunnel, wherein the third condition comprises at least one of the following:

the tunnel, associated with the data IPsec tunnel, between the terminal and the second network is a non-GBR tunnel;

the obtained information of the tunnel between the terminal and the second network contains no indication information of a separate bearer resource, or contains indication information that no separate bearer resource is needed;

QoS information of the fourth tunnel is different from QoS information of the tunnel, associated with the data IPsec tunnel, between the terminal and the second network;

a QoS class indication of the fourth tunnel is the same as a QoS class indication of the tunnel, associated with the data IPsec tunnel, between the terminal and the second network;

GBR related QoS parameter information of the fourth tunnel is different from GBR related QoS parameter information of the tunnel, associated with the data IPsec tunnel, between the terminal and the second network;

a priority of the fourth tunnel is different from a priority of the tunnel, associated with the data IPsec tunnel, between the terminal and the second network;

the existing fourth tunnel is a non-GBR tunnel, and the tunnel, associated with the data IPsec tunnel, between the terminal and the second network is a non-GBR tunnel; and uplink and/or downlink packet filter information of the fourth tunnel contains no information of the data IPsec tunnel;

and/or when a fourth condition is met, the data IPsec tunnel is mapped to the fourth tunnel, wherein the fourth condition comprises at least one of the following:

QoS information of the fourth tunnel is the same as QoS information of the tunnel, associated with the data IPsec tunnel, between the terminal and the second network;

a QoS parameter requirement of the fourth tunnel is higher than or the same as a QoS parameter requirement of the tunnel, associated with the data IPsec tunnel, between the terminal and the second network;

a QoS class indication of the fourth tunnel is higher than or the same as a QoS class indication of the tunnel, associated with the data IPsec tunnel, between the terminal and the second network;

the existing fourth tunnel is a non-GBR tunnel, and the tunnel, associated with the data IPsec tunnel, between the terminal and the second network is a non-GBR tunnel; and uplink and/or downlink packet filter information of the fourth tunnel contains information of the data IPsec tunnel.

7. The method according to claim 2, wherein when the data IPsec tunnel is associated with one tunnel between the terminal and the second network, the setting QoS parameter information of a second tunnel to QoS parameter information corresponding to a tunnel, associated with the data IPsec tunnel, between the terminal and the second network comprises at least one of the following:

setting or modifying a QoS class indication of the second tunnel to a QoS class indication corresponding to the tunnel, associated with the data IPsec tunnel, between the terminal and the second network;

setting or modifying a priority of the second tunnel to a priority of the tunnel, associated with the data IPsec tunnel, between the terminal and the second network;

setting or modifying a packet delay budget of the second tunnel to a packet delay budget of the tunnel, associated with the data IPsec tunnel, between the terminal and the second network;

setting or modifying a packet error rate of the second tunnel to a packet error rate of the tunnel, associated with the data IPsec tunnel, between the terminal and the second network;

setting or modifying a default maximum data burst volume of the second tunnel to a default maximum data burst volume of the tunnel, associated with the data IPsec tunnel, between the terminal and the second network;

setting or modifying a default averaging window of the second tunnel to a default averaging window of the tunnel, associated with the data IPsec tunnel, between the terminal and the second network;

when no averaging window is present for the tunnel, associated with the data IPsec tunnel, between the terminal and the second network, setting or modifying the second tunnel to have no default averaging window;

setting or modifying an uplink GBR or GFBR of the second tunnel to an uplink GBR or GFBR of the tunnel, associated with the data IPsec tunnel, between the terminal and the second network;

setting or modifying a downlink GBR or GFBR of the second tunnel to a downlink GBR or GFBR of the tunnel, associated with the data IPsec tunnel, between the terminal and the second network;

setting or modifying an uplink MBR or MFBR of the second tunnel to an uplink MBR or MFBR of the tunnel, associated with the data IPsec tunnel, between the terminal and the second network; and setting or modifying a downlink MBR or MFBR of the second tunnel to a downlink MBR or MFBR of the tunnel, associated with the data IPsec tunnel, between the terminal and the second network;

and/or when a multi-tunnel condition is met, the setting QoS parameter information of a second tunnel to QoS parameter information corresponding to a tunnel, associated with the data IPsec tunnel, between the terminal and the second network comprises at least one of the following:

setting or modifying QoS parameter information of the second tunnel to QoS parameter information having a highest QoS requirement in QoS parameter information corresponding to the tunnels, associated with the data IPsec tunnel, between the terminal and the second network;

setting or modifying a QoS class indication of the second tunnel to a QoS class indication having a highest priority in QoS class indications corresponding to the tunnels, associated with the data IPsec tunnel, between the terminal and the second network;

when there is no standardized QoS class indication corresponding to a combination of the following QoS parameter information of the second tunnel: a priority, a packet delay budget, a packet error rate, a maximum data burst volume, whether it is GBR, and/or whether a default averaging window requirement is set, setting or modifying a QoS class indication of the second tunnel to be a non-standardized QoS class indication or contain no QoS class indication;

when there is no standardized QoS class indication corresponding to QoS parameter information of the second tunnel except for a QoS class indication, setting or modifying the QoS class indication of the second tunnel to be a non-standardized QoS class indication or contain no QoS class indication;

setting or modifying a priority of the second tunnel to a priority with a highest value in priorities corresponding to the tunnels, associated with the data IPsec tunnel, between the terminal and the second network;

setting or modifying a packet delay budget of the second tunnel to a packet delay budget with a lowest value in packet delay budgets corresponding to the tunnels, associated with the data IPsec tunnel, between the terminal and the second network;

setting or modifying a packet error rate of the second tunnel to a packet error rate with a lowest value in packet error rates corresponding to the tunnels, associated with the data IPsec tunnel, between the terminal and the second network; and setting or modifying a default maximum data burst volume of the second tunnel to a default maximum data burst volume with a largest value in default maximum data burst volumes corresponding to the tunnels, associated with the data IPsec tunnel, between the terminal and the second network;

when a tunnel requiring an averaging window is present in the tunnels, associated with the data IPsec tunnel, between the terminal and the second network, setting or modifying the second tunnel to have a default averaging window requirement;

when a GBR tunnel is present in the tunnels, associated with the data IPsec tunnel, between the terminal and the second network, performing at least one of the following:

setting or modifying the second tunnel to a GBR tunnel;

setting or modifying a GFBR or GBR of the second tunnel to a largest value in GFBRs or GBRs corresponding to the plurality of tunnels, associated with the data IPsec tunnel, of the second network;

setting or modifying an MFBR or MBR of the second tunnel to a largest value in MFBRs or MBRs corresponding to the plurality of tunnels, associated with the data IPsec tunnel, of the second network;

setting or modifying an uplink GFBR or GBR of the second tunnel to a largest value in uplink GFBRs or GBRs corresponding to the plurality of tunnels, associated with the data IPsec tunnel, of the second network;

setting or modifying an uplink MFBR or MBR of the second tunnel to a largest value in uplink MFBRs or MBRs corresponding to the plurality of tunnels, associated with the data IPsec tunnel, of the second network;

setting or modifying a downlink GFBR or GBR of the second tunnel to a largest value in downlink GFBRs corresponding to the plurality of tunnels, associated with the data IPsec tunnel, of the second network; and setting or modifying a downlink MFBR or MBR of the second tunnel to a largest value in downlink MFBRs corresponding to the plurality of tunnels, associated with the data IPsec tunnel, of the second network;

when the data IPsec tunnel is associated with a tunnel having a QoS class indication of N between the terminal and the second network, setting or modifying a QoS class indication of the second tunnel to N, or modifying a QoS class indication of the fourth tunnel to N, wherein a value of N is obtained from the first network or comprises one of the following: 1, 5, 69, and 70;

when the data IPsec tunnel is associated with a tunnel carrying voice traffic between the terminal and the second network, setting or modifying QoS parameter information of the second tunnel to QoS parameter information corresponding to voice traffic;

when the data IPsec tunnel is associated with a tunnel carrying emergency traffic between the terminal and the second network, setting or modifying QoS parameter information of the second tunnel to QoS parameter information corresponding to emergency traffic;

when the data IPsec tunnel is associated with a tunnel carrying high priority traffic between the terminal and the second network, setting or modifying QoS parameter information of the second tunnel to QoS parameter information corresponding to high priority traffic;

when a standardized QoS class indication is present for a QoS flow of the second network contained in the data IPsec tunnel, setting or modifying a QoS class indication of the second tunnel to the standardized QoS class indication; and setting QoS parameter information of the second tunnel to QoS parameter information corresponding to a tunnel, newly associated with the data IPsec tunnel, between the terminal and the second network, wherein the multi-tunnel condition comprises at least one of the following:

the data IPsec tunnel is associated with a plurality of tunnels of the second network;

the data IPsec tunnel is newly associated with a tunnel between the terminal and the second network, and the newly associated tunnel between the terminal and the second network has a highest QoS requirement in the tunnels, associated with the data IPsec tunnel, between the terminal and the second network; and the data IPsec tunnel removes association with a tunnel between the terminal and the second network, and the association-removed tunnel between the terminal and the second network has a higher QoS requirement than the tunnels, associated with the data IPsec tunnel, between the terminal and the second network.

8. The method according to claim 2, wherein when the data IPsec tunnel is associated with a plurality of tunnels of the second network, the modifying QoS parameter information of a fourth tunnel to QoS parameter information corresponding to a tunnel, associated with the data IPsec tunnel, between the terminal and the second network comprises at least one of the following:

modifying the QoS parameter information of the fourth tunnel to QoS parameter information having a highest QoS requirement in QoS parameter information corresponding to the tunnels, associated with the data IPsec tunnel, between the terminal and the second network;

modifying a QoS class indication of the fourth tunnel to a QoS class indication having a highest priority in QoS class indications corresponding to the tunnels, associated with the data IPsec tunnel, between the terminal and the second network;

when there is no standardized QoS class indication corresponding to a combination of the following QoS parameter information of the fourth tunnel: a priority, a packet delay budget, a packet error rate, a maximum data burst volume, whether a GBR is set, and/or whether a default averaging window requirement is set, modifying a QoS class indication of the fourth tunnel to be a non-standardized QoS class indication or contain no QoS class indication;

when there is no standardized QoS class indication corresponding to QoS parameter information of the fourth tunnel except for a QoS class indication, modifying the QoS class indication of the fourth tunnel to be a non-standardized QoS class indication or contain no QoS class indication;

modifying a priority of the fourth tunnel to a priority with a highest value in priorities corresponding to the tunnels, associated with the data IPsec tunnel, between the terminal and the second network;

modifying a packet delay budget of the fourth tunnel to a packet delay budget with a lowest value in packet delay budgets corresponding to the tunnels, associated with the data IPsec tunnel, between the terminal and the second network;

modifying a packet error rate of the fourth tunnel to a packet error rate with a lowest value in packet error rates corresponding to the tunnels, associated with the data IPsec tunnel, between the terminal and the second network;

modifying a default maximum data burst volume of the fourth tunnel to a default maximum data burst volume with a largest value in default maximum data burst volumes corresponding to the tunnels, associated with the data IPsec tunnel, between the terminal and the second network; and when a tunnel requiring an averaging window is present in the tunnels, associated with the data IPsec tunnel, between the terminal and the second network, modifying the fourth tunnel to have a default averaging window requirement;

when a GBR tunnel is present in the tunnels, associated with the data IPsec tunnel, between the terminal and the second network, performing at least one of the following:

modifying the fourth tunnel to a GBR tunnel;

modifying a GFBR or GBR of the fourth tunnel to a largest value in GFBRs or GBRs corresponding to the plurality of tunnels, associated with the data IPsec tunnel, of the second network;

modifying an MFBR or MBR of the fourth tunnel to a largest value in MFBRs or MBRs corresponding to the plurality of tunnels, associated with the data IPsec tunnel, of the second network;

modifying an uplink GFBR or GBR of the fourth tunnel to a largest value in uplink GFBRs or GBRs corresponding to the plurality of tunnels, associated with the data IPsec tunnel, of the second network;

modifying an uplink MFBR or MBR of the fourth tunnel to a largest value in uplink MFBRs or MBRs corresponding to the plurality of tunnels, associated with the data IPsec tunnel, of the second network;

modifying a downlink GFBR or GBR of the fourth tunnel to a largest value in downlink GFBRs corresponding to the plurality of tunnels, associated with the data IPsec tunnel, of the second network; and modifying a downlink MFBR or MBR of the fourth tunnel to a largest value in downlink MFBRs corresponding to the plurality of tunnels, associated with the data IPsec tunnel, of the second network;

when the data IPsec tunnel is associated with a tunnel having a QoS class indication of N between the terminal and the second network, modifying a QoS class indication of the fourth tunnel to N, wherein a value of N is obtained from the first network or comprises one of the following: 1, 5, 69, and 70;

when the data IPsec tunnel is associated with a tunnel carrying voice traffic between the terminal and the second network, modifying QoS parameter information of the fourth tunnel to QoS parameter information corresponding to voice traffic;

when the data IPsec tunnel is associated with a tunnel carrying emergency traffic between the terminal and the second network, modifying QoS parameter information of the fourth tunnel to QoS parameter information corresponding to emergency traffic;

when the data IPsec tunnel is associated with a tunnel carrying high priority traffic between the terminal and the second network, modifying QoS parameter information of the fourth tunnel to QoS parameter information corresponding to high priority traffic; and when a standardized QoS class indication is present for a QoS flow of the second network contained in the data IPsec tunnel, modifying a QoS class indication of the fourth tunnel to the standardized QoS class indication.

9. The method according to claim 2, wherein the second tunnel and/or the fourth tunnel is a QoS flow; and/or the second tunnel is a QoS flow in a first protocol data unit (PDU) session;

and/or the fourth tunnel is an existing QoS flow in a first PDU session;

and/or a tunnel between the terminal and the second network is a QoS flow between the terminal and the second network;

and/or a tunnel between the terminal and the second network is a QoS flow of the second network;

and/or the second tunnel is the second QoS flow, and the making a request to the first network for establishing a second tunnel further comprises making a request to the first network for adding a second QoS flow in a first PDU session; and and/or the second tunnel is the second QoS flow, the fourth tunnel is an existing QoS flow in a first PDU session, and the making a request to the first network for modifying a fourth tunnel to a first tunnel comprises at least one of the following:

making a request to the first network for modifying a fourth QoS flow in a first PDU session; and transmitting to the first network a request for modifying a first PDU session, wherein the request for modifying a first PDU session contains QoS information of a fourth QoS flow requested to be modified, and the first PDU session is a PDU session in the first network used for transmitting information between the terminal and the second network.

10. The method according to claim 2, wherein the second tunnel is a second QoS flow;

wherein the making a request to the first network for establishing a second tunnel comprises:

transmitting to the first network a request for modifying a first PDU session or for establishing a first PDU session, the request for modifying a first PDU session or for establishing a first PDU session containing QoS information of a second QoS flow requested to be established.

11. The method according to claim 1, wherein
the information of the data IPsec tunnel comprises at least one of the following: an identifier of the data IPsec tunnel, a protocol field indicating ESP, a security parameter index of the data IPsec tunnel, and identifier information of a tunnel, associated with the data IPsec tunnel, between the terminal and the second network; and/or
the information of the tunnel between the terminal and the second network comprises at least one of the following: an identifier of the data IPsec tunnel associated with the tunnel between the terminal and the second network, a security parameter index of the data IPsec tunnel associated with the tunnel between the terminal and the second network, a new tunnel between the terminal and the second network, a removed tunnel between the terminal and the second network, QoS parameter information of the tunnel between the terminal and the second network, indication information of a separate bearer resource, and indication information that no separate bearer resource is needed.

12. The method according to claim 1, wherein the obtaining information of a data IPsec tunnel and/or information of a tunnel between the terminal and a second network comprises:
obtaining the information of the data IPsec tunnel from a proxy network element and/or obtaining the information of the tunnel between the terminal and the second network from the second network.

13. The method according to claim 1, wherein the QoS parameter information comprises a QoS class indication.

14. The method according to claim 1, after establishment of the second tunnel is completed, the performing a second related operation for a tunnel of a first network further comprises at least one of the following:
transmitting, via the second tunnel, data of the data IPsec tunnel;
establishing and/or saving an association between the second tunnel and the data IPsec tunnel.

15. A terminal, comprising a processor, a memory, and a program that is stored in the memory and capable of running on the processor, wherein when the program is executed by the processor, the processor is configured to implement:
obtaining information of a data IPsec tunnel and/or information of a tunnel between the terminal and a second network, wherein the data IPsec tunnel is an IPsec tunnel used for transmitting user plane data between the terminal and the second network, or data of the tunnel between the terminal and the second network; and
performing a second related operation for a tunnel of a first network based on the information of the data IPsec tunnel and/or the information of the tunnel between the terminal and the second network;
wherein the performing a second related operation for a tunnel of a first network comprises at least one of the following:
requesting the first network to provide a standalone second tunnel for each data IPsec tunnel;
setting QoS parameter information in QoS information of a second tunnel to QoS parameter information corresponding to a tunnel, associated with the data IPsec tunnel, between the terminal and the second network;
wherein the second tunnel is used for transmitting data of the data IPsec tunnel, or used for transmitting data of the tunnel between the terminal and the second network, or used for transmitting user plane data between the terminal and the second network.

16. The terminal according to claim 15, wherein the performing a second related operation for a tunnel of a first network comprises at least one of the following:
making a request to the first network for establishing a second tunnel;
making a request to the first network for modifying a fourth tunnel;
transmitting quality of service (QoS) information of a second tunnel to the first network;
transmitting modified QoS information of a fourth tunnel to the first network;
transmitting second QoS information to the first network;
requesting the first network to provide separate second QoS information for each data IPsec tunnel;
requesting the first network to provide a standalone second tunnel or separate second QoS information for the data IPsec tunnel;
requesting the first network to provide one second tunnel for a plurality of data IPsec tunnels, or to map data of a plurality of data IPsec tunnels to one second tunnel or one piece of second QoS information;
modifying a fourth tunnel for the data IPsec tunnel;
mapping the data IPsec tunnel to a fourth tunnel;
setting uplink and/or downlink packet filter information in QoS information of a second tunnel to the information of the data IPsec tunnel;
setting uplink and/or downlink packet filter information in second QoS information to the information of the data IPsec tunnel;
modifying uplink and/or downlink packet filter information in QoS information of a fourth tunnel to the information of the data IPsec tunnel, or adding the information of the data IPsec tunnel to uplink and/or downlink packet filter information in QoS information of a fourth tunnel;
setting a traffic descriptor component type identifier in QoS information of a second tunnel to a security parameter index type;
setting a traffic descriptor component type identifier in second QoS information to a security parameter index type;
modifying a traffic descriptor component type identifier in QoS information of a fourth tunnel to a security parameter index type;
setting QoS parameter information in second QoS information to QoS flow description information corresponding to a tunnel, associated with the data IPsec tunnel, between the terminal and the second network;
modifying QoS parameter information in QoS information of a fourth tunnel to QoS parameter information corresponding to a tunnel, associated with the data IPsec tunnel, between the terminal and the second network, or adding such QoS parameter information to QoS parameter information in QoS information of a fourth tunnel; and
transmitting the information of the data IPsec tunnel to the first network;

wherein the fourth tunnel is a tunnel already established for the terminal and the first network; and the second QoS information is new QoS information.

17. The terminal according to claim 16, wherein the second tunnel is a second QoS flow;

wherein the making a request to the first network for establishing a second tunnel comprises:

transmitting to the first network a request for modifying a first PDU session or for establishing a first PDU session, the request for modifying a first PDU session or for establishing a first PDU session containing QoS information of a second QoS flow requested to be established.

18. The terminal according to claim 15, wherein the QoS parameter information comprises a QoS class indication;

wherein the QoS class indication comprises 5QI or QCI.

19. A computer-readable storage medium, comprising a processor, a memory, and a program that is stored in the memory and capable of running on the processor, wherein when the program is executed by the processor, the processor is configured to implement:

obtaining information of a data IPsec tunnel and/or information of a tunnel between the terminal and a second network, wherein the data IPsec tunnel is an IPsec tunnel used for transmitting user plane data between the terminal and the second network, or data of the tunnel between the terminal and the second network; and performing a second related operation for a tunnel of a first network based on the information of the data IPsec tunnel and/or the information of the tunnel between the terminal and the second network;

wherein the performing a second related operation for a tunnel of a first network comprises at least one of the following:

requesting the first network to provide a standalone second tunnel for each data IPsec tunnel;

setting QoS parameter information in QoS information of a second tunnel to QoS parameter information corresponding to a tunnel, associated with the data IPsec tunnel, between the terminal and the second network;

wherein the second tunnel is used for transmitting data of the data IPsec tunnel, or used for transmitting data of the tunnel between the terminal and the second network, or used for transmitting user plane data between the terminal and the second network.

* * * * *